US012804428B2

(12) United States Patent
Luo et al.

(10) Patent No.: US 12,804,428 B2
(45) Date of Patent: Nov. 17, 2026

(54) BEAM GENERATION METHOD AND RELATED APPARATUS

(71) Applicant: HUAWEI TECHNOLOGIES CO., LTD., Guangdong (CN)

(72) Inventors: Xiaoyu Luo, Chengdu (CN); Lei Chen, Chengdu (CN); Gao Xiang, Chengdu (CN); Peng Guan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 450 days.

(21) Appl. No.: 18/183,174

(22) Filed: Mar. 14, 2023

(65) Prior Publication Data

US 2023/0217286 A1 Jul. 6, 2023

Related U.S. Application Data

(63) Continuation of application No. PCT/CN2020/117517, filed on Sep. 24, 2020.

(51) Int. Cl.
*H04W 24/08* (2009.01)
*H04B 7/06* (2006.01)

(52) U.S. Cl.
CPC .......... *H04W 24/08* (2013.01); *H04B 7/0617* (2013.01); *H04B 7/06952* (2023.05)

(58) Field of Classification Search
CPC . H04W 24/08; H04B 7/0617; H04B 7/06952; H04B 7/0628
See application file for complete search history.

(56) References Cited

U.S. PATENT DOCUMENTS

2020/0162142 A1 5/2020 Rahman et al.
2020/0187128 A1* 6/2020 Yao .................... H04W 52/242
(Continued)

FOREIGN PATENT DOCUMENTS

CN 109792281 A 5/2019
CN 111066258 A 4/2020
(Continued)

OTHER PUBLICATIONS

5G CSI Report in Detail—Apr. 30, 2019 (Year: 2019).*
(Continued)

*Primary Examiner* — Noel R Beharry
*Assistant Examiner* — Phillip J Kearns

(57) ABSTRACT

Embodiments of this disclosure provide a beam generation method and a related apparatus thereof, to improve performance of communication between an access network device and a terminal device. The beam generation method in the embodiments of this disclosure includes: A terminal device receives M reference signal resources sent by an access network device; the terminal device measures each of the M reference signal resources to obtain first measurement information, where the first measurement information includes first phase information, the first phase information is phase information obtained by the terminal device by measuring each of N reference signal resources in the M reference signal resources, both N and M are integers greater than or equal to 1, and M is greater than or equal to N; and the terminal device sends first indication information to the access network device, where the first indication information indicates the first phase information.

17 Claims, 11 Drawing Sheets

(56) References Cited

U.S. PATENT DOCUMENTS

| | | | | |
|---|---|---|---|---|
| 2020/0204239 | A1* | 6/2020 | Kang | H04B 7/0691 |
| 2021/0329656 | A1* | 10/2021 | Landis | H04B 7/0695 |
| 2021/0351824 | A1* | 11/2021 | Kim | H04B 7/0486 |
| 2022/0123805 | A1 | 4/2022 | Chung et al. | |
| 2023/0328568 | A1* | 10/2023 | Wu | H04W 24/10<br>370/252 |

FOREIGN PATENT DOCUMENTS

| | | | |
|---|---|---|---|
| CN | 111201723 | A | 5/2020 |
| CN | 111698005 | A | 9/2020 |
| WO | 2018232090 | A1 | 12/2018 |
| WO | 2020145716 | A1 | 7/2020 |

OTHER PUBLICATIONS

3GPP TS 38.211 V16.2.0 :"3rd Generation Partnership Project; Technical Specification Group Radio Access Network; NR; Physical channels and modulation (Release 16)",Jun. 2020,total 131 pages.
3GPP TS 38.212 V16.2.0 :"3rd Generation Partnership Project; Technical Specification Group Radio Access Network; NR; Multiplexing and channel coding (Release 16)",Jun. 2020,total 151 pages.
3GPP TS 38.213 V16.2.0:"3rd Generation Partnership Project; Technical Specification Group Radio Access Network; NR; Physical layer procedures for control (Release 16)",Jun. 2020,total 176 pages.
3GPP TS 38.214 V16.2.0:"3rd Generation Partnership Project; Technical Specification Group Radio Access Network; NR; Physical layer procedures for data (Release 16)",Jun. 2020,total 163 pages.
3GPP TS 38.321 v16.2.0 "3rd Generation Partnership Project; Technical Specification Group Radio Access Network; NR;Medium Access Control (MAC) protocol specification(Release 16)"Sep. 2020, total 154 pages.
3GPP TS 38.331 v16.2.0 "3rd Generation Partnership Project;Technical Specification Group Radio Access Network;NR;Radio Resource Control (RRC) protocol specification(Release 16)",Sep. 2020,total 921 pages.
3GPP TS 38.133 V16.2.0 (Dec. 2019), 3rd Generation Partnership Project; Technical Specification Group Radio Access Network; NR; Requirements for support of radio resource management(Release 16), 1049 pages.
3GPP TS 38.306 v16.2.0:"3rd Generation Partnership Project;Technical Specification Group Radio Access Network;NR;Equipment (UE) radio access capabilities(Release 16)",Sep. 2020,total 126 pages.

* cited by examiner

BEAM GENERATION METHOD AND RELATED APPARATUS

CROSS-REFERENCE TO RELATED APPLICATIONS

This disclosure is a continuation of International Application No. PCT/CN2020/117517, filed on Sep. 24, 2020, the disclosure of which is hereby incorporated by reference in its entirety.

TECHNICAL FIELD

This disclosure relates to the field of communications technologies, and in particular, to a beam generation method and a related apparatus.

BACKGROUND

In a high-frequency communication system, to overcome a path loss, a high-gain antenna array is usually used between a base station and a terminal device to form a directional analog beam for communication. Normal communication can be implemented between the base station and the terminal device only when a direction of a transmit beam of the base station is aligned with a direction of a receive beam of the terminal device.

Currently, a main manner in which the base station selects a transmit beam is as follows: The base station generates a plurality of fixed-weight analog transmit beams, and then the base station sends, on reference signal resources corresponding to the plurality of fixed-weight analog transmit beams, reference signals corresponding to the reference signal resources respectively to the terminal device by using the plurality of fixed-weight analog transmit beams, and the terminal device measures the reference signals. Then, the terminal device reports measurement information of the reference signals (including reference signal received powers (RSRPs), reference signal received quality (RSRQs), and the like of the reference signals) to the base station. Then, the base station selects, based on the measurement information, one fixed-weight analog transmit beam from the plurality of fixed-weight analog transmit beams as the transmit beam of the base station.

However, main lobe directions of the plurality of fixed-weight analog transmit beams are discontinuous. Consequently, a pit occurs between two fixed-weight analog transmit beams. A depth of the pit is related to fixed-weight analog transmit beam generation parameters, for example, a total quantity of fixed-weight analog transmit beams, a beam width, a beam gain, and the like. Due to mobility of the terminal device, a phase location between the base station and the terminal device is changeable. If the terminal device is located at the pit between the two fixed-weight analog transmit beams, either fixed-weight analog transmit beam selected by the base station from the two fixed-weight analog transmit beams as the transmit beam of the base station results in a loss of a beam gain of the base station. Consequently, performance of communication between the base station and the terminal device is reduced.

SUMMARY

This disclosure provides a beam generation method and a related apparatus thereof, to improve performance of communication between an access network device and a terminal device.

A first aspect of this disclosure provides a communication method. The communication method includes:

a terminal device receives M reference signal resources sent by an access network device; then the terminal device measures each of the M reference signal resources to obtain first measurement information, where the first measurement information includes first phase information, the first phase information is phase information obtained by the terminal device by measuring each of N reference signal resources in the M reference signal resources, both N and M are integers greater than or equal to 1, and M is greater than or equal to N; and the terminal device sends first indication information to the access network device, where the first indication information indicates the first phase information.

In the foregoing solution, the terminal device measures the first phase information of the N reference signal resources, and sends the first indication information to the access network device, to indicate the first phase information. In a movement process of the terminal device, a channel condition between the access network device and the terminal device keeps changing, and the N reference signal resources are respectively corresponding to the N transmit beams. Therefore, the first phase information of the N reference signal resources may indicate a channel change status between the access network device and the terminal device. In this way, the access network device may generate, by using the first phase information, a new transmit beam that matches the channel condition between the terminal device and the access network device; or select, from the N transmit beams of the access network device, a transmit beam that matches the channel condition between the terminal device and the access network device, to improve performance of communication between the access network device and the terminal device.

In a possible implementation, the M reference signal resources are used for beam management, the first phase information is used by the access network device to generate a first transmit beam, and the first transmit beam is used for communication between the access network device and the terminal device.

In this possible implementation, in a beam management process, the terminal device reports the first phase information additionally. In this way, the access network device may generate, with reference to the first phase information, the first transmit beam that meets the channel condition between the terminal device and the access network device. Then, the access network device communicates with the terminal device by using the first transmit beam, thereby improving performance of transmission between the terminal device and the access network device.

In another possible implementation, the first transmit beam does not belong to a transmit beam set, and the transmit beam set includes transmit beams that are generated by the access network device and that are respectively corresponding to the M reference signal resources.

In this possible implementation, the first transmit beam does not belong to the M transmit beams generated by the access network device, and the M transmit beams are transmit beams with fixed weights generated by the access network device. A main lobe direction of the first transmit beam is directed at the terminal device. In this way, when the access network device and the terminal device perform communication transmission by using the first transmit beam, a beam gain of the first transmit beam can be greatly improved, thereby improving performance of communication between the terminal device and the access network device. In addition, compared with a manner in which the access network device selects a transmit beam from the M transmit beams to perform communication transmission with the terminal device, the method in this embodiment maximizes the channel capacity corresponding to the first transmit beam, and therefore improves a capacity of a channel corresponding to the first transmit beam. The M transmit beams are M transmit beams that are generated by the access network device and that correspond to the M reference signal resources, and the M transmit beams are transmit beams with fixed weights.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In this possible implementation, two possible forms of content carried in the first phase information are shown. To be specific, the first phase information includes a phase difference between every two phases in the phases respectively corresponding to the N reference signal resources, or the first phase information includes a phase difference between the first reference phase and a phase corresponding to each of the N reference signal resources. This manner can adapt to an existing RSRP reporting manner in a beam management process, has relatively small changes to both the terminal device and the access network device, and is relatively practical.

In another possible implementation, the first measurement information includes N channel state information reference signal resource indicators (channel status information reference signal resource indicator, CRI), N RSRPs, and the first phase information. The first phase information includes N*(N−1) phase differences or N−1 phase differences. The N CRIs are CRIs respectively corresponding to the N reference signal resources, and the N RSRPs are RSRPs respectively corresponding to the N reference signal resources. The N*(N−1) phase differences are phase differences between the phases respectively corresponding to the N reference signal resources, and the N−1 phase differences are phase differences between the first reference phase and the phases respectively corresponding to the N reference signal resources.

In this possible implementation, content specifically included in the first measurement information obtained by the terminal device through measurement in the beam management process is shown.

In another possible implementation, the N reference signal resources in the M reference signal resources are received by the terminal device by using a same receive beam.

In this possible implementation, the access network device calculates the generated first transmit beam based on amplitude information (that is, the RSRPs of the N reference signals) of the N reference signals corresponding to the N reference signal resources and the first phase information of the N reference signals that are obtained by the terminal device through measurement by using the same receive beam. Therefore, the receive beam of the terminal device should be limited on the terminal device side, so that the access network device generates the first transmit beam that matches a channel condition between the terminal device and the access network device, thereby improving communication performance of communication between the terminal device and the access network device.

In another possible implementation, before the terminal device receives the M reference signal resources sent by the access network device, the method further includes:

the terminal device sends first capability information of the terminal device to the access network device, where the first capability information carries second indication information, and the second indication information indicates whether the terminal device has a measurement capability of measuring the first phase information required by the access network device to generate the first transmit beam.

In this possible implementation, the terminal device sends the first capability information of the terminal device to the access network device. In this way, the access network device can configure a proper resource configuration and a proper reporting manner for the terminal device based on the first capability information, so as to correctly parse a reporting quantity of the terminal device.

In another possible implementation, the second indication information indicates whether the terminal device supports measurement of the phase information corresponding to the reference signal resource used for beam management.

In this possible implementation, the terminal device indicates, by using the second indication information, whether the terminal device supports measurement of the phase information corresponding to the reference signal resource used for beam management. In this way, the access network device can configure a proper resource configuration and a proper reporting manner for the terminal device, so that the access network device correctly parses a reporting quantity of the terminal device, thereby improving parsing efficiency.

In another possible implementation, the first capability information further carries one or more of the following pieces of information: a maximum quantity of transmit beams that are corresponding to reference signal resources used for beam management and that can be combined by the terminal device; and information about a quantization capability of quantizing the first phase information by the terminal device.

In this possible implementation, the terminal device may further add, to the first capability information, the maximum quantity of transmit beams that can be combined by the terminal device and the quantization capability information, so that the access network device configures a proper resource configuration and a proper reporting manner for the terminal device.

In another possible implementation, before the terminal device receives the M reference signal resources sent by the access network device, the method further includes: the terminal device receives first configuration information sent by the access network device; and then the terminal device determines, based on the first configuration information, to report the first phase information of the N reference signal resources.

In this possible implementation, the access network device sends the first configuration information to the terminal device, so as to instruct the terminal device to measure the first phase information of the N reference signal resources, and report the first phase information in a configuration manner indicated by the first configuration information. In this way, the access network device can correctly parse the first phase information reported by the terminal device.

In another possible implementation, the first configuration information includes second configuration information of a first resource set, the second configuration information includes a repetition (repetition) field, the repetition field is OFF, and the first resource set includes the M reference signal resources.

In this possible implementation, a possible implementation in which the second configuration information is used to configure the terminal device to not expect the access network device to use a same transmit spatial filter (that is, transmit beam) to send the M reference signal resources is shown, thereby improving implementability of the solution.

In another possible implementation, the first configuration information further includes one or more of the following pieces of information:

third indication information, where the third indication information indicates that the first resource set is used by the access network device to generate the first transmit beam;

reporting granularity information of the first phase information; and size information of each subband when a reporting granularity of the first phase information is a subband reporting granularity.

In this possible implementation, some other content carried in the first configuration information is provided. It should be noted that the third indication information, the reporting granularity information of the first phase information, and the size information of each subband may alternatively be reported by using another message or information. This is not specifically limited in this disclosure.

In another possible implementation, the method further includes:

sending, by the terminal device, twelfth indication information and thirteenth indication information to the access network device, where the twelfth indication information indicates N CRIs corresponding to the N reference signal resources, and the thirteenth indication information indicates RSRPs corresponding to the N reference signal resources.

A second aspect of this disclosure provides a communication method. The communication method includes:

an access network device sends M reference signal resources to a terminal device; then the access network device receives first indication information sent by the terminal device, where the first indication information indicates first phase information, the first phase information is phase information obtained by the terminal device by measuring N reference signal resources, the M reference signal resources include the N reference signal resources, both N and M are integers greater than or equal to 1, and M is greater than or equal to N; and the access network device generates a first transmit beam based on the first phase information indicated by the first indication information, where the first transmit beam is used for communication between the access network device and the terminal device.

In the foregoing solution, the terminal device sends the first indication information to the access network device, to indicate the first phase information. In a movement process of the terminal device, a channel condition between the access network device and the terminal device keeps changing, and the N reference signal resources are respectively corresponding to the N transmit beams. Therefore, the first phase information of the N reference signal resources may indicate a channel change status between the access network device and the terminal device. In this way, the access network device may generate, with reference to the first phase information, the first transmit beam that matches a channel condition between the terminal device and the access network device, to improve performance of communication between the access network device and the terminal device.

In a possible implementation, the M reference signal resources are used for beam management.

In this possible implementation, in a beam management process, the terminal device reports the first phase information additionally. In this way, the access network device may generate, with reference to the first phase information, the first transmit beam that meets the channel condition between the terminal device and the access network device. Then, the access network device communicates with the terminal device by using the first transmit beam, thereby improving performance of transmission between the terminal device and the access network device.

In another possible implementation, the first transmit beam does not belong to a transmit beam set, and the transmit beam set includes transmit beams that are generated by the access network device and that are respectively corresponding to the M reference signal resources.

In this possible implementation, the first transmit beam does not belong to the M transmit beams generated by the access network device, and the M transmit beams are transmit beams with fixed weights generated by the access network device. A main lobe direction of the first transmit beam is directed at the terminal device. In this way, when the access network device and the terminal device perform communication transmission by using the first transmit beam, a beam gain of the first transmit beam can be greatly improved, thereby improving performance of communication between the terminal device and the access network device. In addition, compared with a manner in which the access network device selects a transmit beam from the M transmit beams to perform communication transmission with the terminal device, the method in this embodiment maximizes a channel capacity corresponding to the first transmit beam, and therefore improves a capacity of a channel corresponding to the first transmit beam. The M transmit beams are M transmit beams that are generated by the access network device and that correspond to the M reference signal resources, and the M transmit beams are transmit beams with fixed weights.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In this possible implementation, two possible forms of content carried in the first phase information are shown. To be specific, the first phase information includes a phase difference between every two phases in the phases respectively corresponding to the N reference signal resources, or the first phase information includes a phase difference between the first reference phase and a phase corresponding to each of the N reference signal resources. This manner can adapt to an existing RSRP reporting manner in a beam management process, has relatively small changes to both the terminal device and the access network device, and is relatively practical.

In another possible implementation, the first phase information includes $N^*(N-1)$ phase differences, or $N-1$ phase differences. The $N^*(N-1)$ phase differences are the phase differences between the phases respectively corresponding to the N reference signal resources, and the $N-1$ phase differences are phase differences between the first reference phase and the phases respectively corresponding to the N reference signal resources.

In this possible implementation, content specifically included in the first measurement information obtained by the terminal device through measurement in the beam management process is shown.

In another possible implementation, the N reference signal resources in the M reference signal resources are received by the terminal device by using a same receive beam.

In this possible implementation, the access network device calculates the generated first transmit beam based on amplitude information (that is, the RSRPs of the N reference signals) of the N reference signals corresponding to the N reference signal resources and the first phase information of the N reference signals that are obtained by the terminal device through measurement by using the same receive beam. Therefore, the receive beam of the terminal device should be limited on the terminal device side, so that the access network device generates the first transmit beam that matches a channel condition between the terminal device and the access network device, thereby improving communication performance of communication between the terminal device and the access network device.

In another possible implementation, before the access network device sends the M reference signal resources to the terminal device, the method further includes: The access network device receives first capability information of the terminal device that is sent by the terminal device, where the first capability information carries second indication information, and the second indication information indicates whether the terminal device has a measurement capability of measuring the first phase information required by the access network device to generate the first transmit beam; and then the access network device determines, based on the first capability information, that the terminal device has the measurement capability of measuring the first phase information.

In this possible implementation, the terminal device sends the first capability information of the terminal device to the access network device. In this way, the access network device can configure a proper resource configuration and a proper reporting manner for the terminal device based on the first capability information, so as to correctly parse a reporting quantity of the terminal device.

In another possible implementation, the second indication information indicates whether the terminal device supports measurement of the phase information corresponding to the reference signal resource used for beam management.

In this possible implementation, the terminal device indicates, by using the second indication information, whether the terminal device supports measurement of the phase information corresponding to the reference signal resource used for beam management. In this way, the access network device can configure a proper resource configuration and a proper reporting manner for the terminal device, so that the access network device correctly parses a reporting quantity of the terminal device, thereby improving parsing efficiency.

In another possible implementation, the first capability information further carries one or more of the following pieces of information: a maximum quantity of transmit beams that are corresponding to reference signal resources used for beam management and that can be combined by the terminal device; and information about a quantization capability of quantizing the first phase information by the terminal device.

In this possible implementation, the terminal device may further add, to the first capability information, the maximum quantity of transmit beams that can be combined by the terminal device and the quantization capability information, so that the access network device configures a proper resource configuration and a proper reporting manner for the terminal device.

In another possible implementation, before the access network device sends the M reference signal resources to the terminal device, the method further includes: The access network device sends first configuration information to the terminal device, where the first configuration information is used for configuring the terminal device to report the first phase information of the N reference signal resources.

In this possible implementation, the access network device sends the first configuration information to the terminal device, so as to instruct the terminal device to measure the first phase information of the N reference signal resources, and report the first phase information in a configuration manner indicated by the first configuration information. In this way, the access network device can correctly parse the first phase information reported by the terminal device.

In another possible implementation, the first configuration information includes second configuration information of a first resource set, the second configuration information includes a repetition field, the repetition field is OFF, and the first resource set includes the M reference signal resources.

In this possible implementation, a possible implementation in which the second configuration information is used to configure the terminal device to not expect the access network device to use a same transmit spatial filter (that is, transmit beam) to send the M reference signal resources is shown, thereby improving implementability of the solution.

In another possible implementation, the first configuration information further includes one or more of the following pieces of information:

third indication information, where the third indication information indicates that the first resource set is used by the access network device to generate the first transmit beam;

reporting granularity information of the first phase information; and size information of each subband when a reporting granularity of the first phase information is a subband reporting granularity.

In this possible implementation, some other content carried in the first configuration information is provided. It should be noted that the third indication information, the reporting granularity information of the first phase information, and the size information of each subband may alternatively be reported by using another message or information. This is not specifically limited in this disclosure.

In another possible implementation, the method further includes:

the access network device receives twelfth indication information and thirteenth indication information that are sent by the terminal device, where the twelfth indication information indicates N CRIs corresponding to the N reference signal resources, and the thirteenth indication information indicates RSRPs corresponding to the N reference signal resources; and the access network device determines, based on the twelfth indication information and the thirteenth indication information, the RSRPs corresponding to the N reference signal resources. That the access network device generates a first transmit beam based on the first phase information indicated by the first indication information includes: The access network device generates the first transmit beam based on the first phase information and the RSRPs corresponding to the N reference signal resources.

In this possible implementation, a specific manner in which the access network device generates the first transmit beam is provided. To be specific, the access network device generates the first transmit beam based on the first phase information and the RSRPs corresponding to the N reference signal resources. Because the first phase information and the RSRPs corresponding to the N reference signal resources can represent the channel condition between the terminal device and the access network device, the access network device can generate, by using the first phase information and the RSRPs corresponding to the N reference signal resources, the first transmit beam that matches the channel condition between the terminal device and the access network device.

In another possible implementation, that the access network device generates the first transmit beam based on the first phase information and the RSRPs corresponding to the N reference signal resources includes: The access network device determines a first synthesis weight based on the first phase information and the RSRPs corresponding to the N reference signal resources; and the access network device generates the first transmit beam based on the first synthesis weight and a second weight set, where the second weight set includes weights of N transmit beams corresponding to the N reference signal resources.

In this possible implementation, a specific process in which the access network device generates the first transmit beam based on the first phase information and the RSRPs corresponding to the N reference signal resources is provided, thereby improving implementability of the solution.

A third aspect of this disclosure provides a communication method. The communication method includes:

a terminal device receives second reference signal resources sent by an access network device, where the second reference signal resources are reference signal resources sent by the access network device on R transmit beams through R ports of the access network device, the R ports are in a one-to-one correspondence with the R transmit beams, the R transmit beams are transmit beams that are generated by the access network device and corresponding to R reference signal resources, and R is an integer greater than or equal to 2; then the terminal device measures the second reference signal resources to obtain second measurement information, where the second measurement information includes second phase information, and the second phase information is phase information obtained by the terminal device by measuring each of the second reference signal resources on the R ports; and the terminal device sends fourth indication information to the access network device, where the fourth indication information indicates the second phase information.

In the foregoing solution, the terminal device measures the second phase information of the second reference signal resources on the N ports, and sends the fourth indication information to the access network device, to indicate the second phase information. In a movement process of the terminal device, a channel condition between the access network device and the terminal device keeps changing, and the R ports are respectively corresponding to the R transmit beams of the access network device. Therefore, the second phase information of the second reference signal resources may indicate a channel change status between the access network device and the terminal device. In this way, the access network device may generate, by using the second phase information, a new transmit beam that matches the channel condition between the terminal device and the access network device; or select, from the R transmit beams of the access network device, a transmit beam that matches the channel condition between the terminal device and the access network device, to improve performance of communication between the access network device and the terminal device.

In a possible implementation, the second reference signal resources are used for beam combination, the second phase information is used by the access network device to generate a second transmit beam, and the second transmit beam is used for communication between the access network device and the terminal device.

In this possible implementation, a beam combination process is added based on an existing beam management process, and the terminal device obtains the second phase information through measurement. In this way, the access network device can generate, with reference to the second phase information, the second transmit beam that matches the channel condition between the terminal device and the access network device, to improve performance of communication between the access network device and the terminal device.

In another possible implementation, the second transmit beam does not belong to a transmit beam set, the transmit beam set includes transmit beams that are generated by the access network device and corresponding to M reference signal resources, the M reference signal resources are used for beam management, the M reference signal resources include the R reference signal resources, M is an integer greater than or equal to 2, and M is greater than or equal to R.

In this possible implementation, the second transmit beam does not belong to M transmit beams generated by the access network device, and the M transmit beams are transmit beams with fixed weights generated by the access network device. A main lobe direction of the second transmit beam is directed at the terminal device. In this way, when the access network device and the terminal device perform communication transmission by using the second transmit beam, a beam gain of the second transmit beam can be greatly improved, thereby improving performance of communication between the terminal device and the access network device. In addition, compared with a manner in which the access network device selects a transmit beam from the M transmit beams to perform communication transmission with the terminal device, the method in this embodiment maximizes a channel capacity corresponding to the second transmit beam, and therefore improves a capacity of a channel corresponding to the second transmit beam. The M transmit beams are M transmit beams that are generated by the access network device and that correspond to the M reference signal resources, and the M transmit beams are transmit beams with fixed weights.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In this possible implementation, two forms of content carried in the second phase information are provided. To be specific, the second phase information includes phase differences between the phases respectively corresponding to the second reference signal resources on the R ports, or a phase difference between the second reference phase and each of phases respectively corresponding to the second reference signal resources on the R ports. This manner can adapt to an existing RSRP reporting manner in a beam management process, has a relatively small change to both the terminal device and the access network device, and is relatively practical.

In another possible implementation, the second measurement information includes RSRPs respectively corresponding to the second reference signal resources on the R ports; the second phase information includes R*(R−1) phase differences or R−1 phase differences. The R*(R−1) phase differences are phase differences between the phases respectively corresponding to the second reference signal resources on the R ports. The R−1 phase differences are phase differences between the second reference phase and the phases respectively corresponding to the second reference signal resources on the R ports.

In this possible implementation, specific content of the second measurement information is provided.

In another possible implementation, the method further includes: The terminal device sends eleventh indication information to the access network device, where the eleventh indication information indicates the RSRPs respectively corresponding to the second reference signal resources on the R ports.

In this possible implementation, the terminal device further sends the RSRPs respectively corresponding to the second reference signal resources on the R ports to the access network device. In this way, the access network device may generate the second transmit beam based on the RSRPs respectively corresponding to the second reference signal resources on the R ports and the second phase information. In other words, the beam combination process is also used to obtain the RSRPs respectively corresponding to the second reference signal resources on the R ports, and the RSRPs corresponding to the R transmit beams may not need to be obtained by using the beam management process.

In another possible implementation, that a terminal device receives second reference signal resources sent by an access network device includes: The terminal device receives, by using a same receive beam, the second reference signal resources sent by the access network device.

In this possible implementation, the access network device generates the second transmit beam through calculation based on the second phase information obtained by the terminal device through measurement by using the same receive beam. Therefore, the receive beam of the terminal device should be limited on the terminal device side, so that the access network device generates the second transmit beam that matches a channel condition between the terminal device and the access network device, thereby improving communication performance of communication between the terminal device and the access network device.

In another possible implementation, before the terminal device receives the second reference signal resources sent by the access network device, the method further includes: The terminal device receives M reference signal resources sent by the access network device, where the M reference signal resources are used for beam management; the terminal device measures each of the M reference signal resources to obtain RSRPs respectively corresponding to R reference signal resources in the M reference signal resources; the terminal device receives the R reference signal resources by using a first receive beam, where both R and M are integers greater than or equal to 2, and M is greater than or equal to R; and the terminal device sends fifth indication information and sixth indication information to the access network device, where the fifth indication information indicates CRIs respectively corresponding to the R reference signal resources, and the sixth indication information indicates the RSRPs respectively corresponding to the R reference signal resources. That the terminal device receives second reference signal resources sent by an access network device includes: The terminal device receives, by using the first receive beam, the second reference signal resources sent by the access network device.

In this possible implementation, the terminal device may report, in a beam management process, the RSRPs respectively corresponding to the R reference signal resources, and the terminal device reports the second phase information in a beam combination process. In this way, the access network device may generate the second transmit beam based on the RSRPs respectively corresponding to the R reference signal resources and the second phase information, and communicate with the terminal device by using the second transmit beam, thereby improving communication performance of communication between the terminal device and the access network device.

In another possible implementation, before the terminal device measures the second reference signal resources to obtain the second measurement information, the method further includes: The terminal device receives seventh indication information sent by the access network device; and the terminal device determines, based on the seventh indication information, to measure the phases of the second reference signal resources on the R ports of the access network device, where the R ports are first R ports of P ports that are configured to send the second reference signal resources in the access network device, and P is an integer greater than R.

In this possible implementation, if the access network device configures the terminal device to receive the second reference signal resources on the P ports of the access network device, but the access network device determines, by using the beam management procedure, that R transmit beams in the P transmit beams reported by the terminal device are suitable for the new transmit beam, the access network device may indicate, by using the seventh indication information, the terminal device to measure and report the phases of the second reference signal resources on the R ports of the access network device, so that the access network device generates the second transmit beam, thereby improving feasibility and practicability of the solution.

In another possible implementation, before the terminal device receives the second reference signal resources sent by the access network device, the method further includes: The terminal device sends second capability information of the terminal device to the access network device, where the second capability information carries eighth indication information, the eighth indication information indicates whether the terminal device supports a reference signal sending mode, and the reference signal sending mode is: the access network device sends, through R ports of the access network device by using the R transmit beams, second reference signals corresponding to the second reference signal resources on R symbols that are consecutive in time domain. The R transmit beams are in a one-to-one correspondence with the R ports, and the R ports are in a one-to-one correspondence with the R symbols.

In this possible implementation, the terminal device first reports the second capability information of the terminal device to the access network device, and indicates, by using the eighth indication information carried in the second capability information, whether the terminal device supports the reference signal sending mode. In this way, the access network device can configure a proper resource configuration and a proper reporting manner for the terminal device based on the second capability information, so that the access network device correctly parses a reporting quantity of the terminal device, thereby improving implementability of the solution.

In another possible implementation, the second capability information further carries a maximum quantity of symbols supported by the terminal device, and the maximum quantity of symbols is a maximum quantity of consecutive symbols of reference signals that can be measured by the terminal device.

In this possible implementation, the second capability information may further carry the maximum quantity of consecutive symbols of reference signals that can be measured by the terminal device. In this way, the access network device may configure a proper resource configuration and a proper reporting manner for the terminal device based on the maximum quantity of symbols, to adapt to a reporting capability of the terminal device, thereby providing a basis for implementation of the solution and ensuring feasibility and integrity of the solution.

In another possible implementation, before the terminal device receives the second reference signal resources sent by the access network device, the method further includes: The terminal device receives second configuration information sent by the access network device; and the terminal device determines, based on the second configuration information, that the second reference signal resources are used for beam combination and to report the second phase information of the second reference signal resources on the R ports.

In this possible implementation, the access network device configures a proper resource configuration and a proper reporting manner for the terminal device, and specifically, may send the resource configuration and the reporting manner to the terminal device by using the second configuration information. In this way, the terminal device may determine related information such as the reporting manner based on the second configuration information, to facilitate implementation of the solution.

A fourth aspect of this disclosure provides a communication method. The communication method includes:

an access network device sends second reference signal resources to a terminal device on R transmit beams through R ports of the access network device, where the R ports are in a one-to-one correspondence with the R transmit beams, the R transmit beams are transmit beams that are generated by the access network device and corresponding to R reference signal resources, and R is an integer greater than or equal to 2; then the access network device receives fourth indication information sent by the terminal device, where the fourth indication information indicates second phase information, and the second phase information is phase information obtained by the terminal device by measuring each of the second reference signal resources on the R ports; and the access network device generates a second transmit beam based on the second phase information indicated by the fourth indication information, where the second transmit beam is used for communication between the access network device and the terminal device.

In the foregoing solution, the access network device sends the second reference signal resources to the terminal device on the R transmit beams through the R ports of the access network device; and then the access network device receives the fourth indication information sent by the terminal device, where the fourth indication information indicates the second phase information, and the second phase information is phase information obtained by the terminal device by measuring each of the second reference signal resources on the R ports. In a movement process of the terminal device, a channel condition between the access network device and the terminal device keeps changing, and the R ports are respectively corresponding to the R transmit beams of the access network device. Therefore, the second phase information of the second reference signal resources may indicate a channel change status between the access network device and the terminal device. In this way, the access network device may generate, by using the second phase information, a new transmit beam that matches the channel condition between the terminal device and the access network device; or select, from the R transmit beams of the access network device, a transmit beam that matches the channel condition between the terminal device and the access network device, to improve performance of communication between the access network device and the terminal device.

In a possible implementation, the second reference signal resources are used for beam combination.

In this possible implementation, a beam combination process is added in this disclosure, and in the beam combination process, the terminal device measures the second phase information of the second reference signal resources on the R ports of the access network device, that is, the second reference signal resources used defined for beam combination, so as to obtain the second phase information. In this way, the access network device may generate, with reference to the second phase information, the second transmit beam that matches the channel condition between the terminal device and the access network device.

In another possible implementation, the second transmit beam does not belong to a transmit beam set, the transmit beam set includes transmit beams that are generated by the access network device and corresponding to M reference signal resources, the M reference signal resources are used for beam management, the M reference signal resources include the R reference signal resources, M is an integer greater than or equal to 2, and M is greater than or equal to R.

In this possible implementation, the second transmit beam does not belong to M transmit beams generated by the access network device, and the M transmit beams are transmit beams with fixed weights generated by the access network device. A main lobe direction of the second transmit beam is directed at the terminal device. In this way, when the access network device and the terminal device perform communication transmission by using a first transmit beam, a beam gain of the second transmit beam can be greatly improved, thereby improving performance of communication between the terminal device and the access network device. In addition, compared with a manner in which the access network device selects a transmit beam from the M transmit beams to perform communication transmission with the terminal device, the method in this embodiment maximizes a channel capacity corresponding to the second transmit beam, and therefore improves a capacity of a channel corresponding to the second transmit beam. The M transmit beams are M transmit beams that are generated by the access network device and that correspond to the M reference signal resources, and the M transmit beams are transmit beams with fixed weights.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In this possible implementation, two forms of content carried in the second phase information are provided. To be specific, the second phase information includes phase differences between the phases respectively corresponding to the second reference signal resources on the R ports, or a phase difference between the second reference phase and each of phases respectively corresponding to the second reference signal resources on the R ports. This manner can adapt to an existing RSRP reporting manner in a beam management process, has a relatively small change to both the terminal device and the access network device, and is relatively practical.

In another possible implementation, the method further includes: The access network device receives eleventh indication information sent by the terminal device, where the eleventh indication information indicates RSRPs respectively corresponding to the second reference signal resources on the R ports. The second phase information includes R*(R−1) phase differences or R−1 phase differences; the R*(R−1) phase differences are phase differences between the phases respectively corresponding to the second reference signal resources on the R ports; and the R−1 phase differences are phase differences between the second reference phase and the phases respectively corresponding to the second reference signal resources on the R ports.

In this possible implementation, information specifically included in the second phase information and the RSRPs that are respectively corresponding to the second reference signal resources on the R ports and that are further sent by the terminal device to the access network device are provided. In this way, the access network device may generate the second transmit beam based on the RSRPs respectively corresponding to the second reference signal resources on the R ports and the second phase information. In other words, the beam combination process is also used to obtain the RSRPs respectively corresponding to the second reference signal resources on the R ports, and the RSRPs corresponding to the R transmit beams may not need to be obtained by using the beam management process.

In another possible implementation, the method further includes: The access network device sends seventh indication information to the terminal device, where the seventh indication information is used to indicate the terminal device to measure phase information of the second reference signal resources on the R ports, the R ports are first R ports of P ports that are configured to send the second reference signal resources in the access network device, and P is an integer greater than R.

In this possible implementation, if the access network device configures the terminal device to receive the second reference signal resources on the P ports of the access network device, but the access network device determines, by using the beam management procedure, that R transmit beams in the P transmit beams reported by the terminal device are suitable for the new transmit beam, the access network device may indicate, by using the seventh indication information, the terminal device to measure and report the phases of the second reference signal resources on the R ports of the access network device, so that the access network device generates the second transmit beam, thereby improving feasibility and practicability of the solution.

In another possible implementation, before the access network device sends the second reference signal resources to the terminal device on the R transmit beams through the R ports of the access network device, the method further includes: The access network device receives second capability information of the terminal device that is sent by the terminal device, where the second capability information carries eighth indication information; and then the access network device determines, based on the eighth indication information, whether the terminal device supports a reference signal sending mode, where the reference signal sending mode is: the access network device sends, through R ports of the access network device by using the R transmit beams, second reference signals corresponding to the second reference signal resources on R symbols that are consecutive in time domain, where the R transmit beams are in a one-to-one correspondence with the R ports, and the R ports are in a one-to-one correspondence with the R symbols.

In this possible implementation, the access network device receives the second capability information of the terminal device that is reported by the terminal device, and determines, based on the eighth indication information carried in the second capability information, whether the terminal device supports the reference signal sending mode. In this way, the access network device can configure a proper resource configuration and a proper reporting manner for the terminal device based on the second capability information, so that the access network device correctly parses a reporting quantity of the terminal device, thereby improving implementability of the solution.

In another possible implementation, the second capability information further carries a maximum quantity of symbols supported by the terminal device, and the maximum quantity of symbols is a maximum quantity of consecutive symbols of reference signals that can be measured by the terminal device.

In this possible implementation, the second capability information may further carry the maximum quantity of consecutive symbols of reference signals that can be measured by the terminal device. In this way, the access network device may configure a proper resource configuration and a proper reporting manner for the terminal device based on the maximum quantity of symbols, to adapt to a reporting capability of the terminal device, thereby providing a basis for implementation of the solution and ensuring feasibility and integrity of the solution.

In another possible implementation, before the access network device sends the second reference signal resources to the terminal device on the R transmit beams through the R ports of the access network device, the method further includes: The access network device sends second configuration information to the terminal device, where the second configuration information is used to configure the second reference signal resources to be used for beam combination, and configure the terminal device to report the second phase information of the second reference signal resources on the R ports.

In this possible implementation, the access network device configures a proper resource configuration and a proper reporting manner for the terminal device, and specifically, may send the resource configuration and the reporting manner to the terminal device by using the second configuration information. In this way, the terminal device may determine related information such as the reporting manner based on the second configuration information, to facilitate implementation of the solution.

In another possible implementation, the method further includes: The access network device sends M reference signal resources to the terminal device, where the M reference signal resources are used for beam management; the access network device receives a third message sent by the terminal device, where the third message carries fifth indication information and sixth indication information, the fifth indication information indicates CRIs respectively corresponding to the R reference signal resources, the sixth indication information indicates RSRPs respectively corresponding to the R reference signal resources, and the R reference signal resources are in a one-to-one correspondence with the R transmit beams; and the access network device determines, based on the third message, the RSRPs respectively corresponding to the R reference signal resources. That the access network device generates a second transmit beam based on the second phase information indicated by the fourth indication information includes: The access network device generates the second transmit beam based on the second phase information and the RSRPs respectively corresponding to the R reference signal resources.

In this possible implementation, a beam combination process is added based on a beam management process. In this way, the access network device may generate the second transmit beam with reference to the second phase information obtained in the beam combination process and the RSRPs that are respectively corresponding to the R reference signal resources and that are obtained in the beam management process, and communicate with the terminal device by using the second transmit beam, to improve performance of communication between the access network device and the terminal device.

In another possible implementation, that the access network device generates the second transmit beam based on the second phase information and the RSRPs respectively corresponding to the R reference signal resources includes: The access network device generates a second synthesis weight based on the second phase information and the RSRPs respectively corresponding to the R reference signal resources; and the access network device generates the second transmit beam based on the second synthesis weight and a third weight set, where the third weight set includes weights of the R transmit beams corresponding to the R reference signal resources.

In this possible implementation, a process in which the access network device specifically generates the second transmit beam is provided, thereby improving implementability and integrity of the solution.

A fifth aspect of this disclosure provides a communication method. The communication method includes:

a terminal device receives M reference signal resources sent by an access network device; then the terminal device measures N reference signal resources in the M reference signal resources, to obtain first phase information, where both N and M are integers greater than or equal to 1, and M is greater than or equal to N; and then the terminal device sends first indication information to the access network device, where the first indication information indicates the first phase information.

In the foregoing solution, the terminal device measures the first phase information of the N reference signal resources, and sends the first indication information to the access network device, to indicate the first phase information. In a movement process of the terminal device, a channel condition between the access network device and the terminal device keeps changing, and the N reference signal resources are respectively corresponding to the N transmit beams. Therefore, the first phase information of the N reference signal resources may indicate a channel change status between the access network device and the terminal device. In this way, the access network device may generate, by using the first phase information, a new transmit beam that matches the channel condition between the terminal device and the access network device; or select, from the N transmit beams of the access network device, a transmit beam that matches the channel condition between the terminal device and the access network device, to improve performance of communication between the access network device and the terminal device.

In a possible implementation, the M reference signal resources are used for beam management, the first phase information is used by the access network device to generate a first transmit beam, and the first transmit beam is used for communication between the access network device and the terminal device.

In this possible implementation, in a beam management process, the terminal device reports the first phase information additionally. In this way, the access network device may generate, with reference to the first phase information, the first transmit beam that meets the channel condition between the terminal device and the access network device. Then, the access network device communicates with the terminal device by using the first transmit beam, thereby improving performance of transmission between the terminal device and the access network device.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In this possible implementation, two possible forms of content carried in the first phase information are shown. To be specific, the first phase information includes a phase difference between every two phases in the phases respectively corresponding to the N reference signal resources, or the first phase information includes a phase difference between the first reference phase and a phase corresponding to each of the N reference signal resources. This manner can adapt to an existing RSRP reporting manner in a beam management process, has relatively small changes to both the terminal device and the access network device, and is relatively practical.

In another possible implementation, the method further includes: The terminal device measures RSRPs respectively corresponding to the N reference signal resources.

In this possible implementation, that the terminal device obtains, through measurement, the RSRPs respectively corresponding to the N reference signal resources in a beam management process is shown.

In another possible implementation, the first phase information includes N*(N−1) phase differences or N−1 phase differences. The N CRIs are CRIs respectively corresponding to the N reference signal resources, and the N RSRPs are RSRPs respectively corresponding to the N reference signal resources. The N*(N−1) phase differences are phase differences between the phases respectively corresponding to the N reference signal resources, and the N−1 phase differences are phase differences between the first reference phase and the phases respectively corresponding to the N reference signal resources.

In another possible implementation, the N reference signal resources in the M reference signal resources are received by the terminal device by using a same receive beam.

In this possible implementation, the access network device calculates the generated first transmit beam based on amplitude information (that is, the RSRPs of the N reference signals) of the N reference signals corresponding to the N reference signal resources and the first phase information of the N reference signals that are obtained by the terminal device through measurement by using the same receive beam. Therefore, the receive beam of the terminal device should be limited on the terminal device side, so that the access network device generates the first transmit beam that matches a channel condition between the terminal device and the access network device, thereby improving communication performance of communication between the terminal device and the access network device.

In another possible implementation, before the terminal device receives the M reference signal resources sent by the access network device, the method further includes:

the terminal device sends first capability information of the terminal device to the access network device, where the first capability information carries second indication information, and the second indication information indicates whether the terminal device has a measurement capability of measuring the first phase information required by the access network device to generate the first transmit beam.

In this possible implementation, the terminal device sends the first capability information of the terminal device to the access network device. In this way, the access network device can configure a proper resource configuration and a proper reporting manner for the terminal device based on the first capability information, so as to correctly parse a reporting quantity of the terminal device.

In another possible implementation, the second indication information indicates whether the terminal device supports measurement of the phase information corresponding to the reference signal resource used for beam management.

In this possible implementation, the terminal device indicates, by using the second indication information, whether the terminal device supports measurement of the phase information corresponding to the reference signal resource used for beam management. In this way, the access network device can configure a proper resource configuration and a proper reporting manner for the terminal device, so that the access network device correctly parses a reporting quantity of the terminal device, thereby improving parsing efficiency.

In another possible implementation, the first capability information further carries one or more of the following pieces of information: a maximum quantity of transmit beams that are corresponding to reference signal resources used for beam management and that can be combined by the terminal device; and information about a quantization capability of quantizing the first phase information by the terminal device.

In this possible implementation, the terminal device may further add, to the first capability information, the maximum quantity of transmit beams that can be combined by the terminal device and the quantization capability information, so that the access network device configures a proper resource configuration and a proper reporting manner for the terminal device.

In another possible implementation, before the terminal device receives the M reference signal resources sent by the access network device, the method further includes: the terminal device receives first configuration information sent by the access network device; and then the terminal device determines, based on the first configuration information, to report the first phase information of the N reference signal resources.

In this possible implementation, the access network device sends the first configuration information to the terminal device, so as to instruct the terminal device to measure the first phase information of the N reference signal resources, and report the first phase information in a configuration manner indicated by the first configuration information. In this way, the access network device can correctly parse the first phase information reported by the terminal device.

In another possible implementation, the first configuration information includes second configuration information of a first resource set, the second configuration information includes a repetition field, the repetition field is OFF, and the first resource set includes the M reference signal resources.

In this possible implementation, a possible implementation in which the second configuration information is used to configure the terminal device to not expect the access network device to use a same transmit spatial filter (that is, transmit beam) to send the M reference signal resources is shown, thereby improving implementability of the solution.

In another possible implementation, the first configuration information further includes one or more of the following pieces of information:

third indication information, where the third indication information indicates that the first resource set is used by the access network device to generate the first transmit beam;

reporting granularity information of the first phase information; and size information of each subband when a reporting granularity of the first phase information is a subband reporting granularity.

In this possible implementation, some other content carried in the first configuration information is provided. It should be noted that the third indication information, the reporting granularity information of the first phase information, and the size information of each subband may alternatively be reported by using another message or information. This is not specifically limited in this disclosure.

In another possible implementation, the method further includes:

sending, by the terminal device, twelfth indication information and thirteenth indication information to the access network device, where the twelfth indication information indicates N CRIs corresponding to the N reference signal resources, and the thirteenth indication information indicates RSRPs corresponding to the N reference signal resources.

A sixth aspect of this disclosure provides a communication method. The communication method includes:

a terminal device receives second reference signal resources sent by an access network device, where the second reference signal resources are reference signal resources sent by the access network device on R transmit beams through R ports of the access network device, the R ports are in a one-to-one correspondence with the R transmit beams, the R transmit beams are transmit beams that are generated by the access network device and corresponding to R reference signal resources, and R is an integer greater than or equal to 2; then, the terminal device measures each of the second reference signal resources on the R ports, to obtain second phase information; and the terminal device sends a second message to the access network device, where the second message carries the fourth indication information, and the fourth indication information indicates the second phase information.

In the foregoing solution, the terminal device measures the second phase information of the second reference signal resources on the N ports, and sends the fourth indication information to the access network device, to indicate the second phase information. In a movement process of the terminal device, a channel condition between the access network device and the terminal device keeps changing, and the R ports are respectively corresponding to the R transmit beams of the access network device. Therefore, the second phase information of the second reference signal resources may indicate a channel change status between the access network device and the terminal device. In this way, the access network device may generate, by using the second phase information, a new transmit beam that matches the channel condition between the terminal device and the access network device; or select, from the R transmit beams of the access network device, a transmit beam that matches the channel condition between the terminal device and the access network device, to improve performance of communication between the access network device and the terminal device.

In a possible implementation, the second reference signal resources are used for beam combination, the second phase information is used by the access network device to generate a second transmit beam, and the second transmit beam is used for communication between the access network device and the terminal device.

In this possible implementation, a beam combination process is added based on an existing beam management process, and the terminal device obtains the second phase information through measurement. In this way, the access network device can generate, with reference to the second phase information, the second transmit beam that matches the channel condition between the terminal device and the access network device, to improve performance of communication between the access network device and the terminal device.

In another possible implementation, the second transmit beam does not belong to a transmit beam set, the transmit beam set includes transmit beams that are generated by the access network device and corresponding to M reference signal resources, the M reference signal resources are used for beam management, the M reference signal resources include the R reference signal resources, M is an integer greater than or equal to 2, and M is greater than or equal to R.

In this possible implementation, the second transmit beam does not belong to M transmit beams generated by the access network device, and the M transmit beams are transmit beams with fixed weights generated by the access network device. A main lobe direction of the second transmit beam is directed at the terminal device. In this way, when the access network device and the terminal device perform communication transmission by using a first transmit beam, a beam gain of the second transmit beam can be greatly improved, thereby improving performance of communication between the terminal device and the access network device. In addition, compared with a manner in which the access network device selects a transmit beam from the M transmit beams to perform communication transmission with the terminal device, the method in this embodiment maximizes a channel capacity corresponding to the second transmit beam, and therefore improves a capacity of a channel corresponding to the second transmit beam. The M transmit beams are M transmit beams that are generated by the access network device and that correspond to the M reference signal resources, and the M transmit beams are transmit beams with fixed weights.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In this possible implementation, two forms of content carried in the second phase information are provided. To be specific, the second phase information includes phase differences between the phases respectively corresponding to the second reference signal resources on the R ports, or a phase difference between the second reference phase and each of phases respectively corresponding to the second reference signal resources on the R ports. This manner can adapt to an existing RSRP reporting manner in a beam management process, has a relatively small change to both the terminal device and the access network device, and is relatively practical.

In another possible implementation, the second phase information includes $R*(R-1)$ phase differences, or $R-1$ phase differences, where the $R*(R-1)$ phase differences are phase differences between phases respectively corresponding to the second reference signal resources on the R ports, and the $R-1$ phase differences are phase differences between a second reference phase and the phases respectively corresponding to the second reference signal resources on the R ports.

In another possible implementation, the method further includes: The terminal device measures RSRPs respectively corresponding to the second reference signal resources on the R ports; and the terminal device sends eleventh indication information to the access network device, where the eleventh indication information indicates the RSRPs respectively corresponding to the second reference signal resources on the R ports.

In this possible implementation, the terminal device further sends the RSRPs respectively corresponding to the second reference signal resources on the R ports to the access network device. In this way, the access network device may generate the second transmit beam based on the RSRPs respectively corresponding to the second reference signal resources on the R ports and the second phase information. In other words, the beam combination process is also used to obtain the RSRPs respectively corresponding to the second reference signal resources on the R ports, and the RSRPs corresponding to the R transmit beams may not need to be obtained by using the beam management process.

In another possible implementation, that a terminal device receives second reference signal resources sent by an access network device includes: The terminal device receives, by using a same receive beam, the second reference signal resources sent by the access network device.

In this possible implementation, the access network device generates the second transmit beam through calculation based on the second phase information obtained by the terminal device through measurement by using the same receive beam. Therefore, the receive beam of the terminal device should be limited on the terminal device side, so that the access network device generates the second transmit beam that matches a channel condition between the terminal device and the access network device, thereby improving communication performance of communication between the terminal device and the access network device.

In another possible implementation, before the terminal device receives the second reference signal resources sent by the access network device, the method further includes: The terminal device receives M reference signal resources sent by the access network device, where the M reference signal resources are used for beam management; the terminal device measures each of the M reference signal resources to obtain RSRPs respectively corresponding to R reference signal resources in the M reference signal resources; the terminal device receives the R reference signal resources by using a first receive beam, where both R and M are integers greater than or equal to 2, and M is greater than or equal to R; and the terminal device sends fifth indication information and sixth indication information to the access network device, where the fifth indication information indicates CRIs respectively corresponding to the R reference signal resources, and the sixth indication information indicates the RSRPs respectively corresponding to the R reference signal resources. That the terminal device receives second reference signal resources sent by an access network device includes: The terminal device receives, by using the first receive beam, the second reference signal resources sent by the access network device.

In this possible implementation, the terminal device may report, in a beam management process, the RSRPs respectively corresponding to the R reference signal resources, and the terminal device reports the second phase information in a beam combination process. In this way, the access network device may generate the second transmit beam based on the RSRPs respectively corresponding to the R reference signal resources and the second phase information, and communicate with the terminal device by using the second transmit beam, thereby improving communication performance of communication between the terminal device and the access network device.

In another possible implementation, before the terminal device measures the second reference signal resources to obtain the second phase information, the method further includes: The terminal device receives seventh indication information sent by the access network device; and the terminal device determines, based on the seventh indication information, to measure the phases of the second reference signal resources on the R ports of the access network device, where the R ports are first R ports of P ports that are configured to send the second reference signal resources in the access network device, and P is an integer greater than R.

In this possible implementation, if the access network device configures the terminal device to receive the second reference signal resources on the P ports of the access network device, but the access network device determines, by using the beam management procedure, that R transmit beams in the P transmit beams reported by the terminal device are suitable for the new transmit beam, the access network device may indicate, by using the seventh indication information, the terminal device to measure and report the phases of the second reference signal resources on the R ports of the access network device, so that the access network device generates the second transmit beam, thereby improving feasibility and practicability of the solution.

In another possible implementation, before the terminal device receives the second reference signal resources sent by the access network device, the method further includes: The terminal device sends second capability information of the terminal device to the access network device, where the second capability information carries eighth indication information, the eighth indication information indicates whether the terminal device supports a reference signal sending mode, and the reference signal sending mode is: the access network device sends, through R ports of the access network device by using the R transmit beams, second reference signals corresponding to the second reference signal resources on R symbols that are consecutive in time domain. The R transmit beams are in a one-to-one correspondence with the R ports, and the R ports are in a one-to-one correspondence with the R symbols.

In this possible implementation, the terminal device first reports the second capability information of the terminal device to the access network device, and indicates, by using the eighth indication information carried in the second capability information, whether the terminal device supports the reference signal sending mode. In this way, the access network device can configure a proper resource configuration and a proper reporting manner for the terminal device based on the second capability information, so that the access network device correctly parses a reporting quantity of the terminal device, thereby improving implementability of the solution.

In another possible implementation, the second capability information further carries a maximum quantity of symbols supported by the terminal device, and the maximum quantity of symbols is a maximum quantity of consecutive symbols of reference signals that can be measured by the terminal device.

In this possible implementation, the second capability information may further carry the maximum quantity of consecutive symbols of reference signals that can be measured by the terminal device. In this way, the access network device may configure a proper resource configuration and a proper reporting manner for the terminal device based on the maximum quantity of symbols, to adapt to a reporting capability of the terminal device, thereby providing a basis for implementation of the solution and ensuring feasibility and integrity of the solution.

In another possible implementation, before the terminal device receives the second reference signal resources sent by the access network device, the method further includes: The terminal device receives second configuration information sent by the access network device; and the terminal device determines, based on the second configuration information, that the second reference signal resources are used for beam combination and to report the second phase information of the second reference signal resources on the R ports.

In this possible implementation, the access network device configures a proper resource configuration and a proper reporting manner for the terminal device, and specifically, may send the resource configuration and the reporting manner to the terminal device by using the second configuration information. In this way, the terminal device may determine related information such as the reporting manner based on the second configuration information, to facilitate implementation of the solution.

A seventh aspect of this disclosure provides a communication apparatus. The communication apparatus includes:

a transceiver module, configured to receive M reference signal resources sent by an access network device;

a processing module, configured to measure each of the M reference signal resources to obtain first measurement information, where the first measurement information includes first phase information, the first phase information is phase information obtained by the communication apparatus by measuring each of N reference signal resources in the M reference signal resources, both N and M are integers greater than or equal to 1, and M is greater than or equal to N; and a transceiver module, configured to send first indication information to the access network device, where the first indication information indicates the first phase information.

In a possible implementation, the M reference signal resources are used for beam management, the first phase information is used by the access network device to generate a first transmit beam, and the first transmit beam is used for communication between the access network device and the communication apparatus.

In another possible implementation, the first transmit beam does not belong to a transmit beam set, and the transmit beam set includes transmit beams that are generated by the access network device and that are respectively corresponding to the M reference signal resources.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In another possible implementation, the first measurement information includes N CRIs, N RSRPs, and the first phase information, and the first phase information includes N*(N−1) phase differences, or N−1 phase differences. The N CRIs are CRIs respectively corresponding to the N reference signal resources, and the N RSRPs are RSRPs respectively corresponding to the N reference signal resources. The N*(N−1) phase differences are the phase differences between the phases respectively corresponding to the N reference signal resources, and the N−1 phase differences are phase differences between the first reference phase and the phases respectively corresponding to the N reference signal resources.

In another possible implementation, the N reference signal resources in the M reference signal resources are received by the communication apparatus by using a same receive beam.

In another possible implementation, the transceiver module is further configured to:

send first capability information of the communication apparatus to the access network device, where the first capability information carries second indication information, and the second indication information indicates whether the communication apparatus has a measurement capability of measuring the first phase information required by the access network device to generate the first transmit beam.

In another possible implementation, the second indication information indicates whether the communication apparatus supports measurement of the phase information corresponding to the reference signal resource used for beam management.

In another possible implementation, the first capability information further carries one or more of the following pieces of information: a maximum quantity of transmit beams that are corresponding to reference signal resources used for beam management and that can be combined by the communication apparatus; and information about a quantization capability of quantizing the first phase information by the communication apparatus.

In another possible implementation, the transceiver module is further configured to:

receive first configuration information sent by the access network device; and

The processing module is further configured to:

determine, based on the first configuration information, to report the first phase information of the N reference signal resources.

In another possible implementation, the first configuration information includes second configuration information of a first resource set, the second configuration information includes a repetition field, the repetition field is OFF, and the first resource set includes the M reference signal resources.

In another possible implementation, the first configuration information further includes one or more of the following pieces of information:

third indication information, where the third indication information indicates that the first resource set is used by the access network device to generate the first transmit beam;

reporting granularity information of the first phase information; and size information of each subband when a reporting granularity of the first phase information is a subband reporting granularity.

In another possible implementation, the transceiver module is further configured to:

send twelfth indication information and thirteenth indication information to the access network device, where the twelfth indication information indicates N CRIs corresponding to the N reference signal resources, and the thirteenth indication information indicates RSRPs corresponding to the N reference signal resources.

An eighth aspect of this disclosure provides a communication apparatus. The communication apparatus includes:

a transceiver module, configured to: send M reference signal resources to a terminal device; and receive first indication information sent by the terminal device, where the first indication information indicates first phase information, the first phase information is phase information obtained by the terminal device by measuring N reference signal resources, the M reference signal resources include the N reference signal resources, both N and M are integers greater than or equal to 1, and M is greater than or equal to N; and a processing module, configured to generate a first transmit beam based on the first phase information indicated by the first indication information, where the first transmit beam is used for communication between the communication apparatus and the terminal device.

In a possible implementation, the M reference signal resources are used for beam management.

In another possible implementation, the first transmit beam does not belong to a transmit beam set, and the transmit beam set includes transmit beams that are generated by the communication apparatus and that are respectively corresponding to the M reference signal resources.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In another possible implementation, the first phase information includes N*(N−1) phase differences, or N−1 phase differences. The N*(N−1) phase differences are the phase differences between the phases respectively corresponding to the N reference signal resources, and the N−1 phase differences are phase differences between the first reference phase and the phases respectively corresponding to the N reference signal resources.

In another possible implementation, the N reference signal resources in the M reference signal resources are received by the terminal device by using a same receive beam.

In another possible implementation, the transceiver module is further configured to:

receive first capability information of the terminal device that is sent by the terminal device, where the first capability information carries second indication information, and the second indication information indicates whether the terminal device has a measurement capability of measuring the first phase information required by the communication apparatus to generate the first transmit beam.

The processing module is further configured to:

determine, based on the first capability information, that the terminal device has the measurement capability of measuring the first phase information.

In another possible implementation, the second indication information indicates whether the terminal device supports measurement of the phase information corresponding to the reference signal resource used for beam management.

In another possible implementation, the first capability information further carries one or more of the following pieces of information: a maximum quantity of transmit beams that are corresponding to reference signal resources used for beam management and that can be combined by the terminal device; and information about a quantization capability of quantizing the first phase information by the terminal device.

In another possible implementation, the transceiver module is further configured to:

send first configuration information to the terminal device, where the first configuration information is used for configuring the terminal device to report the first phase information of the N reference signal resources.

In another possible implementation, the first configuration information includes second configuration information of a first resource set, the second configuration information includes a repetition field, the repetition field is OFF, and the first resource set includes the M reference signal resources.

In another possible implementation, the first configuration information further includes one or more of the following pieces of information:

third indication information, where the third indication information indicates that the first resource set is used by the communication apparatus to generate the first transmit beam;

reporting granularity information of the first phase information; and size information of each subband when a reporting granularity of the first phase information is a subband reporting granularity.

In another possible implementation, the transceiver module is further configured to:

receive twelfth indication information and thirteenth indication information that are sent by the terminal device, where the twelfth indication information indicates N CRIs corresponding to the N reference signal resources, and the thirteenth indication information indicates RSRPs corresponding to the N reference signal resources.

The processing module is further configured to:

determine, based on the twelfth indication information and the thirteenth indication information, the RSRPs corresponding to the N reference signal resources.

The processing module is specifically configured to:

generate the first transmit beam based on the first phase information and the RSRPs corresponding to the N reference signal resources.

In another possible implementation, the processing module is specifically configured to:

determine a first synthesis weight based on the first phase information and the RSRPs corresponding to the N reference signal resources; and generate the first transmit beam based on the first synthesis weight and a second weight set, where the second weight set includes weights of N transmit beams corresponding to the N reference signal resources.

A ninth aspect of this disclosure provides a communication apparatus. The communication apparatus includes:

a transceiver module, configured to receive second reference signal resources sent by an access network device, where the second reference signal resources are reference signal resources sent by the access network device on R transmit beams through R ports of the access network device, the R ports are in a one-to-one correspondence with the R transmit beams, the R transmit beams are transmit beams that are generated by the access network device and corresponding to R reference signal resources, and R is an integer greater than or equal to 2; and a processing module, configured to measure the second reference signal resources to obtain second measurement information, where the second measurement information includes second phase information, and the second phase information is phase information obtained by the communication apparatus by measuring each of the second reference signal resources on the R ports; where the transceiver module is configured to send the fourth indication information to the access network device, where the fourth indication information indicates the second phase information.

In a possible implementation, the second reference signal resources are used for beam combination, the second phase information is used by the access network device to generate a second transmit beam, and the second transmit beam is used for communication between the access network device and the communication apparatus.

In another possible implementation, the second transmit beam does not belong to a transmit beam set, the transmit beam set includes transmit beams that are generated by the access network device and corresponding to M reference signal resources, the M reference signal resources are used for beam management, the M reference signal resources include the R reference signal resources, M is an integer greater than or equal to 2, and M is greater than or equal to R.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In another possible implementation, the second measurement information includes RSRPs respectively corresponding to the second reference signal resources on the R ports; the second phase information includes R*(R−1) phase differences or R−1 phase differences. The R*(R−1) phase differences are phase differences between the phases respectively corresponding to the second reference signal resources on the R ports. The R−1 phase differences are phase differences between the second reference phase and the phases respectively corresponding to the second reference signal resources on the R ports.

In another possible implementation, the transceiver module is further configured to:

send eleventh indication information to the access network device, where the eleventh indication information indicates the RSRPs respectively corresponding to the second reference signal resources on the R ports.

In another possible implementation, the transceiver module is specifically configured to:

receive, by using a same receive beam, the second reference signal resources sent by the access network device.

In another possible implementation, the transceiver module is specifically configured to:

receive M reference signal resources sent by the access network device, where the M reference signal resources are used for beam management.

The processing module is further configured to:

measure each of the M reference signal resources to obtain RSRPs respectively corresponding to R reference signal resources in the M reference signal resources, where the communication apparatus receives the R reference signal resources by using a first receive beam, both R and M are integers greater than or equal to 2, and M is greater than or equal to R.

The transceiver module is further configured to:

send fifth indication information and sixth indication information to the access network device, where the fifth indication information indicates CRIs respectively corresponding to the R reference signal resources, and the sixth indication information indicates RSRPs respectively corresponding to the R reference signal resources.

The transceiver module is specifically configured to:

receive, by using the first receive beam, the second reference signal resources sent by the access network device.

In another possible implementation, the transceiver module is further configured to:

receive seventh indication information sent by the access network device.

The processing module is further configured to:

determine, based on the seventh indication information, to measure the phases of the second reference signal resources on the R ports of the access network device, where the R ports are first R ports of P ports that are configured to send the second reference signal resources in the access network device, and P is an integer greater than R.

In another possible implementation, the transceiver module is further configured to:

send second capability information of the communication apparatus to the access network device, where the second capability information carries eighth indication information, the eighth indication information indicates whether the communication apparatus supports a reference signal sending mode, and the reference signal sending mode is: the access network device sends, through R ports of the access network device by using the R transmit beams, second reference signals corresponding to the second reference signal resources on R symbols that are consecutive in time domain, where the R transmit beams are in a one-to-one correspondence with the R ports, and the R ports are in a one-to-one correspondence with the R symbols.

In another possible implementation, the second capability information further carries a maximum quantity of symbols supported by the communication apparatus, and the maximum quantity of symbols is a maximum quantity of consecutive symbols of reference signals that can be measured by the communication apparatus.

In another possible implementation, the transceiver module is further configured to:

receive second configuration information sent by the access network device.

The processing module is further configured to:

determine, based on the second configuration information, that the second reference signal resources are used for beam combination and to report the second phase information of the second reference signal resources on the R ports.

A tenth aspect of this disclosure provides a communication apparatus. The communication apparatus includes:

a transceiver module, configured to send second reference signal resources to a terminal device on R transmit beams through R ports of the communication apparatus, where the R ports are in a one-to-one correspondence with the R transmit beams, the R transmit beams are transmit beams that are generated by the communication apparatus and corresponding to R reference signal resources, and R is an integer greater than or equal to 2; and receive fourth indication information sent by the terminal device, where the fourth indication information indicates second phase information, and the second phase information is phase information obtained by the terminal device by measuring each of the second reference signal resources on the R ports; and a processing module, configured to generate a second transmit beam based on the second phase information indicated by the fourth indication information, where the second transmit beam is used for communication between the communication apparatus and the terminal device.

In a possible implementation, the second reference signal resources are used for beam combination.

In another possible implementation, the second transmit beam does not belong to a transmit beam set, the transmit beam set includes transmit beams that are generated by the communication apparatus and corresponding to M reference signal resources, the M reference signal resources are used for beam management, the M reference signal resources include the R reference signal resources, M is an integer greater than or equal to 2, and M is greater than or equal to R.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In another possible implementation, the transceiver module is further configured to:

receive eleventh indication information, where the eleventh indication information indicates RSRPs respectively corresponding to the second reference signal resources on the R ports, the second phase information includes R*(R−1) phase differences or R−1 phase differences, the R*(R−1) phase differences are phase differences between the phases respectively corresponding to the second reference signal resources on the R ports, and the R−1 phase differences are phase differences between the second reference phase and the phases respectively corresponding to the second reference signal resources on the R ports.

In another possible implementation, the transceiver module is further configured to:

send seventh indication information to the terminal device, where the seventh indication information is used to indicate the terminal device to measure phase information of the second reference signal resources on the R ports, the R ports are first R ports of P ports that are configured to send the second reference signal resources in the communication apparatus, and P is an integer greater than R.

In another possible implementation, the transceiver module is further configured to:

receive second capability information of the terminal device that is sent by the terminal device, where the second capability information carries eighth indication information.

The processing module is further configured to:

determine, based on the eighth indication information, whether the terminal device supports a reference signal sending mode, where the reference signal sending mode is: the communication apparatus sends, through R ports of the communication apparatus by using the R transmit beams, second reference signals corresponding to the second reference signal resources on R symbols that are consecutive in time domain, where the R transmit beams are in a one-to-one correspondence with the R ports, and the R ports are in a one-to-one correspondence with the R symbols.

In another possible implementation, the second capability information further carries a maximum quantity of symbols supported by the terminal device, and the maximum quantity of symbols is a maximum quantity of consecutive symbols of reference signals that can be measured by the terminal device.

In another possible implementation, the transceiver module is further configured to:

send second configuration information to the terminal device, where the second configuration information is used to configure the second reference signal resources to be used for beam combination, and configure the terminal device to report the second phase information of the second reference signal resources on the R ports.

In another possible implementation, the transceiver module is further configured to:

send M reference signal resources to the terminal device, where the M reference signal resources are used for beam management; and receive a third message sent by the terminal device, where the third message carries fifth indication information and sixth indication information, the fifth indication information indicates CRIs respectively corresponding to the R reference signal resources, the sixth indication information indicates RSRPs respectively corresponding to the R reference signal resources, and the R reference signal resources are in a one-to-one correspondence with the R transmit beams.

The processing module is further configured to:

determine, based on the third message, the RSRPs respectively corresponding to the R reference signal resources.

The processing module is specifically configured to:

generate the second transmit beam based on the second phase information and the RSRPs respectively corresponding to the R reference signal resources.

In another possible implementation, the processing module is specifically configured to:

generate a second synthesis weight based on the second phase information and the RSRPs respectively corresponding to the R reference signal resources; and generate the second transmit beam based on the second synthesis weight and a third weight set, where the third weight set includes weights of the R transmit beams corresponding to the R reference signal resources.

An eleventh aspect of this disclosure provides a communication apparatus. The communication apparatus includes:

a transceiver module, configured to receive M reference signal resources sent by an access network device; and a processing module, configured to measure N reference signal resources in the M reference signal resources, to obtain first phase information, where both N and M are integers greater than or equal to 1, and M is greater than or equal to N; where the transceiver module is further configured to send first indication information to the access network device, where the first indication information indicates the first phase information.

In a possible implementation, the M reference signal resources are used for beam management, the first phase information is used by the access network device to generate a first transmit beam, and the first transmit beam is used for communication between the access network device and the communication apparatus.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In another possible implementation, the processing module is further configured to:

measure RSRPs respectively corresponding to the N reference signal resources.

In another possible implementation, the first phase information includes N*(N−1) phase differences or N−1 phase differences. The N CRIs are CRIs respectively corresponding to the N reference signal resources, and the N RSRPs are RSRPs respectively corresponding to the N reference signal resources. The N*(N−1) phase differences are phase differences between the phases respectively corresponding to the N reference signal resources, and the N−1 phase differences are phase differences between the first reference phase and the phases respectively corresponding to the N reference signal resources.

In another possible implementation, the N reference signal resources in the M reference signal resources are received by the communication apparatus by using a same receive beam.

In another possible implementation, the transceiver module is further configured to: send first capability information of the communication apparatus to the access network device, where the first capability information carries second indication information, and the second indication information indicates whether the communication apparatus has a measurement capability of measuring the first phase information required by the access network device to generate the first transmit beam.

In another possible implementation, the second indication information indicates whether the communication apparatus supports measurement of the phase information corresponding to the reference signal resource used for beam management.

In another possible implementation, the first capability information further carries one or more of the following pieces of information: a maximum quantity of transmit beams that are corresponding to reference signal resources used for beam management and that can be combined by the communication apparatus; and information about a quantization capability of quantizing the first phase information by the communication apparatus.

In another possible implementation, the transceiver module is further configured to:

receive first configuration information sent by the access network device.

The processing module is further configured to:

determine, based on the first configuration information, to report the first phase information of the N reference signal resources.

In another possible implementation, the first configuration information includes second configuration information of a first resource set, the second configuration information includes a repetition field, the repetition field is OFF, and the first resource set includes the M reference signal resources.

In another possible implementation, the first configuration information further includes one or more of the following pieces of information:

third indication information, where the third indication information indicates that the first resource set is used by the access network device to generate the first transmit beam;

reporting granularity information of the first phase information; and size information of each subband when a reporting granularity of the first phase information is a subband reporting granularity.

In another possible implementation, the transceiver module is further configured to: send twelfth indication information and thirteenth indication information to the access network device, where the twelfth indication information indicates N CRIs corresponding to the N reference signal resources, and the thirteenth indication information indicates RSRPs corresponding to the N reference signal resources.

A twelfth aspect of this disclosure provides a communication apparatus. The communication apparatus includes:

a transceiver module, configured to receive second reference signal resources sent by an access network device, where the second reference signal resources are reference signal resources sent by the access network device on R transmit beams through R ports of the access network device, the R ports are in a one-to-one correspondence with the R transmit beams, the R transmit beams are transmit beams that are generated by the access network device and corresponding to R reference signal resources, and R is an integer greater than or equal to 2; and a processing module, configured to measure each of the second reference signal resources on the R ports, to obtain second phase information; where the transceiver module is further configured to send a second message to the access network device, where the second message carries the fourth indication information, and the fourth indication information indicates the second phase information.

In a possible implementation, the second reference signal resources are used for beam combination, the second phase information is used by the access network device to generate a second transmit beam, and the second transmit beam is used for communication between the access network device and the communication apparatus.

In another possible implementation, the second transmit beam does not belong to a transmit beam set, the transmit beam set includes transmit beams that are generated by the access network device and corresponding to M reference signal resources, the M reference signal resources are used for beam management, the M reference signal resources include the R reference signal resources, M is an integer greater than or equal to 2, and M is greater than or equal to R.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In another possible implementation, the second phase information includes R*(R−1) phase differences, or R−1 phase differences, where the R*(R−1) phase differences are phase differences between phases respectively corresponding to the second reference signal resources on the R ports, and the R−1 phase differences are phase differences between a second reference phase and the phases respectively corresponding to the second reference signal resources on the R ports.

In another possible implementation, the processing module is further configured to:

measure RSRPs respectively corresponding to the second reference signal resources on the R ports.

The transceiver module is further configured to:

send eleventh indication information to the access network device, where the eleventh indication information indicates the RSRPs respectively corresponding to the second reference signal resources on the R ports.

In another possible implementation, the transceiver module is specifically configured to:

receive, by using a same receive beam, the second reference signal resources sent by the access network device.

In another possible implementation, the transceiver module is further configured to: receive M reference signal resources sent by the access network device, where the M reference signal resources are used for beam management.

The processing module is further configured to:

measure each of the M reference signal resources to obtain RSRPs respectively corresponding to R reference signal resources in the M reference signal resources, where the communication apparatus receives the R reference signal resources by using a first receive beam, both R and M are integers greater than or equal to 2, and M is greater than or equal to R.

The transceiver module is further configured to:

send fifth indication information and sixth indication information to the access network device, where the fifth indication information indicates CRIs respectively corresponding to the R reference signal resources, and the sixth indication information indicates RSRPs respectively corresponding to the R reference signal resources.

The transceiver module is specifically configured to:

receive, by using the first receive beam, the second reference signal resources sent by the access network device.

In another possible implementation, the transceiver module is further configured to:

receive seventh indication information sent by the access network device.

The processing module is further configured to:

determine, based on the seventh indication information, to measure the phases of the second reference signal resources on the R ports of the access network device, where the R ports are first R ports of P ports that are configured to send the second reference signal resources in the access network device, and P is an integer greater than R.

In another possible implementation, the transceiver module is further configured to:

send second capability information of the communication apparatus to the access network device, where the second capability information carries eighth indication information, the eighth indication information indicates whether the communication apparatus supports a reference signal sending mode, and the reference signal sending mode is: the access network device sends, through R ports of the access network device by using the R transmit beams, second reference signals corresponding to the second reference signal resources on R symbols that are consecutive in time domain, where the R transmit beams are in a one-to-one correspondence with the R ports, and the R ports are in a one-to-one correspondence with the R symbols.

In another possible implementation, the second capability information further carries a maximum quantity of symbols supported by the communication apparatus, and the maximum quantity of symbols is a maximum quantity of consecutive symbols of reference signals that can be measured by the communication apparatus.

In another possible implementation, the transceiver module is further configured to:

receive second configuration information sent by the access network device.

The processing module is further configured to:

determine, based on the second configuration information, that the second reference signal resources are used for beam combination and to report the second phase information of the second reference signal resources on the R ports.

A thirteenth aspect of this disclosure provides a communication apparatus. The communication apparatus includes a processor and a memory. The memory stores a computer program or computer instructions, and the processor is further configured to invoke and run the computer program or the computer instructions stored in the memory, so that the processor implements any implementation of the first aspect.

Optionally, the communication apparatus further includes a transceiver, and the processor is configured to control the transceiver to receive and send a signal.

A fourteenth aspect of this disclosure provides a communication apparatus, and the communication apparatus includes a processor and a memory. The memory stores a computer program or computer instructions, and the processor is configured to invoke and run the computer program or the computer instructions stored in the memory, so that the processor implements any implementation of the second aspect.

Optionally, the communication apparatus further includes a transceiver, and the processor is configured to control the transceiver to receive and send a signal.

A fifteenth aspect of this disclosure provides a communication apparatus, and the communication apparatus includes a processor and a memory. The memory stores a computer program or computer instructions, and the processor is further configured to invoke and run the computer program or the computer instructions stored in the memory, so that the processor implements any implementation of the third aspect.

Optionally, the communication apparatus further includes a transceiver, and the processor is configured to control the transceiver to receive and send a signal.

A sixteenth aspect of this disclosure provides a communication apparatus, and the communication apparatus includes a processor and a memory. The memory stores a computer program or computer instructions, and the processor is further configured to invoke and run the computer program or the computer instructions stored in the memory, so that the processor implements any implementation of the fourth aspect.

Optionally, the communication apparatus further includes a transceiver, and the processor is configured to control the transceiver to receive and send a signal.

A seventeenth aspect of this disclosure provides a communication apparatus, and the communication apparatus includes a processor and a memory. The memory stores a computer program or computer instructions, and the processor is configured to invoke and run the computer program or the computer instructions stored in the memory, so that the processor implements any implementation of the fifth aspect.

Optionally, the communication apparatus further includes a transceiver, and the processor is configured to control the transceiver to receive and send a signal.

An eighteenth aspect of this disclosure provides a communication apparatus, where the communication apparatus includes a processor and a memory, the memory stores a computer program or computer instructions, and the processor is further configured to invoke and run the computer program or the computer instructions stored in the memory, so that the processor implements any implementation of the sixth aspect.

Optionally, the communication apparatus further includes a transceiver, and the processor is configured to control the transceiver to receive and send a signal.

A nineteenth aspect of this disclosure provides a computer program product including instructions, where when the computer program product is run on a computer, the computer is enabled to perform any one of the implementations of the first aspect, the second aspect, the third aspect, the fourth aspect, the fifth aspect, and the sixth aspect.

A twentieth aspect of this disclosure provides a computer-readable storage medium, including computer instructions. When the instructions are run on a computer, the computer is enabled to perform any one of the implementations of the first aspect, the second aspect, the third aspect, the fourth aspect, the fifth aspect, and the sixth aspect.

According to a twenty-first aspect of this disclosure, a chip apparatus is provided, including a processor, configured to invoke a computer program or computer instructions in the memory, so that the processor performs any one of the implementations of the first aspect, the second aspect, the third aspect, the fourth aspect, the fifth aspect, and the sixth aspect.

Optionally, the processor is coupled to the memory by using an interface.

A twenty-second aspect of this disclosure provides a communication system, where the communication system includes the communication apparatus according to the seventh aspect and the communication apparatus according to the eighth aspect.

A twenty-third aspect of this disclosure provides a communication system, where the communication system includes the communication apparatus according to the ninth aspect and the communication apparatus according to the tenth aspect.

It can be learned from the foregoing technical solution that, the terminal device receives the M reference signal resources sent by the access network device; and then the terminal device measures each of the M reference signal resources to obtain the first measurement information, where the first measurement information includes first phase information, the first phase information is phase information obtained by the terminal device by separately measuring the N reference signal resources, the M reference signal resources include N reference signal resources, both N and M are integers greater than or equal to 1, and M is greater than or equal to N. Then, the terminal device sends a first message to the access network device, where the first message carries the first indication information, and the first indication information indicates the first phase information. It can be learned that in the technical solution of this embodiment of this disclosure, the terminal device measures the first phase information of the N reference signal resources, and sends the first indication information to the access network device, to indicate the first phase information. In a movement process of the terminal device, a channel condition between the access network device and the terminal device keeps changing, and the N reference signal resources are respectively corresponding to the N transmit beams of the access network device. Therefore, the first phase information of the N reference signal resources may indicate a channel change status between the access network device and the terminal device. In this way, the access network device may generate, by using the first phase information, a new transmit beam that matches the channel condition between the terminal device and the access network device; or select, from the N transmit beams of the access network device, a transmit beam that matches the channel condition between the terminal device and the access network device, to improve performance of communication between the access network device and the terminal device.

DESCRIPTION OF EMBODIMENTS

To make objectives, technical solutions, and advantages of this disclosure clearer, the following further describes this disclosure with reference to the accompanying drawings. An "embodiment" mentioned in this specification means that a particular feature, structure, or characteristic described with reference to this embodiment may be included in at least one embodiment of this disclosure. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

The term "and/or" in embodiments of this application describes only an association relationship for describing associated objects and represents that three relationships may exist. For example, A and/or B may represent the following three cases: Only A exists, both A and B exist, and only B exists.

The following describes some terms in this disclosure.

Beam (beam): The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams having a same communication feature or similar communication features may be considered as one beam. One beam may include one or more antenna ports, configured to transmit a data channel, a control channel, a sounding signal, and the like. For example, a transmit beam may refer to distribution of signal strength formed in different directions in space after a signal is transmitted out through an antenna. A receive beam may refer to signal strength distribution in different directions in space of a radio signal received through an antenna. It can be understood that the one or more antenna ports forming the beam may alternatively be considered as one antenna port set. In a protocol, the beam may also be represented as a spatial filter (spatial filter).

Transmission configuration index state (TCI state): In 3GPP Release 15 (R15), for each physical channel or physical signal, a network may perform beam indication for a terminal device by using different pieces of signaling, to indicate the terminal device to receive a downlink physical channel or physical signal, and indicate, to the terminal device, how to send an uplink physical channel or physical signal. The R15 downlink beam indication is implemented through a TCI.

Figure 1:
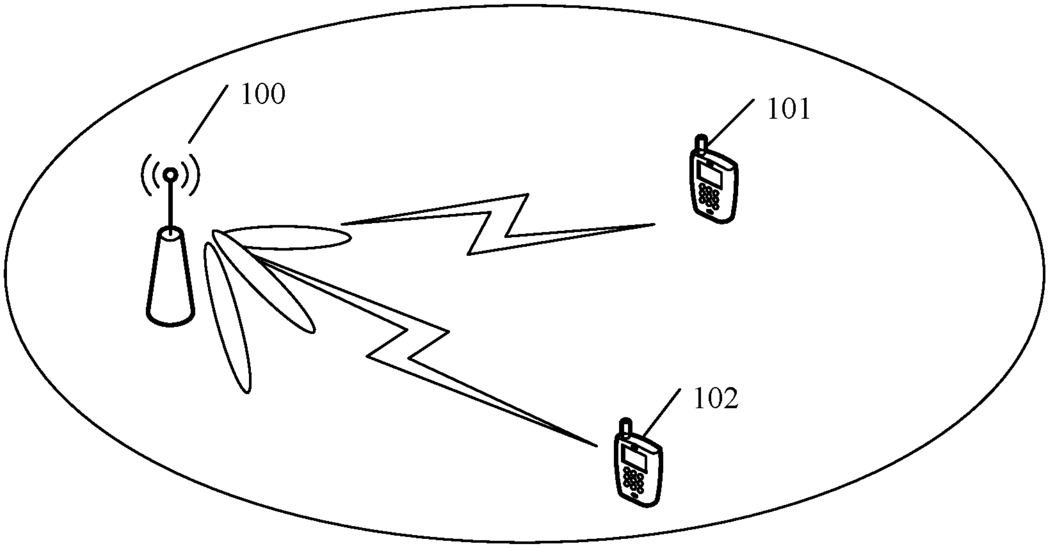
FIG. 1 is a schematic diagram of a communication system according to an embodiment of this disclosure.

FIG. 1 is a schematic diagram of a communication system according to an embodiment of this disclosure. The communication system includes one or more access network devices 100 (only one is shown in FIG. 1) and one or more terminal devices (the two terminal devices shown in FIG. 1 are respectively a terminal device 101 and a terminal device 102). The access network device 100 is separately connected to the one or more terminal devices.

The access network device 100 is a device that has a wireless transceiver function, and is configured to communicate with the terminal device 101. The access network device 100 includes but is not limited to a base station, and the base station includes various forms of macro base stations, micro base stations, relay stations, and access network points. For example, the base station in the embodiments of this disclosure may be a base station in a new radio ( ), a transmission reception point (TRP), a transmission point (TP), a small cell, a next generation nodeB (ngNB), an access node in a Wi-Fi system, a wireless relay node, or a wireless backhaul node, or may be an evolved Node-B (eNB or eNodeB) in a long term evolution (LTE) system, or a radio controller in a cloud radio access Network (CRAN) scenario. The access network device 100 may alternatively be a wearable device, an in-vehicle device, or the like.

The terminal device may be referred to as user equipment (UE), an access terminal, a subscriber unit, a subscriber station, a mobile station (MS), a mobile console, a remote terminal, a mobile device, a user terminal, a terminal, a wireless communication device, a user apparatus, or the like. The terminal device may be a cellular phone (cellular phone), a smart phone (smart phone), a wireless data card, a personal digital assistant (PDA) computer, a tablet computer, a wireless modem (modem), a laptop computer (laptop computer), a machine type communication (MTC), various handheld devices (handset) with a wireless communication function, a computer device, an in-vehicle device, a wearable device, a computing device, another processing device connected to a wireless modem, a terminal device in a 5G communication system, a terminal device in an NR system, or a terminal device in a communication system after a 5G network, for example, a terminal device in a future evolved public land mobile network (PLMN).

To improve performance of communication between the access network device and the terminal device, the terminal device may report channel information to the access network device, and the channel information is used to represent a channel condition between the terminal device and the access network device. In this way, the access network device may generate, based on the channel information, a transmit beam that matches the channel condition, thereby improving performance of communication between the access network device and the terminal device.

Therefore, in embodiments of this disclosure, that the access network device generates a transmit beam that matches the channel condition may evolve from beam management to beam calculation. In embodiments of this disclosure, an example in which amplitude information (for example, signal quality of a reference signal) of a reference signal and phase information of the reference signal reflect the channel condition is used for description. In an actual disclosure, the channel condition may alternatively be represented by using another parameter. For example, one or more of the following parameters may be further included: a delay spread (delay spread), a doppler spread (doppler spread), a doppler shift (doppler shift), an average delay (average delay), an average gain, and a spatial reception parameter (spatial Rx parameters). The spatial receive parameter includes one or more of the following: an angle of arrival (AOA), an average AOA, an AOA spread, an angle of departure (AOD), an average angle of departure AOD, an AOD spread, a receive antenna spatial correlation parameter, and a transmit antenna spatial correlation parameter.

The following shows two possible implementations provided in the embodiments of this disclosure.

1. In the beam management procedure, when reporting amplitude information of N reference signals to the access network device, the terminal device also reports, to the access network device, first phase information obtained by the terminal device by measuring the N reference signals. Then, the access network device generates a first transmit beam based on the first phase information and the amplitude information of the N reference signals. For details, refer to related descriptions of the embodiment shown in FIG. 2A.

2. In embodiments of this disclosure, a beam combination procedure is added, and the beam combination procedure may be performed after a beam management procedure. The terminal device measures, in a beam combination procedure, second phase information of second reference signal resources sent by the access network device through R ports of the access network device, and reports the second phase information to the access network device. Then, the access network device generates a second transmit beam based on the second phase information and amplitude information of reference signals. The amplitude information of reference signals may be amplitude information of reference signals of the second reference signal resources on the R ports, or amplitude information of N reference signals that is measured and reported by the terminal device in a beam management process. For details, refer to related descriptions of the embodiment shown in FIG. 3A.

In embodiments of this disclosure, signal quality of the reference signal includes a plurality of types, for example, RSRP, RSRQ, and signal to interference plus noise ratio (SINR). That is, the signal quality of the reference signal may be represented by using at least one of the RSRP, the RSRQ, and the SINR. In the following embodiments, an example in which the RSRP of the reference signal is used to represent the signal quality of the reference signal is used for description. Other parameters are also applicable.

The following describes the communication processing method in embodiments of this disclosure with reference to embodiments.

Figure 2A:
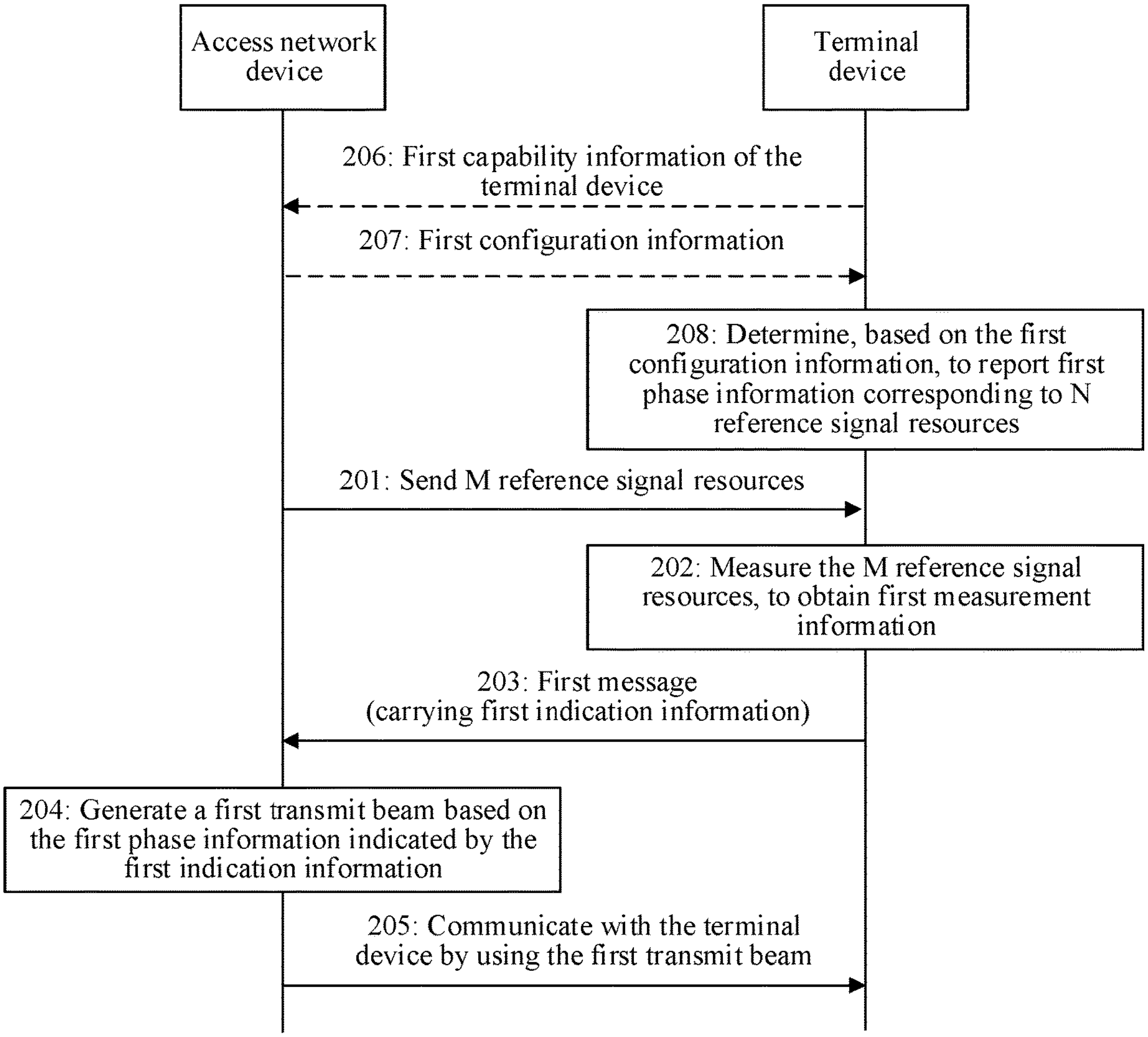
FIG. 2A is a schematic diagram of an embodiment of a communication processing method according to an embodiment of this disclosure.

FIG. 2A is a schematic diagram of an embodiment of a communication processing method according to an embodiment of this disclosure. In FIG. 2A, the method includes the following steps.

201: An access network device sends M reference signal resources to a terminal device. Correspondingly, the terminal device receives the M reference signal resources sent by the access network device.

Step 201 is specifically: The access network device sends M reference signals to the terminal device based on a configuration of the M reference signal resources, and correspondingly the terminal device receives, based on the configuration of the M reference signal resources, the M reference signals sent by the access network device.

It may be understood that, in this embodiment of this disclosure, the following description manner 1 and description manner 2 are equivalent.

Description manner 1: The access network device sends the M reference signal resources to the terminal device.

Description manner 2: The access network device sends the M reference signals to the terminal device based on the configuration of the M reference signal resources.

Similarly, the following description manner 3 and description manner 4 are equivalent.

Description manner 3: The terminal device receives the M reference signal resources sent by the access network device.

Description manner 4: The terminal device receives, based on the configuration of the M reference signal resources, the M reference signals sent by the access network device.

In this embodiment, each of the M reference signal resources corresponds to one transmit beam, and different reference signal resources correspond to same or different transmit beams. It should be noted that the transmit beams respectively corresponding to the M reference signal resources should include at least two different transmit beams.

Optionally, the M reference signal resources are in a one-to-one correspondence with M transmit beams. To be specific, each reference signal resource corresponds to a transmit beam, and different reference signal resources correspond to different transmit beams.

The M transmit beams are transmit beams that are generated by the access network device and that are respectively corresponding to the M reference signal resources, and the M transmit beams are fixed-weight transmit beams. A fixed-weight transmit beam is also referred to as a fixed (fixed or static) analog transmit beam, a fixed-pattern (pattern) analog transmit beam, a fixed-codebook (codebook) analog transmit beam, or a basic (basic) analog transmit beam. Codebook may also be referred to as weight (weight vector or weight matrix). Therefore, the M transmit beams described below are referred to as fixed-weight transmit beams.

Fixed pattern (pattern) means that a quantity of analog transmit beams that can be generated by a device, a direction of a main lobe, a beam width, a beam gain, and other characteristic parameters of each analog transmit beam are fixed, and the characteristic parameters do not change with time.

Specifically, the access network device sends M reference signals by using the M reference signal resources and the M transmit beams respectively. The M reference signal resources are in a one-to-one correspondence with the M reference signals, and the M reference signal resources are in a one-to-one correspondence with the M transmit beams. Then, the terminal device receives the M reference signals by using the M reference signal resources respectively.

Optionally, the M reference signals are M CSI-RSs, and the M reference signal resources are CSI-RS resources.

In this embodiment, in a possible implementation, the M reference signal resources are used for beam management. According to the communications standard TS 38.214, only a 1-port (port) or 2-port single-symbol (symbol) CSI-RS resource whose frequency density (density) is 1 or 3 can be used for beam management. The following describes, by using a 1-port single-symbol CSI-RS resource whose frequency density is 3 as an example, a process in which the access network device sends a CSI-RS corresponding to the CSI-RS resource.

Figure 2B:
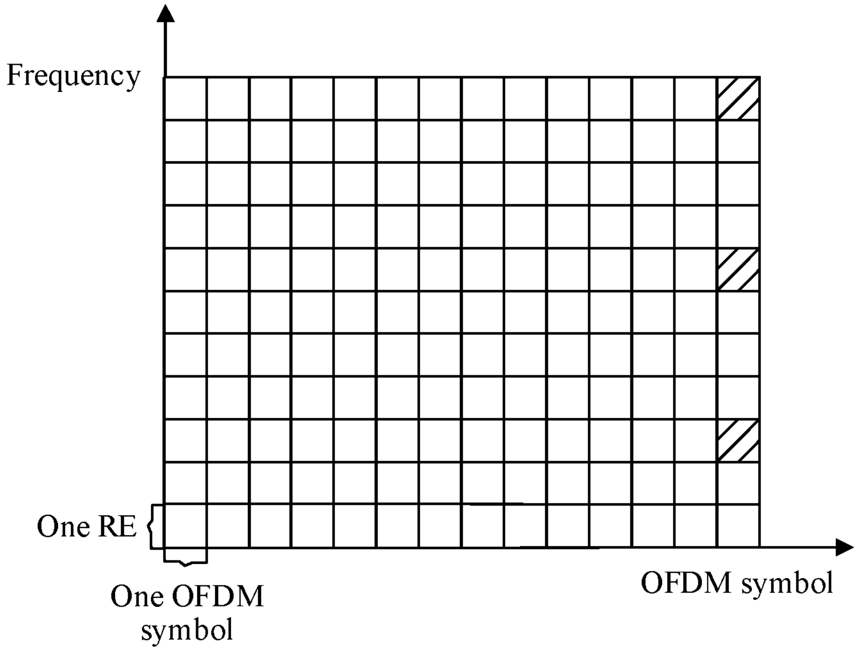
FIG. 2B is a schematic diagram of a channel state information reference signal (CSI-RS) resource according to an embodiment of this disclosure.

For example, as shown in FIG. 2B, a horizontal coordinate indicates an orthogonal frequency division multiplexing (OFDM) symbol, and a vertical coordinate indicates a frequency in a granularity of a resource element ( ). As shown in FIG. 2B, three REs included in one resource block (RB) in one slot (slot) are occupied by one CSI-RS resource, that is, it may be understood that a location of the CSI-RS resource in an RB is a shadow part (three REs in the RB) shown in FIG. 2B, and a quantity of RBs occupied by the CSI-RS resource is specifically configured by the access network device. In addition, each CSI-RS resource has a corresponding transmit beam, and different CSI-RS resources correspond to different transmit beams.

If the access network device generates 16 transmit beams, and the 16 transmit beams are fixed-weight transmit beams, the access network device may send 16 CSI-RSs by using 16 slots and the 16 transmit beams respectively. The 16 CSI-RS resources are respectively located in the 16 slots, the 16 CSI-RS resources are in a one-to-one correspondence with the 16 transmit beams, and the 16 CSI-RSs are in a one-to-one correspondence with the 16 CSI-RS resources, so that the terminal device measures the 16 CSI-RSs.

Figure 2C:
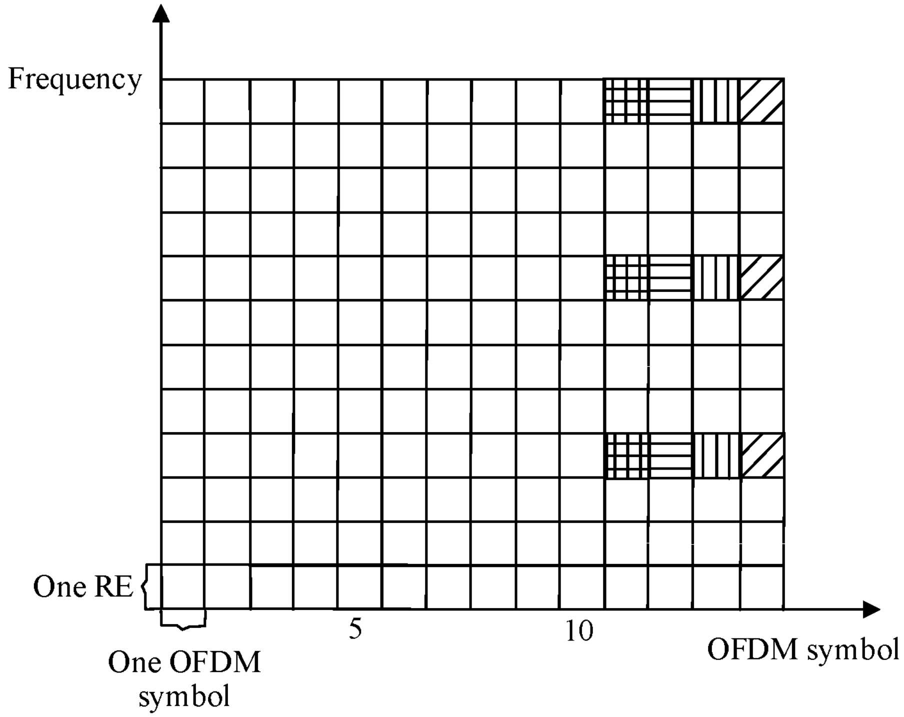
FIG. 2C is another schematic diagram of a CSI-RS resource according to an embodiment of this disclosure.

For example, as shown in FIG. 2C, a horizontal coordinate indicates an OFDM symbol, and a vertical coordinate indicates a frequency in a granularity of an RE. As shown in FIG. 2C, four CSI-RS resources may be sent in one slot. Each CSI-RS resource occupies three REs included in one RB in one slot. Specifically, as shown in FIG. 2C, shadow parts of each of different types indicate three REs of a different RB that are occupied by each of different CSI-RS resources, and a quantity of RBs occupied by each CSI-RS resource is specifically configured by the access network device. In addition, each CSI-RS resource has a corresponding transmit beam, and different CSI-RS resources correspond to different transmit beams.

If the access network device generates 16 transmit beams, and the 16 transmit beams are fixed-weight transmit beams, the access network device may send 16 CSI-RSs by using four slots. 16 CSI-RS resources are correspondingly located in the four slots, the 16 CSI-RS resources are in a one-to-one correspondence with 16 transmit beams, and the 16 CSI-RSs are in a one-to-one correspondence with the 16 CSI-RS resources, so that the terminal device measures the 16 CSI-RSs.

In this embodiment, the access network device may send the 16 CSI-RSs periodically, semi-persistently, or aperiodically. For example, the access network device sends the 16 CSI-RSs based on a resource configurations of the 16 CSI-RSs at intervals of one periodicity (for example, 20 ms).

202: The terminal device measures the M reference signal resources, to obtain first measurement information.

The first measurement information includes first phase information. The first phase information is phase information obtained by the terminal device by measuring N reference signal resources. The M reference signal resources include the N reference signal resources, both N and M are integers greater than or equal to 1, and M is greater than or equal to N.

Step 202 is specifically: The terminal device measures M reference signals corresponding to the M reference signal resources, to obtain the first measurement information. In other words, it may be understood that, that the terminal device measures the M reference resources to obtain the first measurement information is equivalent to that the terminal device measures the M reference signals corresponding to the M reference signal resources to obtain the first measurement information.

In a possible implementation, the terminal device measures the M reference signals corresponding to the M reference signal resources, to obtain RSRPs of the M reference signals; and then the terminal device selects the N reference signals from the M reference signals. The terminal device measures the N reference signals, to obtain the first phase information of the N reference signals.

In another possible implementation, the terminal device measures the M reference signals corresponding to the M reference signal resources, to obtain RSRPs of the M reference signals and phase information of the M reference signals; and then the terminal device selects RSRPs of the N reference signals and the first phase information of the N reference signals from the RSRPs of the M reference signals and the phase information of the M reference signals.

In either of the foregoing two possible implementations, the terminal device may obtain the first measurement information, where the first measurement information includes the RSRPs of the N reference signals, CRIs of the N reference signals, and the first phase information.

In this embodiment, to enable the access network device to generate a first transmit beam that matches a channel condition between the terminal device and the access network device and maximize a channel capacity corresponding to the first transmit beam, when the terminal device selects the N reference signals from the M reference signals, a channel capacity formed by the N transmit beams corresponding to the selected N reference signals needs to be the largest or a rank (rank) of a channel formed by the N transmit beams needs to be the highest.

Specifically, the access network device sends the M reference signals on the M reference signal resources by using the M transmit beams respectively. The M reference signal resources are in a one-to-one correspondence with the M transmit beams generated by the access network device, and the M transmit beams are fixed-weight transmit beams. Because the RSRPs of the M reference signals may reflect beam quality of the M transmit beams, the terminal device may select the N reference signals from the M reference signals in descending order of RSRP values, so that a channel capacity formed by the N transmit beams corresponding to the N reference signals is maximized.

It should be noted that the access network device may configure the terminal device to report the RSRPs and the first phase information that are corresponding to the N reference signals, or a communications protocol may specify that the terminal device reports the RSRPs and the first phase information that are corresponding to the N reference signals. This is not specifically limited in this disclosure.

In this embodiment, a form of content included in the first phase information is a phase of a reference signal, or a phase difference between different reference signals.

1. For a manner in which the first phase information includes a phase of a reference signal, the first phase information includes phases of the N reference signals corresponding to the N reference signal resources.

The terminal device measures the phases of the N reference signals, and then the terminal device reports the phases of the N reference signals to the access network device by using indication information, or the terminal device directly reports the phases of the N reference signals to the access network device.

Because parameters required by the access network device to generate the first transmit beam in subsequent step 204 include phase differences between the N reference signals, the access network device obtains the phase differences between the N reference signals through calculation based on the phases of the N reference signals.

Figure 2D:
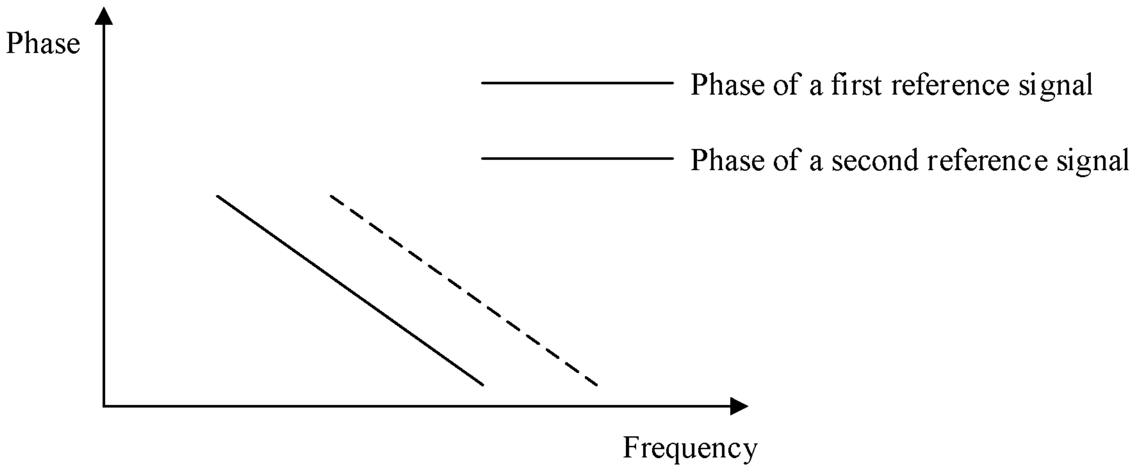
FIG. 2D is a schematic diagram of a phase of a first reference signal and a phase of a second reference signal according to an embodiment of this disclosure.

As shown in FIG. 2D, the N reference signals include a first reference signal and a second reference signal. FIG. 2D shows changes of a phase of the first reference signal and a phase of the second reference signal with a change of a frequency. It can be learned that a phase of a reference signal is related to a frequency used to send the reference signal. Therefore, if the terminal device needs to correctly reflect phase information of the N reference signals, the terminal device needs to feed back, for different frequencies of the N reference signal resources, phases respectively corresponding to the N reference signals at the different frequencies. Optionally, the terminal device may feed back initial frequencies of the N reference signals and initial phases respectively corresponding to the N reference signals at the initial frequencies, and changes of the phases respectively corresponding to the N reference signals as the frequencies change (that is, slopes corresponding to linear relationships between the phases of the reference signals and the frequencies), to feed back phases respectively corresponding to the N reference signals at different frequencies.

2. For a manner in which the first phase information includes phase differences between different reference signals, the first phase information specifically includes either of the following:

1. Phase differences between the phases respectively corresponding to the N reference signal resources Specifically, the first phase information includes phase differences between phases respectively corresponding to the N reference signals corresponding to the N reference signal resources. In this implementation, the first phase information specifically includes N*(N−1) phase differences.

For example, the N reference signal resources include a reference signal resource 1, a reference signal resource 2, and a reference signal resource 3, the reference signal resource 1 corresponds to a phase 1, the reference signal resource 2 corresponds to a phase 2, and the reference signal resource 3 corresponds to a phase 3. It can be learned that the first phase information includes phase differences between the phase 1 and the phase 2, phase differences between the phase 2 and the phase 3, and phase differences between the phase 1 and the phase 3.

2. Phase differences between a first reference phase and the phases respectively corresponding to the N reference signal resources Specifically, the first phase information includes phase differences between the first reference phase and the phases respectively corresponding to the N reference signals corresponding to the N reference signal resources. In this implementation, the first phase information specifically includes N−1 phase differences.

In this embodiment, the terminal device obtains the first phase information through measurement in a beam management procedure (specifically, the terminal device measures another reference signal other than a reference signal corresponding to the first reference phase in the N reference signals, to obtain a phase difference between a phase of the another reference signal and the first reference phase). Therefore, in addition to the first phase information, the first measurement information further includes N CRIs corresponding to the N reference signal resources and RSRPs of the N reference signal resources (that is, RSRPs of the N reference signals corresponding to the N reference signal resources).

Optionally, the first reference phase includes any one of the following possible forms:

1. The first reference phase is a phase corresponding to a reference signal resource whose RSRP is the largest in the N reference signal resources.

Specifically, the first reference phase is a phase of a reference signal with a largest RSRP in the N reference signals corresponding to the N reference signal resources.

In the beam management procedure, when the terminal device reports the RSRPs, the largest RSRP in the reported RSRPs is used as a reference RSRP. Therefore, the terminal device may use the phase of the reference signal with the largest RSRP as the first reference phase, to adapt to an RSRP reporting mechanism in the beam management procedure.

2. The first reference phase is a phase corresponding to a reference signal resource whose RSRP is the smallest in the N reference signal resources.

Specifically, the first reference phase is a phase of a reference signal with a smallest RSRP in the N reference signals corresponding to the N reference signal resources.

3. The first reference phase is a phase corresponding to a reference signal resource whose RSRP is greater than or equal to a first preset threshold in the N reference signal resources.

Specifically, the first reference phase is a phase of a reference signal whose RSRP is greater than or equal to the first preset threshold in the N reference signals corresponding to the N reference signal resources.

Optionally, a value of the first preset threshold is −140 dBm (decibel-milliwatts), −116 dBm, −108 dBm, or the like.

Factors in setting the value of the first preset threshold include: receiver sensitivity of the terminal device, signal strength required for supporting a lowest modulation and coding scheme, signal strength required for supporting a lowest transmission rate, a channel status between the terminal device and the access network device, a current network transmission condition, and the like.

4. The first reference phase is a phase corresponding to a reference signal resource that is first sent by the access network device in the N reference signal resources.

Specifically, the first reference phase is a phase corresponding to a reference signal that is first sent by the access network device in the N reference signals corresponding to the N reference signal resources.

As shown in FIG. 2C, if the N reference signal resources include four CSI-RS resources, and the four CSI-RS resources respectively correspond to time-frequency resources of four types of shadow parts in FIG. 2C, the access network device respectively sends four CSI-RSs on the time-frequency resources of the shadow parts in FIG. 2C. As shown in FIG. 2C, if the access network device first sends a CSI-RS carried on the eleventh OFDM symbol, the access network device uses a phase of the CSI-RS as the first reference phase.

5. The first reference phase is a phase corresponding to a reference signal resource last sent by the access network device in the N reference signal resources.

Specifically, the first reference phase is a phase corresponding to a reference signal last sent by the access network device in the N reference signals corresponding to the N reference signal resources.

As shown in FIG. 2C, if the N reference signal resources include four CSI-RS resources, and the four CSI-RS resources respectively correspond to time-frequency resources of four types of shadow parts in FIG. 2C, the access network device respectively sends four CSI-RSs on the time-frequency resources of the shadow parts in FIG. 2C. As shown in FIG. 2C, if the access network device last sends a CSI-RS carried on the fourteenth OFDM symbol, the access network device uses a phase of the CSI-RS as the first reference phase.

6. The first reference phase is a phase corresponding to a reference signal resource with a largest reference signal resource identifier in the N reference signal resources.

7. The first reference phase is a phase corresponding to a reference signal resource with a smallest reference signal resource identifier in the N reference signal resources.

The reference signal resource identifier is a CSI-RS resource ID.

The foregoing shows some possible implementations of the first reference phase. In actual application, there may be another implementation. Specifically, selection of the first reference phase is not limited in this disclosure.

For the manner in which the first phase information includes phase differences between reference signals, the terminal device does not need to report a phase corresponding to each reference signal, thereby reducing signaling overheads. In addition, as shown in FIG. 2D, a difference between phase differences between the first reference signal and the second reference signal at different frequencies is relatively small, that is, the phase difference between the first reference signal and the second reference signal is relatively stable at different frequencies. The terminal device does not need to report phase differences between the two reference signals at different frequencies, thereby further reducing signaling overheads.

In this embodiment, the N reference signal resources are received by the terminal device by using a same receive beam.

Specifically, the terminal device receives, by using a same receive beam, the N reference signals that are corresponding to the N reference signal resources and that are sent by the access network device.

In step 204, the access network device calculates the generated first transmit beam based on amplitude information (that is, the RSRPs of the N reference signals) of the N reference signals corresponding to the N reference signal resources and the first phase information of the N reference signals that are obtained by the terminal device through measurement by using the same receive beam. Therefore, the receive beam of the terminal device should be limited on the terminal device side, so that the access network device generates the first transmit beam that matches a channel condition between the terminal device and the access network device, thereby improving communication performance of communication between the terminal device and the access network device.

Step 202 shows a process in which the terminal device measures the RSRPs respectively corresponding to the M reference signal resources and the first phase information corresponding to the N reference signal resources. In actual application, a process in which the terminal device measures the RSRPs respectively corresponding to the M reference signal resources and a process in which the terminal device measures the first phase information corresponding to the N reference signal resources may be two independent measurement processes. In addition, a measurement sequence of measuring, by the terminal device, the RSRPs respectively corresponding to the M reference signal resources and measuring the first phase information corresponding to the N reference signal resources is not limited.

203: The terminal device sends a first message to the access network device.

The first message carries first indication information, and the first indication information indicates the first phase information.

In this embodiment, the terminal device measures the first phase information and reports the first phase information in the beam management procedure. Therefore, the first message further carries twelfth indication information and thirteenth indication information. The twelfth indication information indicates the CRIs respectively corresponding to the N reference signal resources. The thirteenth indication information indicates the RSRPs of the N reference signal resources.

A manner in which the terminal device reports the RSRPs corresponding to the N CRIs in the existing beam management procedure is as follows: The terminal device reports, by using a seven-bit absolute value quantization method, a largest RSRP in the RSRPs corresponding to the N CRIs, and the remaining RSRPs corresponding to the N CRIs except the largest RSRP are reported by using a four-bit relative difference quantization method. Therefore, to match the manner in which the terminal device reports the RSRPs in the existing beam management procedure, the following describes content carried in the first message by using an example in which the first phase information includes phase differences between the first reference phase and the phases of the N reference signals corresponding to the N reference signal resources, and a phase of a reference signal with a largest RSRP in the N reference signals corresponding to the N reference signal resources is used as the reference phase.

First, it is shown that the first message is used for indicating bitwidths respectively occupied by different reporting quantities. The reporting quantities include a CRI, an RSRP of a reference signal with a largest RSRP, an RSRP difference (Differential RSRP), and a phase difference (Differential Phase). For details, refer to Table 1.

TABLE 1

| Field (Field) | Bitwidth (Bitwidth) |
|---|---|
| CRI | $\lceil \log_2(K_s^{CSI-RS}) \rceil$ |
| RSRP | 7 |
| Differential RSRP | 4 |
| Differential Phase | 4 |

⌈x⌉ refers to rounding up x, $\log_2(s)$ refers to calculating a logarithm of s by using 2 as a base, and $$K_s^{CSI-RS}$$

refers to a quantity of CSI-RS resources in a CSI-RS resource set. In this embodiment, the CSI-RS resource set includes the M reference signal resources in step 201.

In this embodiment, a reporting quantity Differential Phase is newly added to an existing table to obtain Table 1. The Differential Phase is reported to the access network device by using four bits. In other words, each phase difference occupies four bits in the first message.

It should be noted that Table 1 is merely an example, and a bitwidth occupied by the Differential Phase is not limited in this embodiment. For example, the Differential Phase may occupy a bitwidth of eight bits.

Refer to Table 2. The following shows a field sequence of reporting the reporting quantities in the first message.

TABLE 2

| CSI report number (CSI report number) | CSI fields (CSI fields) |
|---|---|
| CSI report#n | CRI #1 |
| | CRI #2 |
| | CRI #3 |
| | CRI #4 |
| | RSRP #1 |
| | Differential RSRP #2 |
| | Differential RSRP #3 |
| | Differential RSRP #4 |
| | Differential Phase #2-#1 |
| | Differential Phase #3-#1 |
| | Differential Phase #4-#1 |

In this embodiment, three rows: Differential Phase #2-#1, Differential Phase #3-#1, and Differential Phase #4-#1 are added to an existing table to obtain Table 2. Differential Phase #2-#1 represents a phase difference between CRS-RSs respectively corresponding to CRI #1 and CRI #2. Differential Phase #3-#1 represents a phase difference between CRS-RSs respectively corresponding to CRI #3 and CRI #1. Differential Phase #4-#1 represents a phase difference between CRS-RSs respectively corresponding to CRI #4 and CRI #1.

For example, with reference to Table 1, Differential Phase #2-#1, Differential Phase #3-#1, and Differential Phase #4-#1 each occupy 4 bits. Because a status of each phase difference may be represented by using 4 bits, there are 16 states of phase differences in total. Because a quantization range is 2*pi, quantization precision is pi/8. The following shows, with reference to Table 3, reported values corresponding to phase differences in different value ranges.

TABLE 3

| Reported value (Reported value) | Measured quantity value (Measured quantity value) (difference in measured phase from reference phase (difference in measured phase from reference phase)) | Unit (Unit) |
|---|---|---|
| DIFFRSRP_0 | pi ≥ ΔPhase > 7/8*pi | rad (rad) |
| DIFFRSRP_1 | 7/8*pi ≥ ΔPhase > 6/8*pi | rad |
| DIFFRSRP_2 | 6/8*pi ≥ ΔPhase > 5/8*pi | rad |
| DIFFRSRP_3 | 5/8*pi ≥ ΔPhase > 4/8*pi | rad |
| DIFFRSRP_4 | 4/8*pi ≥ ΔPhase > 3/8*pi | rad |
| DIFFRSRP_5 | 3/8*pi ≥ ΔPhase > 2/8*pi | rad |
| DIFFRSRP_6 | 2/8*pi ≥ ΔPhase > 1/8*pi | rad |
| DIFFRSRP_7 | 1/8*pi ≥ ΔPhase > 0 | rad |
| DIFFRSRP_8 | 0 ≥ ΔPhase > −1/8*pi | rad |
| DIFFRSRP_9 | −1/8*pi ≥ ΔPhase > −2/8*pi | rad |
| DIFFRSRP_10 | −2/8*pi ≥ ΔPhase > −3/8*pi | rad |
| DIFFRSRP_11 | −3/8*pi ≥ ΔPhase > −4/8*pi | rad |
| DIFFRSRP_12 | −4/8*pi ≥ ΔPhase > −5/8*pi | rad |
| DIFFRSRP_13 | −5/8*pi ≥ ΔPhase > −6/8*pi | rad |
| DIFFRSRP_14 | −6/8*pi ≥ ΔPhase > −7/8*pi | rad |
| DIFFRSRP_15 | −7/8*pi ≥ ΔPhase > −pi | rad |

It can be learned from Table 3 that phase differences falling within different value ranges have corresponding values. For example, if a phase of a reference signal corresponding to CRI #1 is 6/8*pi, and a phase of a reference signal corresponding to CRI #2 is ⅞*pi, Differential Phase #2-#1 falls within ⅛*pi>ΔPhase>0, and a value corresponding to ⅛*pi>ΔPhase>0 is DIFFRSRP_7. In this case, four bits used to represent DIFFRSRP_7 are "0111". Differential Phase #3-#1 and Differential Phase #4-#1 are similar, and details are not described herein one by one.

Table 1 and Table 2 are examples, and do not constitute a limitation on this embodiment of this disclosure. For Table 3, another quantization precision may be used, or the phase difference may be represented based on another quantization precision that can be supported by the terminal device. For example, if quantization precision ¼*pi supported by the terminal device is used, because a quantization range is 2*pi, it can be learned that there are eight phase difference states in total. With reference to Table 4, the following shows values corresponding to phase differences in different value ranges.

TABLE 4

| Reported value (Reported value) | Measured quantity value (Measured quantity value) (difference in measured phase from reference phase (difference in measured phase from reference phase)) | Unit (Unit) |
|---|---|---|
| DIFFRSRP_0 | pi ≥ ΔPhase > 3/4*pi | rad (rad) |
| DIFFRSRP_1 | 3/4*pi ≥ ΔPhase > 2/4*pi | rad |
| DIFFRSRP_2 | 2/4*pi ≥ ΔPhase > 1/4*pi | rad |
| DIFFRSRP_3 | 1/4*pi ≥ ΔPhase > 0 | rad |
| DIFFRSRP_4 | 0 ≥ ΔPhase > −1/4*pi | rad |
| DIFFRSRP_5 | −1/4*pi ≥ ΔPhase > −2/4*pi | rad |
| DIFFRSRP_6 | −2/4*pi ≥ ΔPhase > −3/4*pi | rad |
| DIFFRSRP_7 | −3/4*pi ≥ ΔPhase > −*pi | rad |

It can be learned from Table 3 and Table 4 that a total quantity of phase difference states is determined by a quantization range and quantization precision. In addition, a bitwidth occupied by each phase difference in Table 1 is related to a total quantity of states of the phase difference. For example, there are 16 states of phase differences in Table 3, and therefore, a bitwidth occupied by each phase difference is at least 4 bits.

The foregoing Table 1 and Table 2 are merely used to describe a specific form of the first indication information carried in the first message. In actual application, the terminal device may alternatively report the first indication information in another form, without depending on an RSRP reporting manner in the beam management procedure, provided that the access network device and the terminal device agree on a reporting manner in advance, and the access network device can correctly parse information reported by the terminal device.

This embodiment shows a manner in which the terminal device reports, by using the indication information, the first phase information and the amplitude information (for example, the RSRPs of the N reference signals) of the N reference signals corresponding to the N reference signal resources, thereby avoiding a problem of excessively high signaling overheads, and reducing resource overheads. In actual disclosure, the terminal device may alternatively directly report, to the access network device, the first phase information and the amplitude information of the N reference signals corresponding to the N reference signal resources. This is not specifically limited in this disclosure.

The foregoing step 203 shows a manner in which the terminal device reports the first indication information, the twelfth indication information, and the thirteenth indication information to the access network device by using a same message (the first message). In actual application, the first indication information, the twelfth indication information, and the thirteenth indication information may be sent to the access network device by using different messages, or the twelfth indication information and the thirteenth indication information may be sent to the access network device by using one message, and the first indication information is sent to the access network device by using another message. This is not specifically limited in this disclosure. The following describes the technical solutions of this embodiment of this disclosure by using an example in which the terminal device reports the first indication information, the twelfth indication information, and the thirteenth indication information to the access network device by using a same message (the first message).

204: The access network device generates the first transmit beam based on the first phase information indicated by the first indication information.

The first transmit beam is used for communication between the access network device and the terminal device.

Specifically, the first message further carries the twelfth indication information and thirteenth indication information, the twelfth indication information indicates the N CRIs corresponding to the N reference signal resources, and the thirteenth indication information indicates the RSRPs of the N reference signals corresponding to the N CRIs. The access network device determines the RSRPs of the N reference signals based on the twelfth indication information and the thirteenth indication information, and the access network device determines the first phase information of the N reference signals based on the first indication information. Then, the access network device generates the first transmit beam based on the first phase information of the N reference signals and the RSRPs of the N reference signals.

In this embodiment, before step 201, the access network device determines a first weight set.

The first weight set includes weights respectively corresponding to the M transmit beams corresponding to the M reference signal resources. The first weight set is specifically represented as $W=[w_{b0}\ w_{b1}\ \ldots\ w_{b_{M-1}}]$.

A weight of a $b_i^{th}$ transmit beam in the M transmit beams is represented as $w_{b_i}$, where i is an integer greater than or equal to 0 and less than or equal to M−1. $w_{b_i}$ is a vector whose dimension is $N_{t\text{-}ans}\times 1$, and $N_{t\text{-}ans}$ is a quantity of antenna elements in the access network device that are used to send a reference signal corresponding to the $b_i^{th}$ transmit beam.

In this embodiment, quantities of antenna elements used by the access network device to send reference signals corresponding to all of the M transmit beams are the same or different, and quantities of radio frequency channels used by the terminal device to receive the reference signals corresponding to all of the M transmit beams are the same or different.

For ease of description, in the following step **204*a* and step 204*b***, an example in which the quantities of antenna elements in the access network device that are used to send the reference signals corresponding to all of the M transmit beams are all $N_{t\text{-}ans}$ is used for description, and an example in which the quantities of radio frequency channels in the terminal device that are used to receive the reference signals corresponding to all of the M transmit beams are all $N_r$ is used for description.

Due to measurement and calculation complexity, the access network device configures the terminal device to report the amplitude information (that is, the RSRPs respectively corresponding to the N reference signals) of the N reference signals corresponding to the N reference signal resources and the first phase information corresponding to the N reference signals. In high-frequency communication, because high-frequency channels are sparse, an extremely large part of energy is distributed in a coverage area of a few transmit beams. For example, N transmit beams that are in the M transmit beams and that correspond to largest RSRP strength are the N transmit beams corresponding to the first phase information of the N reference signals that is measured and reported by the terminal device.

Therefore, the foregoing W is replaced with a second weight set $W_N$, and $W_N$ is a set of weights of the N transmit beams. $W_N$ is a subset of W. For example, the second weight set $W_N=[w_{b0}\ w_{b1}\ \dots\ w_{b_{N-1}}]$.

For ease of description, an example in which $W_N$ includes weights of first N transmit beams of the M transmit beams is used below for description. In actual application, $W_N$ includes the weights of the N transmit beams corresponding to the N RSRPs that are measured and reported by the terminal device. Specifically, the N transmit beams may be N transmit beams respectively corresponding to top N RSRPs in the M reference signals corresponding to the M transmit beams.

In this embodiment, to generate the first transmit beam that matches the channel condition between the terminal device and the access network device, content reported by the terminal device is extended (in addition to the RSRPs of the N reference signals reported by the terminal device in the existing beam management procedure, the first phase information of the N reference signals is reported), and the channel condition between the terminal device and the access network device is indicated by using the RSRPs of the N reference signals and the first phase information.

The following describes step 204 by using an example in which the terminal device reports the first phase information of the N reference signals and the amplitude information of the N reference signals. Step 204 specifically includes step 204*a* and step 204*b*. The amplitude information of the N reference signals is also referred to as amplitude information of the N transmit beams (that is, the RSRPs of the N reference signals, which are collectively referred to as amplitude information of the N reference signals in step 204*a* and step 204*b* below).

Step 204*a*: The access network device determines a first synthesis weight $\alpha_{opt1}$ based on the first phase information and the amplitude information of the N reference signals.

The amplitude information of the N reference signals includes the RSRPs of the N reference signals. The first synthesis weight $\alpha_{opt1}$ is used by the access network device to generate the first transmit beam that matches the channel condition between the terminal device and the access network device.

The following describes a process in which the access network device calculates the first synthesis weight $\alpha_{opt1}$.

1. The access network device determines a channel of each of the N transmit beams.

To calculate the first synthesis weight $\alpha_{opt1}$, the access network device needs to obtain the channel of each of the N transmit beams. A transmit beam with a fixed weight $w_{b0}$ is used as an example. The terminal device obtains, through measurement, that for a subcarrier k, a channel of a $$b_0^{th}$$

transmit beam with the fixed weight $w_{b0}$ is $$H_k^T w_{b0}.$$

$$H_k^T$$

is a transpose of a channel $H_k$ on the subcarrier k. $H_k$ is an $N_{t\text{-}ans}\times N_r$ matrix.

Therefore, on the subcarrier k, the channels of the N transmit beams are represented as $$H_k^T W_N.$$

To maximize a channel capacity formed by the N transmit beams, the access network device calculates the first synthesis weight $\alpha_{opt1}$ that meets the channel capacity maximization requirement. Therefore, the problem may be specifically located as an optimization problem for solving the following formula (1):

$$\alpha_{opt1} = \underset{\alpha}{\mathrm{argmax}} \frac{1}{K} \sum_{k=1}^{K} \left\| H_k^T W_N \alpha \right\|_2^2 \tag{1}$$

Herein, argmax is an operator of arguments of the maxima (arguments of the maxima), and k is a subcarrier number. The optimization problem described in the foregoing formula (1) refers to finding the first synthesis weight $\alpha_{opt1}$ in all $\alpha$, to enable the value of $$\frac{1}{K} \sum_{k=1}^{K} \left\| H_k^T W_N \alpha \right\|_2^2$$

in the foregoing formula (1) to be the largest.

It should be noted that, based on different criteria, optimization problems that need to be solved may be different. The optimization problem shown above is an optimization problem determined based on a basis of channel capacity maximization.

Optionally, a solution of the optimization problem of formula (1) is limited by a $\alpha$ constant modulus (subject to (s.t.) $\|\alpha\|_2=1$).

Therefore, it can be learned that the problem is located as an optimization problem for solving the following formula (1) and formula (2):

$$\alpha_{opt1} = \underset{\alpha}{\mathrm{argmax}} \frac{1}{K} \sum_{k=1}^{K} \left\| H_k^T W_N \alpha \right\|_2^2 \tag{1}$$

$$s.t. \|\alpha\|_2=1 \tag{2}$$

The formula (2) is a mathematical expression of a constant modulus limit of a high-frequency device.

Therefore, an approximate solution of the foregoing optimization problem is obtained by solving the foregoing formula (1) and formula (2) as follows:

$$\alpha_{opt1}=v_1 \tag{3}$$

Herein, $v_1$ is a right singular vector or an eigenvector corresponding to a maximum eigenvalue of a channel covariance matrix R. The channel covariance matrix R is:

$$R=\frac{1}{K}\sum_{k=1}^{K}W_b'H_k^*H_k^TW_b=\frac{1}{K}\sum_{k=1}^{K}\begin{bmatrix}w_{b0}'\\w_{b1}'\\0\\w_{bN-1}'\end{bmatrix}H_k^*H_k^T[w_{b0}\ w_{b1}\ \dots\ w_{bN_b-1}]=\frac{1}{k}\sum_{k=1}^{K}\begin{bmatrix}w_{b0}'H_k^*H_k^Tw_{b0} & w_{b0}'H_k^*H_k^Tw_{b1} & \dots & w_{b0}'H_k^*H_k^Tw_{bN-1}\\ w_{b1}'H_k^*H_k^Tw_{b0} & w_{b1}'H_k^*H_k^Tw_{b1} & \dots & w_{b1}'H_k^*H_k^Tw_{bN-1}\\ \vdots & \vdots & \ddots & \vdots\\ w_{bN_b-1}'H_k^*H_k^Tw_{b0} & w_{bN_b-1}'H_k^*H_k^Tw_{b1} & \dots & w_{bN_b-1}'H_k^*H_k^Tw_{bN-1}\end{bmatrix} \tag{4}$$

Herein, $(\cdot)^*$ is a complex conjugate operator, $(\cdot)'$ is a conjugate transposition operator, k is a subcarrier number, and a value of k is related to transmission bandwidth of a reference signal. Therefore, it can be learned that for the subcarrier k, the channel covariance matrix $R_k$ is as follows:

$$R_k=\begin{bmatrix}w_{b0}'H_k^*H_k^Tw_{b0} & w_{b0}'H_k^*H_k^Tw_{b1} & \dots & w_{b0}'H_k^*H_k^Tw_{bN_b-1}\\ w_{b1}'H_k^*H_k^Tw_{b0} & w_{b1}'H_k^*H_k^Tw_{b1} & \dots & w_{b1}'H_k^*H_k^Tw_{bN_b-1}\\ \vdots & \vdots & \ddots & \vdots\\ w_{bN_b-1}'H_k^*H_k^Tw_{b0} & w_{bN_b-1}'H_k^*H_k^Tw_{b1} & \dots & w_{bN_b-1}'H_k^*H_k^Tw_{bN_b-1}\end{bmatrix} \tag{5}$$

An element of a main diagonal of the channel covariance matrix in the formula (5) (the element of the main diagonal is referred to as a diagonal element herein) is a square of an amplitude of a same transmit beam, and another element (referred to as a non-diagonal element herein) in the channel covariance matrix in the formula (5) other than the foregoing diagonal element is a correlation of amplitudes of different transmit beams.

For example, in the formula (5), the terminal device obtains, through measurement, the 1st transmit beam $w_{b0}$ corresponding to an element (that is, the diagonal element) in the first row and the first column of the channel covariance matrix, and obtains a channel $$H_k^Tw_{b0}$$

of the 1st transmit beam.

$$H_k^Tw_{b0}$$

is a vector including a complex number, an amplitude of a reference signal corresponding to the 1st transmit beam is represented by $$|H_k^Tw_{b0}|,$$

and a phase of the reference signal corresponding to the 1st transmit beam is represented by $$\angle(H_k^Tw_{b0}).$$

The element (that is, the diagonal element) in the first row and the first column is actually a square of the amplitude of the reference signal corresponding to the 1st transmit beam, that is, received energy of the reference signal corresponding to the 1st transmit beam. A specific expression is:

$$w_{b0}'H_k^*H_k^Tw_{b0}=\|H_k^Tw_{b0}\|_2^2$$

The non-diagonal element may be obtained through calculation by using amplitudes and phases of different transmit beams. An element in the first row and the second column in the formula (5) is used as an example, and $$w_{b0}'H_k^*H_k^Tw_{b1}$$

is a correlation of a transmit beam $w_{b0}$ and a transmit beam $w_{b1}$. For ease of description, $N_r$ is set to 1, and $$w_{b0}'H_k^*H_k^Tw_{b1}$$

may be represented as:

$$w_{b0}'H_k^*H_k^Tw_{b1}=|H_k^Tw_{b0}|\times e^{-j\angle(H_k^Tw_{b0})}\times|H_k^Tw_{b1}|\times e^{-j\angle(H_k^Tw_{b1})}=|H_k^Tw_{b0}|\times|H_k^Tw_{b1}|\times e^{-j[\angle(H_k^Tw_{b1})-\angle(H_k^Tw_{b0})]}$$

Herein, $$\angle(H_k^Tw_{b1})-\angle(H_k^Tw_{b0})$$

may be understood as a difference between phases of reference signals respectively corresponding to the transmit beam $w_{b0}$ and the transmit beam $w_{b1}$ that are measured by the terminal device.

Therefore, the access network device obtains, based on the first phase information, the phase differences between the N reference signals corresponding to the N transmit beams; then the access network device determines the phases of the N reference signals based on the phase differences between the N reference signals, and generates the first synthesis weight $\alpha_{opt1}$ based on the phases of the N reference signals and the RSRPs of the N reference signals (also referred to as the amplitude information of the N transmit beams).

It should be noted that the foregoing formula (4) and formula (5) describe a process in which the access network device calculates the first synthesis weight $\alpha_{opt1}$ by using an example in which transmission bandwidth ranges of the N reference signals corresponding to the N transmit beams are the same. In actual application, transmission bandwidth ranges of the N reference signals may alternatively be different. For a case in which the transmission bandwidth ranges of the N reference signals are different, the following uses a process of determining a phase difference between a reference signal corresponding to a transmit beam $w_{b0}$ and a reference signal corresponding to a transmit beam $w_{b1}$ as an example to describe a process of determining the phase differences between the N reference signals corresponding to the N transmit beams. This method is also applicable to obtaining a phase difference between other reference signals.

If the transmit beam $w_{b0}$ is selected as a reference, a channel of the transmit beam $w_{b0}$ is represented as $$H_{k_0}^T w_{b1},\ k_0 \in [K1_{w_{b0}}, K2_{w_{b0}}],$$

and a channel of the transmit beam $w_{b1}$ is represented as $$H_{k_1}^T w_{b1},\ k_1 \in [K1_{w_{b1}}, K2_{w_{b1}}].$$

$[K1_{w_{b0}}, K2_{w_{b0}}]$ is a transmission bandwidth range of a reference signal corresponding to the transmit beam $w_{b0}$, and $[K1_{w_{b1}}, K2_{w_{b1}}]$ is a transmission bandwidth range of a reference signal corresponding to the transmit beam $w_{b1}$.

If there is an overlapping part between $[K1_{w_{b0}}, K2_{w_{b0}}]$ and $[K1_{w_{b1}}, K2_{w_{b1}}]$, it can be learned from FIG. 2D that, as a frequency changes, a difference between phase differences between the two reference signals at different frequencies is relatively small. Therefore, the channel covariance matrix is formed by using a phase difference and amplitudes of the reference signals on a subcarrier in the overlapping part.

If $[K1_{w_{b0}}, K2_{w_{b0}}]$ and $[K1_{w_{b1}}, K2_{w_{b1}}]$ do not overlap, the phase of the reference signal corresponding to the transmit beam $w_{b1}$ within the range $[K1_{w_{b1}}, K2_{w_{b1}}]$ is adjusted, to obtain a phase of the reference signal corresponding to the transmit beam $w_{b1}$ within the range $[K1_{w_{b0}}, K2_{w_{b0}}]$, and then a phase difference between the reference signal corresponding to the transmit beam $w_{b1}$ and the reference signal corresponding to the transmit beam $w_{b0}$ is calculated. A specific adjustment manner is as follows: The access network device performs adjustment based on a linear relationship between the phase of the reference signal corresponding to the transmit beam $w_{b1}$ and a frequency. For example, a phase of the reference signal corresponding to the transmit beam $w_{b1}$ on a subcarrier 1 is equal to a phase of the reference signal corresponding to the transmit beam $w_{b1}$ on a subcarrier 2 plus a slope*(a frequency of the subcarrier 1−a frequency of the subcarrier 2), where the slope is a slope corresponding to the linear relationship between the phase of the reference signal corresponding to the transmit beam $w_{b1}$ and a frequency.

In this way, the access network device may obtain phase differences of the reference signals corresponding to the N transmit beams within a same bandwidth range, and then form a channel covariance matrix similar to the foregoing formula (4), so as to determine the first synthesis weight $\alpha_{opt1}$.

The formula (4) and the formula (5) describe a process in which the access network device obtains the first synthesis weight $\alpha_{opt1}$ through calculation by using a granularity of a subcarrier. In an actual application, the first synthesis weight $\alpha_{opt1}$ may alternatively be calculated by using another bandwidth as a granularity, for example, an RE granularity, an RB granularity, a resource block group (RBG) granularity, or a full-band granularity.

Step 204*b*: The access network device generates the first transmit beam $W_{opt}$ based on the first synthesis weight $\alpha_{opt1}$ and the second weight set $W_N$, that is, $W_{opt}=W_N*\alpha_{opt1}$.

The first transmit beam matches the channel condition between the terminal device and the access network device, and a channel capacity corresponding to the first transmit beam is maximized.

It can be learned from this that a main lobe direction of the first transmit beam is directed at the terminal device. In this way, when the access network device and the terminal device perform communication transmission by using the first transmit beam, a beam gain of the first transmit beam can be greatly improved, thereby improving performance of communication between the terminal device and the access network device. In addition, compared with a manner in which the access network device selects a transmit beam from the M transmit beams to perform communication transmission with the terminal device, the method in this embodiment maximizes the channel capacity corresponding to the first transmit beam, and therefore improves a capacity of a channel corresponding to the first transmit beam. The M transmit beams are M transmit beams that are generated by the access network device and that correspond to the M reference signal resources, and the M transmit beams are transmit beams with fixed weights.

Optionally, the first transmit beam does not belong to a transmit beam set, the transmit beam set includes the M transmit beams, weights respectively corresponding to the M transmit beams are represented by the first weight set, and the M transmit beams are transmit beams with fixed weights.

205: The access network device communicates with the terminal device by using the first transmit beam.

Specifically, step 205 includes at least one of the following operations:

1. The access network device sends, to the terminal device by using the first transmit beam, a reference signal corresponding to a first reference signal resource; and then the terminal device measures the reference signal corresponding to the first reference signal resource, to obtain channel information corresponding to the first transmit beam.

In this embodiment, before the access network device sends the reference signal corresponding to the first reference signal resource, the access network device sends ninth indication information to the terminal device.

The ninth indication information is used to indicate the terminal device to receive the first reference signal resource by using a first receive beam, and the first receive beam is a receive beam used by the terminal device to receive the N reference signals corresponding to the N reference signal resources.

Specifically, the access network device configures a TCI state of the first reference signal resource by using a quasi co-location information periodic channel state information reference signal (qcl-InfoPeriodicCSI-RS) field in first RRC signaling. A specific configuration process is that the access network device configures a referencesignal value in a TCI of the first reference signal resource as an ID of any one of the N reference signal resources. Then, the access network device sends the first RRC signaling to the terminal device. In this way, the terminal device determines, based on the first RRC signaling, to receive the reference signal corresponding to the first reference signal resource by using the first receive beam.

2. The access network device sends tenth indication information to the terminal device by using the first transmit beam. The tenth indication information is used to instruct the terminal device to perform uplink transmission, downlink transmission, and control channel transmission by using the first receive beam.

The tenth indication information includes a CRS-RS resource ID corresponding to any CRI in Table 2, or includes a CRS-RS resource ID corresponding to the first reference signal resource.

Specifically, the access network device configures, by using a TCI state or spatial relation information (spatialRelationInfo) in second RRC signaling, a beam that is of the terminal device and that is used for an uplink transmission resource, a downlink transmission resource, and a control channel transmission resource.

A specific configuration process is that the access network device configures a reference signal (reference signal) value in a TCIstate or spatialRelationInfo for the uplink transmission resource, the downlink transmission resource, and/or the control channel transmission resource of the terminal device as an ID of any one of the N reference signal resources. Alternatively, the access network device configures a referencesignal value in a TCIstate or spatialRelationInfo for the uplink transmission resource, the downlink transmission resource, and/or the control channel transmission resource of the terminal device as the CRS-RS resource ID corresponding to the first reference signal resource. Then, the access network device sends the second RRC signaling to the terminal device. In this way, the terminal device determines, based on the second RRC signaling, to perform uplink transmission, downlink transmission, and/or control channel transmission by using the first receive beam.

3. The access network device performs downlink transmission with the terminal device by using the first transmit beam, and performs uplink transmission with the terminal device by using the first transmit beam.

In a downlink transmission process, the terminal device tracks a time-frequency offset of the first transmit beam. Specifically, the terminal device may obtain the time-frequency offset by measuring the first reference signal resource; or the terminal device measures a tracking reference signal that is sent by the access network device and that is corresponding to the first reference signal resource, to obtain the time-frequency offset; or the terminal device measures the N reference signal resources used to synthesize the first transmit beam, to obtain the time-frequency offset.

In an uplink transmission process, the terminal device measures a path loss of the first transmit beam. Specifically, the terminal device may measure the first reference signal resource to obtain the path loss; or the terminal device may measure a path loss reference signal that is sent by the access network device and that is associated with the first reference signal resource, to obtain the path loss; or the terminal device measures the reference signals corresponding to the N reference signal resources to obtain the path loss.

In this embodiment of this disclosure, the terminal device measures the N reference signal resources, to obtain the amplitude information and the first phase information of the N reference signal resources, and reports the amplitude information and the first phase information of the N reference signal resources to the access network device. In a movement process of the terminal device, a channel condition between the access network device and the terminal device keeps changing, and the N reference signal resources are respectively corresponding to the N transmit beams of the access network device. Therefore, the amplitude information and the first phase information of the N reference signal resources may indicate a channel change status between the access network device and the terminal device. Therefore, the access network device may generate, by using the amplitude information and the first phase information of the N reference signal resources, the first transmit beam that matches the channel condition between the terminal device and the access network device; or select, from the N transmit beams of the access network device, the first transmit beam that matches the channel condition between the terminal device and the access network device, to improve performance of communication between the access network device and the terminal device.

To enable the access network device to configure a proper resource configuration and a proper reporting manner for the terminal device, so that the access network device can correctly parses the reporting quantity of the terminal device, optionally, the embodiment shown in FIG. 2A further includes step 206 and step 207, and step 206 and step 207 are performed before step 201.

206: The terminal device sends first capability information of the terminal device to the access network device.

The first capability information carries second indication information, and an indication form of the second indication information includes any one of the following:

1. The second indication information indicates whether the terminal device supports measurement and reporting required for a dynamic transmit beam.

2. The second indication information indicates whether the terminal device has a measurement capability of measuring the first phase information.

3. The second indication information indicates whether the terminal device supports measurement of phase information corresponding to a reference signal resource used for beam management.

In this embodiment, to enable the access network device to determine whether the terminal device has a measurement capability of measuring phase information of a reference signal, the terminal device may report the first capability information of the terminal device to the access network device. In this way, the access network device can correctly configure a resource configuration and a reporting manner for the terminal device, so as to avoid that the access network device cannot correctly parse a reporting quantity of the terminal device.

It should be noted that step 206 shows a manner in which the terminal device reports the second indication information by using the first capability information. In actual application, the terminal device may separately send the second indication information to the access network device, or the terminal device may use other information or messages to carry the second indication information and report the second indication information to the access network device. This is not specifically limited in this disclosure.

Optionally, the terminal device performs step 206 when the terminal device accesses a network or when the terminal device requests a network.

Specifically, in the beam management procedure, the terminal device reports the first capability information to the access network device, and the first capability information is carried in an RRC message. In this case, the terminal device adds an information element to the RRC message, and indicates, by using the added information element, a capability of measuring phase information of a reference signal by the terminal device.

The following shows a specific form of the second indication information carried in the first capability information.

1. The second indication information includes a dynamic transmit beam measurement capability field and a first value field.

A value of the first value field is used for indicating whether the terminal device supports measurement and reporting required for a dynamic transmit beam, or is used for indicating whether the terminal device supports measurement of the first phase information, or is used for indicating whether the terminal device supports measurement of phase information corresponding to a reference signal resource used for beam management. An example in which the first value field indicates whether the terminal device supports measurement of the first phase information is used for description subsequently.

Example 1: When the first value field is true, it indicates that the terminal device supports measurement of the first phase information; or when the first value field is false, it indicates that the terminal device does not support measurement of the first phase information. Alternatively, when the first value field is true, it indicates that the terminal device does not support measurement of the first phase information; or when the first value field is false, it indicates that the terminal device supports measurement of the first phase information.

Based on Example 1, the dynamic beam measurement capability field and the first value field are represented below in an ASN.1 pseudocode form in a standard.

DynamicBeam ENUMERATED {true, false}

Example 2: When the first value field is 0, it indicates that the terminal device supports measurement of the first phase information; or when the first value field is 1, it indicates that the terminal device does not support measurement of the first phase information. Alternatively, when the first value field is 0, it indicates that the terminal device does not support measurement of the first phase information; or when the first value field is 1, it indicates that the terminal device supports measurement of the first phase information.

Based on Example 2, the dynamic beam measurement capability field and the first value field are represented below in an ASN.1 pseudocode form in the standard.

DynamicBeam ENUMERATED {0, 1}

Optionally, the dynamic beam measurement capability field and the first value field may alternatively be represented in the following ACN.1 pseudocode form.

Optionally, the dynamic beam measurement capability field and the first value field may alternatively be represented in the following ACN.1 pseudocode form.

DynamicBeam ENUMERATED {support}

DynamicBeam is the dynamic beam measurement capability field, ENUMERATED {support} is the first value field, and support indicates that the terminal device supports a dynamic beam measurement capability.

2. The second indication information includes a phase difference measurement capability field and a second value field.

A value of the second value field is used for indicating that the terminal device supports phase difference measurement.

Example 1: When the second value field is true, it indicates that the terminal device supports phase difference measurement; or when the second value field is false, it indicates that the terminal device does not support phase difference measurement. Alternatively, when the second value field is true, it indicates that the terminal device does not support phase difference measurement; or when the second value field is false, it indicates that the terminal device supports phase difference measurement.

Based on Example 1, the phase difference measurement capability field and the second value field are represented below in an ASN.1 pseudo-code form in the standard.

DifferentialPhaseReport ENUMERATED {true, false}

Example 2: When the second value field is 0, it indicates that the terminal device supports phase difference measurement; or when the second value field is 1, it indicates that the terminal device does not support phase difference measurement. Alternatively, when the second value field is 0, it indicates that the terminal device does not support phase difference measurement; or when the second value field is 1, it indicates that the terminal device supports phase difference measurement.

Based on Example 2, the phase difference measurement capability field and the first value field are represented below in an ASN.1 pseudo-code form in the standard.

DifferentialPhaseReport ENUMERATED {0, 1}

Optionally, the phase difference measurement capability field and the second value field may alternatively be represented in the following ASN.1 pseudocode form.

DifferentialPhaseReport ENUMERATED {support}

DifferentialPhaseReport is the phase difference measurement capability field, ENUMERATED {support} is the second value field, and support indicates that the terminal device supports phase difference measurement.

Optionally, the first capability information further includes one or more of the following pieces of information:

1. A maximum quantity of transmit beams that are corresponding to reference signal resources used for beam management and that can be combined by the terminal device.

Specifically, the terminal device represents, by using the maximum quantity of transmit beams that can be combined by the terminal device, phases of reference signals corresponding to a specific quantity of transmit beams that can be measured by the terminal device.

2. Information about a quantization capability of quantizing the first phase information by the terminal device.

The quantization capability information indicates a capability of the terminal device to quantize phase information of a reference signal. The quantization capability information includes quantization precision supported by the terminal device.

The access network device may configure, based on the quantization capability information of the terminal device, a manner of reporting the first phase information by the terminal device. For example, the first phase information includes phase differences between the first reference phase and the N reference signals corresponding to the N reference signal resources, and the first reference phase is a phase of a reference signal with a largest RSRP in the N reference signals. The terminal device supports quantization precision of pi/8. Because a maximum range of a phase is 2 pi, the access network device may configure reporting of phase differences that can support 16 states (which are specifically indicated by the 16 states shown in Table 3). In other words, the access network device configures four bits for reporting of each phase difference. Specifically, as shown in Table 1, Differential Phase occupies four bits.

The quantization capability information includes a phase difference step reporting field and a supported quantization precision field. The following uses an ASN.1 pseudo-code form in the standard to represent the phase difference step reporting field and the supported quantization precision field.

DifferentialPhaseReport-stepsize ENUMERATED {pi/8, pi/4,pi/2}

207: The access network device sends first configuration information to the terminal device.

The first configuration information is used to configure the terminal device to report the first phase information corresponding to the N reference signal resources.

The first configuration information includes second configuration information of a first resource set. The second configuration information is used to configure the terminal device to not expect the access network device to use a same transmit spatial filter (that is, transmit beam) to send all reference signal resources in the first resource set. The first resource set includes the M reference signal resources.

Specifically, the second configuration information includes a repetition field. In this embodiment, if the repetition field is OFF, it indicates that the terminal device does not expect the access network device to use a same transmit spatial filter to send all the reference signal resources in the first resource set.

It should be noted that, if the repetition field is ON, it indicates that the terminal device expects the access network device to use a same transmit spatial filter to send all the reference signal resources in the first resource set. However, a case in which the repetition field is ON is obviously not suitable for a scenario in which the access network device performs multi-transmit-beam combination in this embodiment. In general, if the reporting quantity includes phase information, a repetition field in associated channel measurement ResourceConfig #1 cannot be set to ON.

A specific form of the first configuration information is shown below with reference to FIG. 2E.

Figure 2E:
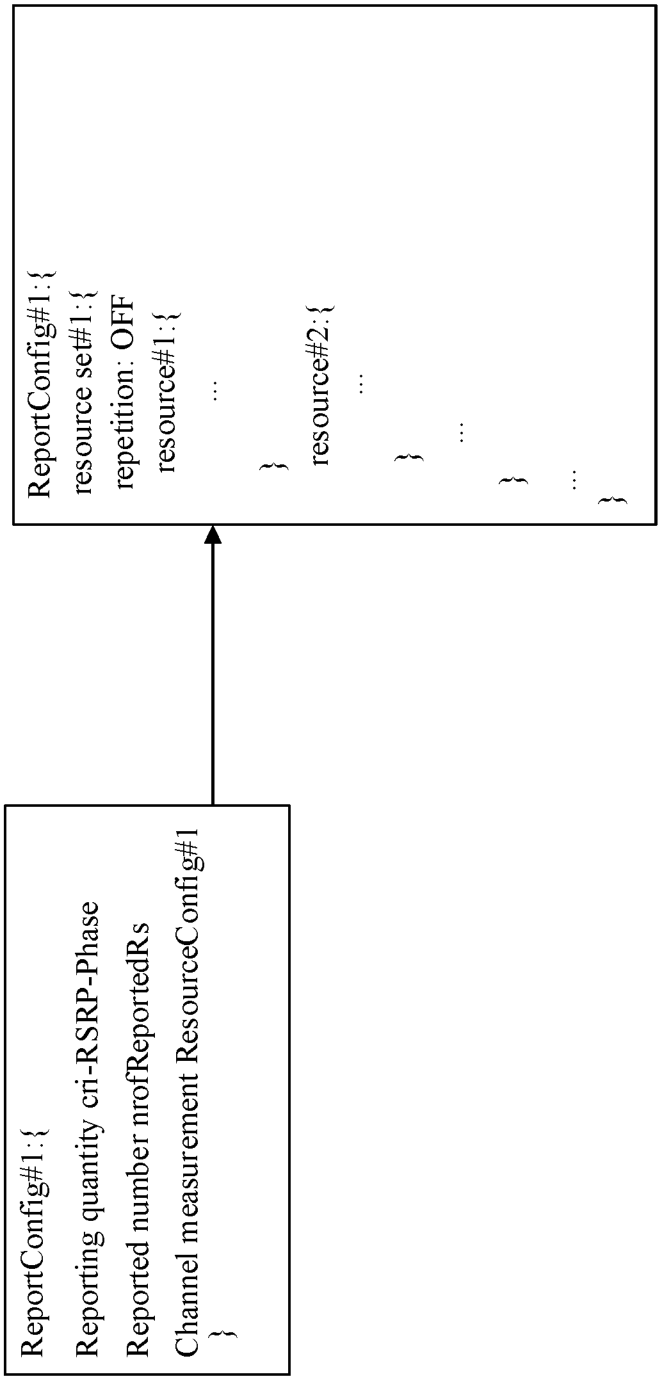
FIG. 2E is a schematic diagram of first configuration information according to an embodiment of this disclosure.

As shown in FIG. 2E, the first configuration information includes a reporting quantity cri-RSRP-Phase, a reported number nrofReportedRS, and channel measurement ResourceConfig #1 (channel measurement ResourceConfig #1 may be understood as the foregoing second configuration information). When the reporting quantity is configured as cri-RSRP-Phase, the repetition field in ResourceConfig #1 is OFF.

Optionally, reporting of the first phase information is decoupled from a CRS-RSRP. Therefore, the reporting quantity configuration shown in FIG. 2E may alternatively be expressed in another form. For example, a reporting configuration of the first phase information is CRI-Phase or Phase. In this implementation, RSRP reporting is completed in the beam management procedure, and CRI-Phase or Phase is associated with a reporting quantity CRS-RSRP. Specifically, that the CRI-Phase or Phase is associated with the reporting quantity CRS-RSRP may be indicated by using indication information in the first configuration information.

In addition, in the beam management procedure, an RSRP reporting granularity is a full-band reporting granularity, that is, the terminal device performs linear averaging on RSRPs measured on different frequency resources before reporting. In this embodiment, the RSRP and the first phase information may be reported in a full-band reporting manner, or may be reported in a subband reporting manner. This is not specifically limited in this disclosure.

A subband granularity may be configured by the access network device, or determined by the terminal device, or preconfigured according to a communications protocol.

The subband granularity is related to factors such as a scheduling bandwidth of the access network device, a bandwidth of a CSI-RS resource, and a quantity of CSI-RS resources. For example, when the bandwidth of the CSI-RS resource is relatively large, in consideration of frequency selectivity, RSRPs and phase information obtained by measuring reference signals on different frequency resources differ greatly. In this case, the terminal device reports the first phase information and the RSRPs of the N reference signals in the subband reporting manner.

Optionally, in this embodiment, reporting periodicities of the reporting quantities CRI, RSRP, and Phase are the same or different. If the CRI-RSRP is a reporting quantity, the CRI and the RSRP are included in each reporting. The following shows a possible reporting periodicity of Phase.

$$T\_\text{Phase}=\text{Quantity of receive beams}*T\_\text{RSRP}$$

The reporting periodicity of Phase is T_Phase, and a reporting periodicity of CRI-RSRP is T_RSRP. T_Phase is proportional to T_RSRP. The quantity of receive beams is a quantity of receive beams used by the terminal device to receive reference signals corresponding to reference signal resources, and is an inherent capability of the terminal device.

Optionally, the quantity of receive beams is preconfigured on the access network device, or is reported by the terminal device to the access network device. For example, the terminal device may use the first capability information in step 206 to carry a maximum quantity (maxNumberRxBeam) of receive beams supported by the terminal device.

The maximum quantity of receive beams is used to define whether the terminal device supports receive beam switching by using a CSI-RS resource. Specifically, the terminal device should indicate a value used for indicating a quantity of CSI-RS resource repetition times in a preferred CSI-RS resource set. A high-frequency terminal device needs to support receive beam switching. For a related description of the maximum quantity of receive beams, refer to the communications standard TS.38.306.

Therefore, in conclusion, optionally, the first configuration information further includes at least one of the following pieces of information:

1. third indication information, where the third indication information indicates that the first resource set is used by the access network device to generate the first transmit beam, and the first resource set includes the M reference signal resources;

2. reporting granularity information of the first phase information, where the reporting granularity information includes a full-band reporting granularity or a subband reporting granularity; and 3. a size of each subband when the reporting granularity of the first phase information is a subband reporting granularity. For example, a size of each subband is 4 RBs, 8 RBs, or 16 RBs. Optionally, the granularity may be another granularity, for example, 10 M (megabit).

208: The terminal device determines, based on the first configuration information, to report the first phase information of the N reference signal resources.

Optionally, the terminal device determines, based on the first configuration information, that the M reference signal resources are used to generate the first transmit beam and determines the reporting granularity of the first phase information.

Embodiments of this disclosure further provide an embodiment. This embodiment is similar to the embodiment shown in FIG. 2A, and a difference lies in step 203 and step 204. In addition, step 203*a* is added in this embodiment, and step 203*a* is performed before step 203.

Step 203*a*: The terminal device calculates the first synthesis weight $\alpha_{opt1}$.

A specific calculation process is similar to that of step 204*a* and step 204*b*. For details, refer to related descriptions of step 204*a* and step 204*b*. Details are not described herein again.

Step 203 is replaced with: The terminal device sends a first message to the access network device, where the first message carries the first synthesis weight $\alpha_{opt1}$.

Step 204 is replaced with: The access network device generates the first transmit beam $W_{opt}$ based on the first synthesis weight $\alpha_{opt1}$ and a second weight set $W_N$, that is, $W_{opt}=W_N*\alpha_{opt}$.

For step 204 after replacement, refer to related descriptions of step 204*b* in the embodiment shown in FIG. 2A. Details are not described herein again.

Figure 3A:
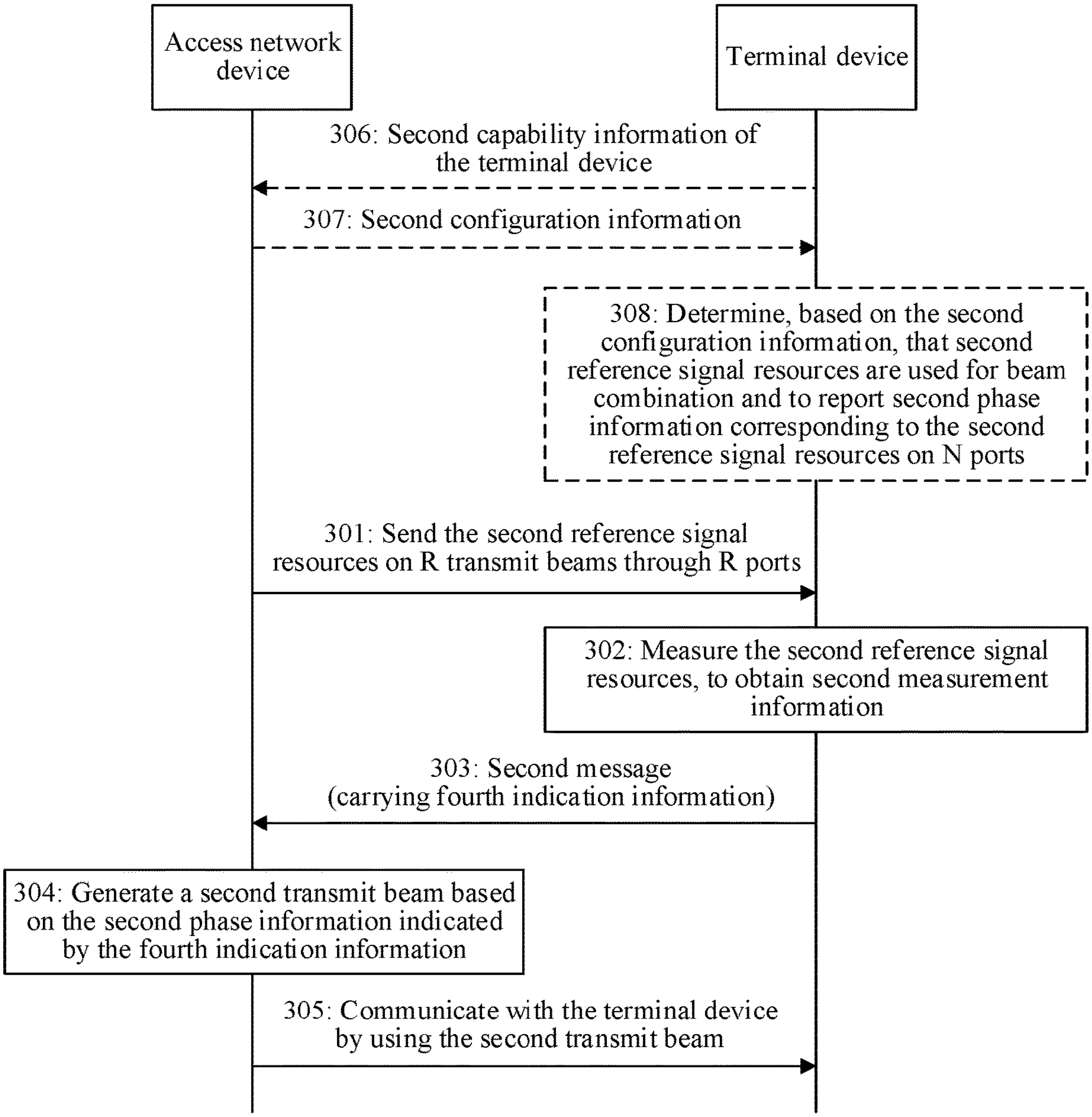
FIG. 3A is a schematic diagram of another embodiment of a communication processing method according to embodiments of this disclosure.

FIG. 3A is a schematic diagram of another embodiment of a communication processing method according to an embodiment of this disclosure. In FIG. 3A, the communication processing method includes the following steps.

301: An access network device sends second reference signal resources to a terminal device on R transmit beams through R ports of the access network device. Correspondingly, the terminal device receives the second reference signal resources sent by the access network device.

Specifically, the access network device sends, by using the R transmit beams and the R ports of the access network device, reference signals corresponding to the second reference signal resources on R symbols that are consecutive in time domain, and the terminal device receives, by using the second reference signal resources, the reference signals corresponding to the second reference signal resources.

The R ports are in a one-to-one correspondence with the R symbols, and the R ports are in a one-to-one correspondence with the R transmit beams.

In other words, it may be understood that, that the access network device sends the second reference signal resources to the terminal device on the R transmit beams through the R ports of the access network device is equivalent to that the access network device sends, by using the R transmit beams and the R ports of the access network device, the reference signals corresponding to the second reference signal resources on R symbols that are consecutive in time domain.

That the terminal device receives the second reference signal resources sent by the access network device is equivalent to: The terminal device receives, by using the second reference signal resources, the reference signals corresponding to the second reference signal resources; or the terminal device receives, based on a configuration of the second reference signal resources, the reference signals corresponding to the second reference signal resources.

The R transmit beams are transmit beams that are generated by the access network device and that correspond to the R reference signal resources, the R transmit beams are transmit beams with fixed weights, and R is an integer greater than or equal to 2. For a related description of the transmit beam with a fixed weight, refer to the related description of step 201 in the embodiment shown in FIG. 2A. Details are not described herein again.

The R transmit beams are R transmit beams corresponding to R CRIs reported by the terminal device in a beam management procedure, or R transmit beams corresponding to R CRIs selected by the access network device from CRIs reported by the terminal device in a beam management procedure, or R transmit beams selected by the access network device from M transmit beams according to a preset rule, where the M transmit beams are fixed-weight transmit beams generated by the access network device. This is not specifically limited in this disclosure.

Optionally, the R reference signal resources are used for beam management, and the second reference signal resources are used for beam combination. Port numbers of the R ports of the access network device are in a one-to-one correspondence with the R transmit beams respectively corresponding to the R CRIs reported by the terminal device in the beam management procedure.

Specifically, the second reference signal resources are used for beam combination, that is, are used by the access network device to generate a new transmit beam, to match a channel condition between the terminal device and the access network device.

Optionally, the second reference signal resources are CSI-RS resources that are corresponding to R symbols and R ports and whose frequency density (density) is 1 or 3.

Figure 3B:
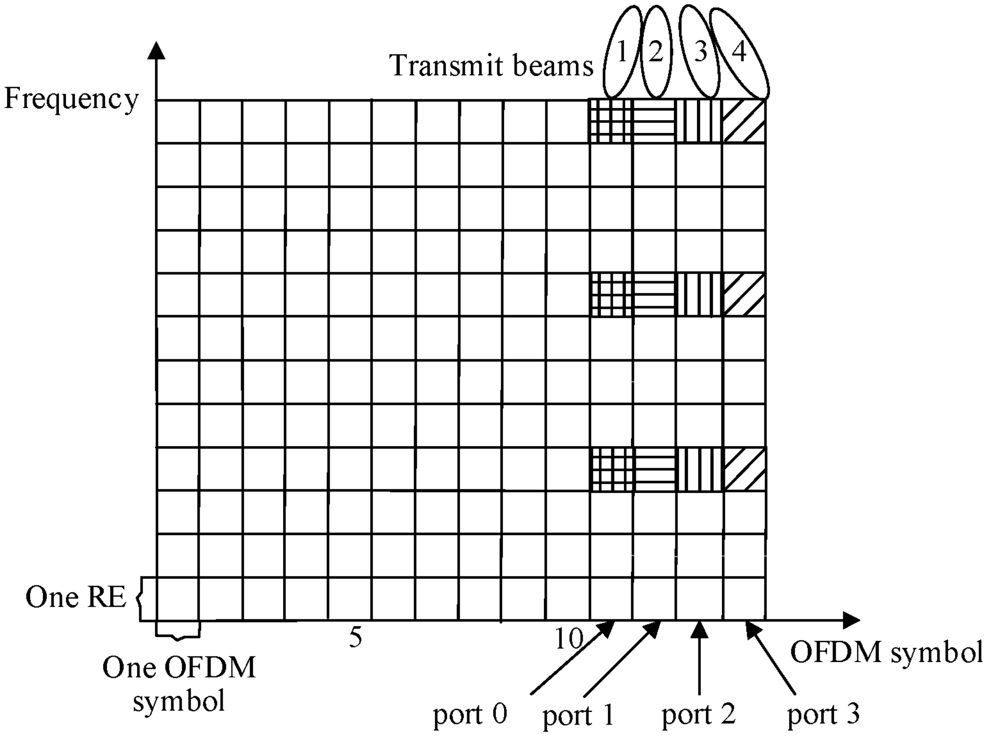
FIG. 3B is a schematic diagram of a second reference signal resource according to an embodiment of this disclosure.

For example, as shown in FIG. 3B, the second reference signal resources are four-port four-symbol CSI-RS resources whose frequency density is 3. Port 0 corresponds to a transmit beam 1, port 1 corresponds to a transmit beam 2, port 3 corresponds to a transmit beam 3, and port 4 corresponds to a transmit beam 4. The access network device sends the second reference signal resources on the transmit beam 1, the transmit beam 2, the transmit beam 3, and the transmit beam 4 through port 0, port 1, port 2, and port 3 of the access network device. To be specific, port 0 to port 4 are all used to send second reference signal resources, and the access network device sends the second reference signal resources (specifically, time-frequency resources in the shadow part in FIG. 3B) across four consecutive OFDM symbols in time domain. Each symbol corresponds to one port. That is, the access network device sends a same reference signal by using the R ports.

Based on the example shown in FIG. 3B, the following uses Table 5 to represent a location of a second reference signal resource in a slot. Refer to Table 5:

TABLE 5

| Row | Ports (Ports X) | Frequency-domain density (Density ρ) | cdm type (cdm-Type) | Time-frequency location $(\bar{k}, \bar{l})$ of a second reference signal resource in a slot | CDM group index (CDM group index j) | Frequency k' | Time l' |
|---|---|---|---|---|---|---|---|
| X | 4 | 3 | noCDM | $(k_0, l_0)$, $(k_0 + 4, l_0)$, $(k_0 + 8, l_0)$ $(k_0, l_0 + 1)$, $(k_0 + 4, l_0 + 1)$, $(k_0 + 8, l_0 + 1)$ $(k_0, l_0 + 2)$, $(k_0 + 4, l_0 + 2)$, $(k_0 + 8, l_0 + 2)$ $(k_0, l_0 + 3)$, $(k_0 + 4, l_0 + 3)$, $(k_0 + 8, l_0 + 3)$ | 0, 0, 0, 0, 0, 0, 0, 0, 0, 0, 0, 0 | 0 | 0 |

Herein, $(k_0, l_0)$ is the $l_0^{th}$ OFDM symbol of a slot and the $k_0^{th}$ RE corresponding to the $l_0^{th}$ OFDM symbol. For example, $k_0$ is 0, and $l_0$ is 0. Row X is a newly introduced column. Subsequently, when reporting second capability information of the terminal device, the terminal device may indicate, by using the second capability information, whether the terminal device supports measurement of a CSI-RS resource shown in Row X.

Variables (including $k_0$, $l_0$, and the like) in Table 5 are consistent with the notation in section 7.4.1.5.3 of the communications standard TS 38.211 v16.2.0. For details, refer to related descriptions of the notation in section 7.4.1.5.3 of the communications standard TS 38.211 v16.2.0.

Figure 3C:
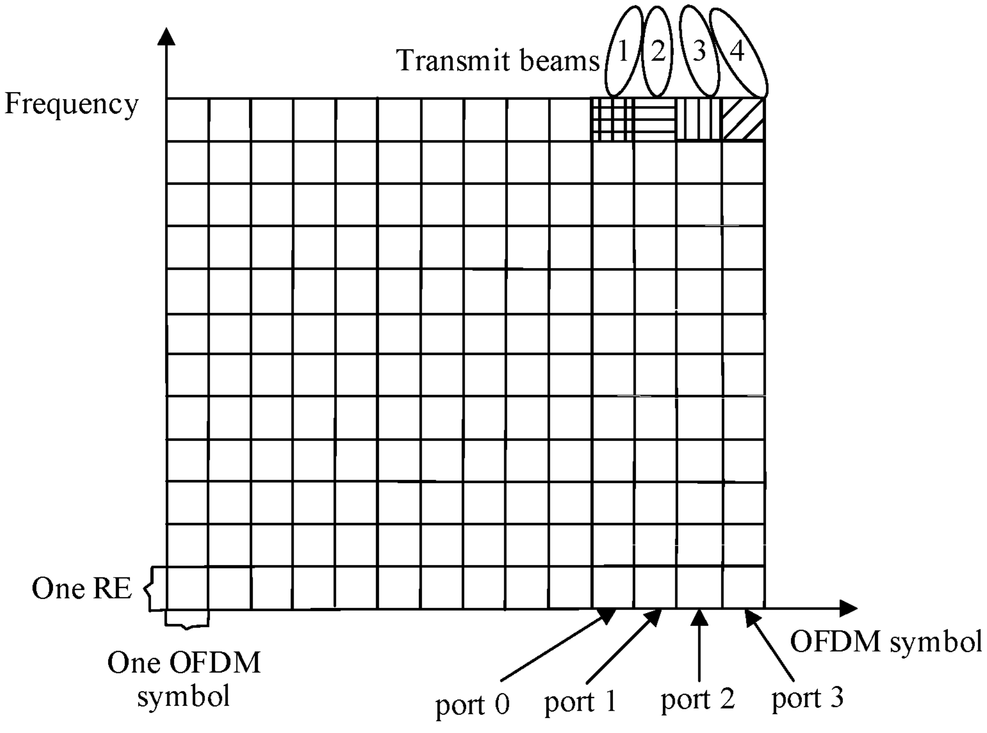
FIG. 3C is another schematic diagram of a second reference signal resource according to an embodiment of this disclosure.

For another example, as shown in FIG. 3C, the second reference signal resources are four-port four-symbol CSI-RS resources whose frequency density is 1. The access network device sends the second reference signal resources on the transmit beam 1, the transmit beam 2, the transmit beam 3, and the transmit beam 4 through port 0, port 1, port 2, and port 3 of the access network device. To be specific, port 0 to port 4 are all used to send second reference signal resources, and the access network device sends the second reference signal resources (specifically, time-frequency resources in the shadow part in FIG. 3C) across four consecutive OFDM symbols in time domain. Each symbol corresponds to one port. That is, the access network device sends a same reference signal by using the R ports.

Based on the example shown in FIG. 3C, the following uses Table 6 to represent a location of a second reference signal resource in a slot. Refer to Table 6:

channel measurement (that is, CSI-RS for channel acquisition). In other words, the second reference signal resource is used for channel measurement.

In a communications protocol, if a CSI-RS is used for channel measurement, the CSI-RS belongs to a CSI-RS resource set, and a configuration of the CSI-RS resource set does not have a repetition field or a trs-info field. In addition, reporting quantities associated with the CSI-RS include one or more of a channel quality indicator (CQI), a precoding matrix indicator (PMI), a CRI, a layer indicator (LI), and a rank indicator (RI). In other words, the reporting quantities associated with the CSI-RS do not include an RSRP or an SINR.

In the implementation 1, because the reporting quantities associated with the second reference signal resource do not include the RSRP, RSRPs of reference signals corresponding to the R transmit beams should be obtained with reference to a beam management procedure. Details are described with reference to step 301*a* to step 301*c* subsequently.

Implementation 2: The CSI-RS corresponding to the second reference signal resource in step 301 is a new CSI-RS type. For example, the CSI-RS is used for dynamic transmit beam combination, or is used for transmit beam combination. In other words, the second reference signal resource is used for beam combination.

TABLE 6

| Row | Ports (Ports X) | Frequency-domain density (Density ρ) | cdm type (cdm-Type) | Time-frequency location $(\bar{k}, \bar{l})$ of a second reference signal resource in a slot | CDM group index (CDM group index j) | Frequency k' | Time l' |
|---|---|---|---|---|---|---|---|
| Y | 4 | 1 | noCDM | $(k_0, l_0)$, $(k_0, l_0 + 1)$, $(k_0, l_0 + 2)$, $(k_0, l_0 + 3)$, | 0, 0, 0, 0 | 0 | 0 |

Herein, $(k_0, l_0)$ is the $l_0^{th}$ OFDM symbol of a slot and the $k_0^{th}$ RE corresponding to the $l_0^{th}$ OFDM symbol. For example, $k_0$ is 0, and $l_0$ is 0. Variables (including $k_0$, $l_0$, and the like) in Table 6 are consistent with the notation in section 7.4.1.5.3 of the communications standard TS 38.211 v16.2.0. For details, refer to related descriptions of the notation in section 7.4.1.5.3 of the communications standard TS 38.211 v16.2.0.

Table 5 and Table 6 are merely examples. In this embodiment, whether the access network device and the terminal device support code division multiple access (CDMA) is not limited. In addition, when R is 2, Table 5 and Table 6 do not need to be introduced.

It should be noted that port numbers of port 0 to port 3 (port numbers corresponding to port 0 to port 3 are 0, 1, 2, and 3 respectively) shown in FIG. 3B and FIG. 3C are relative port numbers. In actual application, port numbers of port 0 to port 3 may be 3000, 3001, 3002, 3003; or the like. This is not specifically limited in this disclosure. FIG. 3B and FIG. 3C are merely used to describe sending, by the access network device, the second reference signal resources on different R ports.

In this embodiment, a CSI-RS corresponding to the second reference signal resource has two possible forms, which are separately described below:

Implementation 1: In step 301, the CSI-RS corresponding to the second reference signal resource belongs to an existing CSI-RS type, and the CSI-RS is a CSI-RS used for Specifically, for the CSI-RS type, a new field is usually added for the CSI-RS resource or a CSI-RS resource set to which the CSI-RS belongs, to mark that the CSI-RS is used for dynamic transmit beam combination. For example, the field is expressed by using an ACN.1 pseudo-code form in the standard as follows:

DynamicBeam ENUMERATED {support}

In the implementation 2, whether the reporting quantities associated with the second reference signal resource can include an RSRP is not limited. Therefore, in this implementation, the access network device may obtain, in a beam combination procedure, RSRPs of reference signals corresponding to the second reference signal resources on the R transmit beams, or may obtain, with reference to a beam management procedure, RSRPs of R reference signals corresponding to the R transmit beams. This is not specifically limited in this disclosure.

In this embodiment, the R ports are virtual antenna ports or physical antenna ports of the access network device.

It should be noted that, the terminal device receives, by using a same receive beam, the reference signals that are corresponding to the second reference signal resources and that are sent by the access network device. In step 304, the access network device generates a second transmit beam based on second phase information of the reference signals corresponding to the second reference signal resources on the R ports that is obtained by the terminal device through measurement by using a same receive beam. Therefore, the receive beam of the terminal device should be limited on the terminal device side, so that the access network device generates the second transmit beam that matches a channel condition between the terminal device and the access network device, thereby improving communication performance of communication between the terminal device and the access network device.

302: The terminal device measures the second reference signal resources, to obtain second measurement information.

The second measurement information includes the second phase information, and the second phase information is phase information obtained by the terminal device by separately measuring the second reference signal resources on the R ports.

Specifically, the terminal device separately measures the second phase information of the reference signals corresponding to the second reference signal resources on the R ports. For example, as shown in FIG. 3B, the terminal device measures, on time-frequency resources of different types of shadow parts, reference signals corresponding to the second reference signal resources. In this way, phase information of the reference signals corresponding to the second reference signal resources respectively corresponding to port 0 to port 3 can be obtained.

It may be understood that, that the terminal device measures the second reference signal resources to obtain the second measurement information is equivalent to that the terminal device measures the reference signals corresponding to the second reference signal resources to obtain the second measurement information.

In this embodiment, a form of content included in the second phase information is a phase of a reference signal, or a phase difference between reference signals corresponding to second reference signal resources on different ports.

1. For a manner in which the second phase information includes a phase of a reference signal, the second phase information includes phases respectively corresponding to the second reference signal resources on the R ports.

Specifically, the second phase information includes phases respectively corresponding to the reference signals corresponding to the second reference signal resources on the R ports.

The terminal device separately measures the phases of the reference signals corresponding to the second reference signal resources on the R ports. Then, the terminal device may report, to the access network device by using indication information, the phases of the reference signals corresponding to the second reference signal resources on the R ports; or the terminal device directly reports, to the access network device, the phases of the reference signals corresponding to the second reference signal resources on the R ports.

For the manner in which the second phase information includes a phase of a reference signal, the terminal device needs to consider impact of a frequency on the phases of the reference signals corresponding to the second reference signal resources. For a specific reporting requirement, refer to related descriptions of step 202 in the embodiment shown in FIG. 2A. Details are not described herein again.

2. For a manner in which the second phase information includes a phase difference between reference signals corresponding to second reference signal resources on different ports, the second phase information specifically includes either of the following:

1. Phase differences between phases respectively corresponding to the second reference signal resources on the R ports Specifically, the second phase information includes the phase differences between the phases that are respectively corresponding to the reference signals corresponding to the second reference signal resources on the R ports.

The terminal device measures a phase of each of the reference signals corresponding to the second reference signal resources on the R ports, and then the terminal device calculates phase differences between the phases of the reference signals corresponding to the second reference signal resources on the R ports. In this implementation, the second phase information specifically includes R*(R−1) phase differences.

2. A phase difference between a second reference phase and a phase corresponding to each of the second reference signal resources on the R ports Specifically, the second phase information includes a phase difference between the second reference phase and a phase corresponding to each of the reference signals corresponding to the second reference signal resources on the R ports. In this implementation, the second phase information includes R−1 phase differences.

In this embodiment, the second reference phase includes any one of the following possible implementations:

1. The second reference phase is a phase corresponding to a second reference signal resource on a port with a smallest port number in the R ports.

Specifically, the second reference phase is a phase of a reference signal corresponding to the second reference signal resource on the port with the smallest port number in the R ports. For example, a phase of a reference signal corresponding to a second reference signal resource on a port whose relative port number is 0 in the R ports is used as the second reference phase.

2. The second reference phase is a phase corresponding to a second reference signal resource on a port with a largest port number in the R ports.

Specifically, the second reference phase is a phase of a reference signal corresponding to the second reference signal resource on the port with the largest port number in the R ports.

3. The second reference phase is a phase corresponding to a second reference signal resource on a port, in the R ports, through which the access network device first sends the second reference signal resource.

Specifically, the second reference phase is a phase of a reference signal corresponding to the second reference signal resource on the port, in the R ports, through which the access network device first sends a reference signal corresponding to the second reference signal resource.

For example, as shown in FIG. 3B, the second reference signal resource includes a time-frequency resource of a shadow part shown in FIG. 3B, and a second reference signal resource occupied by each port is corresponding to a time-frequency resource of one type of shadow part shown in FIG. 3B. The access network device sends the second reference signal resources on the shadow part in FIG. 3B. As shown in FIG. 3B, the access network device first sends, through port 0, the reference signal corresponding to the second reference signal resource carried on the eleventh OFDM symbol. In this case, the access network device uses a phase of the reference signal corresponding to the second reference signal resource on port 0 as the second reference phase.

4. The second reference phase is a phase corresponding to a second reference signal resource on a port, in the R ports, through which the access network device last sends the second reference signal resource.

Specifically, the second reference phase is a phase of a reference signal corresponding to the second reference signal resource on the port, in the R ports, through which the access network device last sends the reference signal corresponding to the second reference signal resource.

For example, as shown in FIG. 3B, the second reference signal resources include time-frequency resources of a shadow part shown in FIG. 3B, and a second reference signal resource occupied by each port is corresponding to a time-frequency resource of one type of shadow part shown in FIG. 3B. The access network device sends the second reference signal resources on the shadow part in FIG. 3B. As shown in FIG. 3B, the access network device last sends, through port 3, the reference signal corresponding to the second reference signal resource carried on the fourteenth OFDM symbol. In this case, the access network device uses a phase of the reference signal corresponding to the second reference signal resource on port 3 as the second reference phase.

5. The second reference phase is a phase corresponding to a second reference signal resource on a port corresponding to any transmit beam in the R transmit beams.

Specifically, the second reference phase is a phase of a reference signal corresponding to a second reference signal resource on a port corresponding to any transmit beam in the R transmit beams.

For example, any transmit beam in the R transmit beams may be a transmit beam that is obtained by the terminal device through measurement and that has a largest RSRP in a beam management process; or in a process of step 302, the terminal device measures a transmit beam corresponding to a port that has a largest RSRP in the reference signals corresponding to the second reference signal resources on the R ports.

The foregoing shows some possible implementations of the second reference phase. During actual application, there may be another implementation. This is not specifically limited in this disclosure.

With reference to the implementation 2 of the CSI-RS corresponding to the second reference signal resource in step 301, the second measurement information further includes the RSRPs respectively corresponding to the second reference signal resources on the R ports. In other words, the RSRPs corresponding to the R transmit beams are measured by the terminal device based on the reference signals corresponding to the second reference signal resources on the R ports.

For example, as shown in FIG. 3B, the terminal device measures, on time-frequency resources of different types of shadow parts, the reference signals corresponding to the second reference signal resources. In this way, RSRPs of reference signals corresponding to second reference signal resources respectively corresponding to port 0 to port 3 can be obtained, that is, the second measurement information further includes the RSRPs of the reference signals corresponding to the second reference signal resources on the R ports.

The foregoing step 302 shows the second phase information obtained by the terminal device by measuring the second reference signal resources on the R ports, and a technical solution in which the terminal device further measures the RSRPs respectively corresponding to the second reference signal resources on the R ports based on the implementation 2 of the CSI-RSs corresponding to the second reference signal resources in the foregoing step 301. In an actual application, process 1: The terminal device measures the second reference signal resources on the R ports to obtain the second phase information. Process 2: Based on the implementation 2 of the CSI-RS corresponding to the second reference signal resources in step 301, the terminal device measures the RSRPs respectively corresponding to the second reference signal resources on the R ports. The process 1 and the process 2 may be two independent measurement processes. In addition, a sequence of measuring, by the terminal device, the second reference signal resources on the R ports to obtain the second phase information and measuring, by the terminal device, the RSRPs respectively corresponding to the second reference signal resources on the R ports is not limited.

303: The terminal device sends a second message to the access network device.

The second message carries fourth indication information, and the fourth indication information indicates the second phase information.

A manner in which the terminal device reports the RSRPs corresponding to the N CRIs in the existing beam management procedure is as follows: The terminal device reports, by using a seven-bit absolute value quantization method, a largest RSRP in the RSRPs corresponding to the N CRIs, and the remaining RSRPs corresponding to the N CRIs except the largest RSRP are reported by using a four-bit relative difference quantization method. Therefore, to match a manner in which the terminal device reports RSRPs in an existing beam management procedure, the following describes content carried in the second message by using an example in which the second phase information includes phase differences between the second reference phase and the phases of the reference signals corresponding to the second reference signal resources on the R ports. The second reference phase difference is a phase corresponding to a second reference signal resource on a port corresponding to a transmit beam whose RSRP is the largest. The transmit beam with the largest RSRP is a transmit beam corresponding to a largest RSRP in R RSRPs measured and reported by the terminal device in the beam management procedure.

First, a bitwidth used for indicating each phase difference in the second message is first shown. For details, refer to Table 7.

TABLE 7

| Field (Field) | Bitwidth (Bitwidth) |
|---|---|
| Differential Phase | 4 |

The terminal device reports the phase difference Differential Phase to the access network device by using four bits. In other words, each phase difference occupies four bits in the second message.

It should be noted that Table 7 is merely an example, and a bitwidth occupied by the Differential Phase is not limited in this embodiment. For example, the differential phase occupies a bitwidth of eight bits.

Refer to Table 8. The following shows a sequence of fields for reporting phase differences in the second message.

TABLE 8

| CSI report number (CSI report number) | CSI fields (CSI fields) |
|---|---|
| | Differential Phase #2-#1<br>Differential Phase #3-#1<br>Differential Phase #4-#1 |

In Table 7, Differential Phase #2-#1 represents a phase difference between CRS-RSs respectively corresponding to CRI #1 and CRI #2, Differential Phase #3-#1 represents a phase difference between CRS-RSs respectively corresponding to CRI #3 and CRI #1, and Differential Phase #4-#1 represents a phase difference between CRS-RSs respectively corresponding to CRI #4 and CRI #1.

CRI #1, CRI #2, and CRI #3 are respectively CRIs of R reference signal resources corresponding to the R RSRPs that are reported by the terminal device in the beam management procedure.

That is, the Differential Phase #2-#1, Differential Phase #3-#1, and Differential Phase #4-#1 each occupy four bits. For details about the quantization precision of the phase difference, refer to related descriptions of Table 3 and Table 4 in the embodiment shown in FIG. 2A. Details are not described herein again.

Table 7 and Table 8 are merely intended to describe a specific form of the fourth indication information carried in the second message. In actual application, the terminal device may report the fourth indication information in another form, and does not depend on a reporting manner of RSRPs in the beam management procedure, provided that the access network device and the terminal device agree on a reporting manner in advance, and the access network device can correctly parse information reported by the terminal device.

Optionally, based on the implementation 2 of the CSI-RSs corresponding to the second reference signal resources in step 301, the second message further carries eleventh indication information, and the eleventh indication information indicates the RSRPs of the reference signals corresponding to the second reference signal resources on the R ports.

The RSRPs respectively corresponding to the second reference signal resources on the R ports may be reported in descending order of port numbers, or may be reported in ascending order of port numbers.

If the RSRPs respectively corresponding to the second reference signal resources on the R ports are not all reported or are not reported in a sequence of port numbers, the second measurement information in step 302 further includes port numbers respectively corresponding to the RSRPs reported by the terminal device. In other words, the second message further carries fourteenth indication information, and the fourteenth indication information indicates port numbers respectively corresponding to RSRPs reported by the terminal device.

This embodiment shows a manner in which the terminal device reports the second phase information by using indication information, so as to avoid a problem of excessively high signaling overheads and reduce resource overheads. In actual application, the terminal device may alternatively directly report the second phase information to the access network device. This is not specifically limited in this disclosure.

Step 303 shows a manner in which the terminal device sends the fourth indication information, the eleventh indication information, and the fourteenth indication information to the access network device by using a same message (the second message). In actual application, the fourth indication information, the eleventh indication information, and the fourteenth indication information may be sent to the access network device by using different messages, or the fourth indication information may be sent to the access network device by using one message, and the eleventh indication information and the fourteenth indication information is sent to the access network device by using another message. This is not specifically limited in this disclosure. The following describes the technical solutions of the embodiments of this disclosure by using an example in which the terminal device sends the fourth indication information, the eleventh indication information, and the fourteenth indication information to the access network device by using a same message (the second message).

304: The access network device generates the second transmit beam based on the second phase information indicated by the fourth indication information.

The second transmit beam is used for communication between the access network device and the terminal device.

In this embodiment, a manner in which the access network device obtains the RSRPs respectively corresponding to the R transmit beams includes the following two possible implementations.

Implementation 1: The second message further carries the eleventh indication information, and the eleventh indication information indicates the RSRPs of the reference signals corresponding to the second reference signal resources on the R ports. The access network device determines, by using the eleventh indication information, the RSRPs of the reference signals corresponding to the second reference signal resources on the R ports, and the access network device determines, based on the fourth indication information, the second phase information of the reference signals corresponding to the second reference signal resources on the R ports. Then, the access network device generates the second transmit beam based on the RSRPs of the reference signals corresponding to the second reference signal resources on the R ports and the second phase information.

Implementation 2: The access network device receives, in a beam management procedure, CRIs respectively corresponding to R reference signal resources and RSRPs corresponding to the R reference signal resources that are reported by the terminal device, where the R CRIs are in a one-to-one correspondence with the R transmit beams. The access network device determines, based on the fourth indication information, the second phase information of the reference signals corresponding to the second reference signal resources on the R ports. Then, the access network device generates the second transmit beam based on the RSRPs corresponding to the R reference signal resources and the second phase information.

In the implementation 1 and the implementation 2, a specific process in which the access network device generates the second transmit beam with reference to the RSRPs and the phase information is similar to step 204*a* to step 204*b* in the embodiment shown in FIG. 2. For details, refer to related descriptions of step 204*a* to step 204*b* in the embodiment shown in FIG. 2A. Details are not described herein again.

It can be learned from this that a main lobe direction of the second transmit beam is directed at the terminal device. In this case, the access network device and the terminal device perform communication transmission by using the second transmit beam, and a beam gain of the second transmit beam can be greatly improved, thereby improving performance of communication between the terminal device and the access network device. In addition, compared with a manner in which the access network device selects a transmit beam from the M transmit beams to perform communication transmission with the terminal device, the method in this embodiment maximizes a channel capacity corresponding to the second transmit beam, and therefore improves a capacity of a channel corresponding to the second transmit beam. The M transmit beams are M transmit beams that are generated by the access network device and that correspond to the M reference signal resources, and the M transmit beams are transmit beams with fixed weights.

Optionally, the second transmit beam does not belong to a transmit beam set, and the transmit beam set includes the M transmit beams.

305: The access network device communicates with the terminal device by using the second transmit beam.

Step 305 is similar to step 205 in the embodiment shown in FIG. 2A. For details, refer to related descriptions of step 205 in the embodiment shown in FIG. 2A. Details are not described herein again.

A difference lies in that, if the CSI-RSs corresponding to the second reference signal resources are the CSI-RSs shown in the implementation 1 in step 301, the second phase information may be reported together with other related channel information (specifically including one or more of CQIs, PMIs, CRIs, LIs, RIs). The second phase information is measured based on each port, and other related channel information may be measured based on a CSI-RS resource. In other words, measurement of the second phase information is used as a part of channel measurement. In this way, in step 305, there is no need to measure a channel corresponding to the second transmit beam.

In this embodiment of this disclosure, the terminal device measures the second phase information of the second reference signal resources on the N ports, and sends the fourth indication information to the access network device, to indicate the second phase information. In a movement process of the terminal device, a channel condition between the access network device and the terminal device keeps changing, and the R ports are respectively corresponding to the R transmit beams of the access network device. Therefore, the second phase information of the second reference signal resources may indicate a channel change status between the access network device and the terminal device. In this way, the access network device may generate, by using the second phase information, a new transmit beam that matches the channel condition between the terminal device and the access network device; or select, from the R transmit beams of the access network device, a transmit beam that matches the channel condition between the terminal device and the access network device, to improve performance of communication between the access network device and the terminal device.

In the embodiment shown in FIG. 3A, the R transmit beams may be R transmit beams corresponding to the R CRIs reported by the terminal device in the beam management procedure. In this implementation manner, the implementation shown in FIG. 3A further includes step 301*a* to step 301*c*, and step 301*a* to step 301*c* are performed before step 301.

301*a*: The access network device sends M reference signal resources to the terminal device.

Step 301*a* is similar to step 201 in the embodiment shown in FIG. 2A. For details, refer to related descriptions of step 201 in the embodiment shown in FIG. 2A. Details are not described herein again.

301*b*: The terminal device measures the M reference signal resources to obtain third measurement information.

The third measurement information includes RSRPs respectively corresponding to the R reference signal resources and R CRIs corresponding to the R reference signal resources, and the R CRIs respectively correspond to the R transmit beams in step 301.

It should be noted that when the terminal device receives the R reference signals that are corresponding to the R reference signal resources and that are sent by the access network device, the terminal device receives the R reference signals by using a same receive beam. Herein, the terminal device receives the R reference signals by using the first receive beam. It can be learned that in step 301, the terminal device receives, by using the first receive beam, the reference signal s corresponding to the second reference signal resources.

It may be understood that, that the terminal device measures the M reference signal resources to obtain the third measurement information is equivalent to that the terminal device measures the reference signals respectively corresponding to the M reference signal resources to obtain the third measurement information.

In this embodiment, each of the M reference signal resources corresponds to one transmit beam, and different reference signal resources correspond to same or different transmit beams. It should be noted that the transmit beams respectively corresponding to the M reference signal resources should include at least two different transmit beams.

Optionally, the M reference signal resources are in a one-to-one correspondence with M transmit beams. To be specific, each reference signal resource corresponds to a transmit beam, and different reference signal resources correspond to different transmit beams. In step 301*b*, the R transmit beams corresponding to the R reference signal resources are different.

301*c*: The terminal device sends a third message to the access network device, where the third message carries fifth indication information and sixth indication information.

The fifth indication information indicates the CRIs respectively corresponding to the R reference signal resources, and the sixth indication information indicates the RSRPs respectively corresponding to the R reference signal resources.

Specifically, the access network device determines, based on the fifth indication information and the sixth indication information, the RSRPs respectively corresponding to the R reference signal resources.

It should be noted that step 301*c* is described by using an example in which the terminal device reports the RSRPs respectively corresponding to the R reference signal resources to the access network device by using indication information. In actual application, the terminal device may directly report the RSRPs respectively corresponding to the R reference signal resources to the access network device. This is not specifically limited in this disclosure.

Step 301*c* describes the technical solution in this embodiment of this disclosure by using an example in which the terminal device sends the fifth indication information and the sixth indication information to the access network device by using a same message (the third message). In actual application, the terminal device may alternatively send the fifth indication information and the sixth indication information by using different messages respectively. This is not specifically limited in this disclosure.

Step 301*a* to step 301*c* may be performed periodically, or may be performed aperiodically. This is not specifically limited in this disclosure. For the R CRIs reported by the terminal device each time, the terminal device receives, by using a same receive beam, reference signals respectively corresponding to the R CRIs.

Optionally, step 301 to step 303 are performed periodically, aperiodically, or semi-persistently. Therefore, when the access network device selects the R transmit beams, the access network device may first select R transmit beams corresponding to R CRIs last reported by the terminal device in the beam management procedure, and then the access network device performs step 301 to step 303.

In this embodiment of this disclosure, if the access network device configures the terminal device to receive the second reference signal resources on P ports of the access network device, but the access network device determines, by using the beam management procedure, that only R transmit beams in the P transmit beams reported by the terminal device are suitable for the new transmit beam. In this possible case, the embodiment shown in FIG. 3A further includes step 301*d* and step 301*e*, and step 301*d* and step 301*e* are performed before step 301.

Step 301*d*: The access network device sends seventh indication information to the terminal device.

The seventh indication information is used to indicate the terminal device to measure the second phase information of the second reference signal resources on the R ports of the access network device.

The R ports are the first R ports, the last R ports, or any R ports of the P ports of the access network device. This is not specifically limited in this disclosure. The P ports are ports that are configured in the access network device and that are used to send the second reference signal resources. P is an integer greater than 2, and P is greater than R. To be specific, the access network device indicates, by using the seventh indication information, the terminal device to measure the second reference signal resources on the specified ports (the R ports). For example, as shown in FIG. 3B, the access network device indicates the terminal device to receive second reference signal resources on port 0 and port 2.

Specifically, the access network device may send the seventh indication information to the terminal device by using a media access control control element (MAC CE) or downlink control information (DCI).

Step 301*e*: The terminal device determines, based on the seventh indication information, to measure the second reference signal resources on the R ports of the access network device.

To enable the access network device to configure a proper resource configuration and a proper reporting manner for the terminal device, so that the access network device can correctly parses the reporting quantity of the terminal device. Optionally, the embodiment shown in FIG. 3A further includes step 306 and step 307, and step 306 and step 307 are performed before step 301.

306: The terminal device sends second capability information of the terminal device to the access network device.

The second capability information carries eighth indication information, and an indication form of the eighth indication information includes any one of the following:

1. The eighth indication information indicates whether the terminal device supports a reference signal sending mode.

The reference signal sending mode is that the access network device sends, through R ports of the access network device by using the R transmit beams, reference signals corresponding to the second reference signal resources on R symbols that are consecutive in time domain. The R transmit beams are in a one-to-one correspondence with the R ports, and the R ports are in a one-to-one correspondence with the R symbols.

For example, as shown in FIG. 3A, the access network device includes port 0 to port 3. Port 0 corresponds to a transmit beam 1, port 1 corresponds to a transmit beam 2, port 2 corresponds to a transmit beam 3, and port 3 corresponds to a transmit beam 4. The access network device sends the second reference signal resources through port 0, port 1, port 2, and port 3 by using the transmit beam 1, the transmit beam 2, the transmit beam 3, and the transmit beam 4. To be specific, port 0 to port 3 are all used to send the second reference signal resources, and the second reference signal resources (specifically, some time-frequency resources in shadow in FIG. 3A) are sent across four OFDM symbols consecutively in time domain, and each symbol corresponds to one port. That is, the access network device sends a same reference signal by using the R ports.

2. The eighth indication information indicates whether the terminal device supports measurement of a reference signal resource shown in Row X. For a related description of Row X, refer to Table 4 or Table 5 in step 301.

3. The eighth indication information indicates a maximum quantity of consecutive symbols of reference signals that can be measured by the terminal device.

Optionally, the second capability information further carries the maximum quantity of consecutive symbols of reference signals that can be measured by the terminal device.

Specifically, the terminal device may notify, in a form of ACN.1 pseudo-code in the following standard, the access network device that the terminal device supports measurement of a CSI-RS crossing three consecutive symbols.

MaxNrOfSymbols-CSI-RS ENUMERATED {3}

Step 306 shows a manner in which the terminal device reports the eighth indication information by using the second capability information. In actual application, the terminal device may separately send the eighth indication information to the access network device, or the terminal device may add the eighth indication information to other information or a message and report the eighth indication information to the access network device. This is not specifically limited in this disclosure.

307: The access network device sends the second configuration information to the terminal device.

The second configuration information is used to configure the second reference signal resource to be used for beam combination and configure the terminal device to report the second phase information of the second reference signal resources on the R ports.

In a possible implementation, for the CSI-RSs corresponding to the second reference signal resources shown based on the implementation 1 in step 301, before the configuration process in step 307, the access network device configures, for the terminal device, a configuration used for beam management. For example, the configuration used for beam management is ResourceConfig #1. The first resource set used for beam management includes 16 CSI-RSs, the access network device requires that the terminal device report a reporting quantity CRI-RSRP, and a reported number (nrofReportedRs) is 4.

Figure 3D:
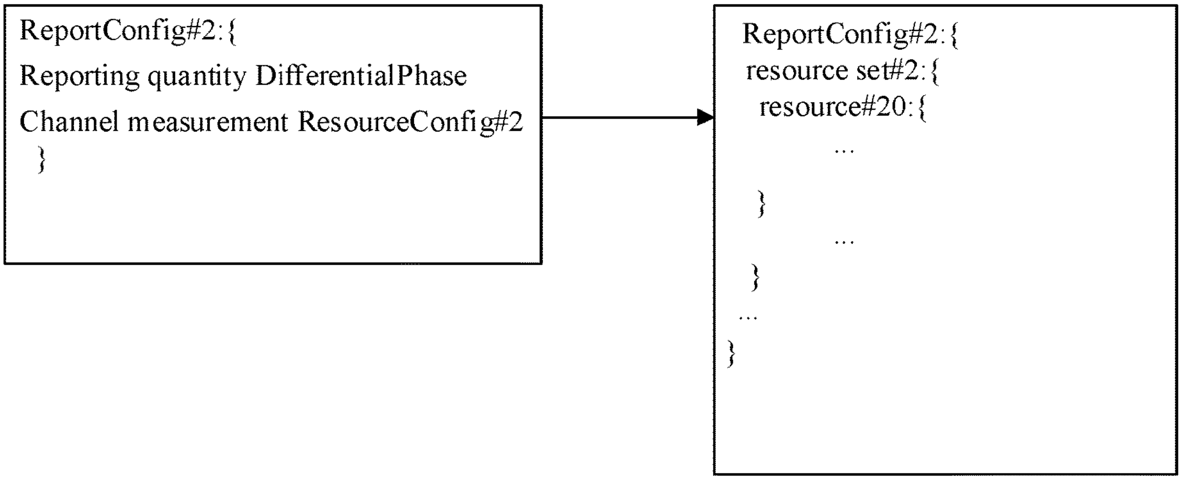
FIG. 3D is a schematic diagram of second configuration information according to an embodiment of this disclosure.

Based on the foregoing configuration used for beam management, the following shows a possible implementation of the second configuration information with reference to FIG. 3D. The second configuration information includes a reporting quantity Differential Phase and channel measurement ResourceConfig #2. Information such as a quantity of ports used for beam combination and a time-frequency resource location corresponding to each port is configured in resource #20 included in ResourceConfig #2. A quantity of ports that are configured on the access network device and that are used for beam combination is less than a quantity nrofReportedRs of transmit beams reported in beam management.

Specifically, the access network device may configure resource #20 with reference to FIG. 3B and Table 4, or configure resource #20 with reference to FIG. 3C and Table 5, and mainly configure a quantity of ports used for beam combination and a time-frequency location corresponding to each port.

In the second configuration information shown in FIG. 3D, the second phase information is reported by using a beam combination process, and RSRPs of R reference signals corresponding to R transmit beams may be reported in a beam management procedure. In this case, in this possible implementation, resource #20 in the second configuration information is associated with ResourceConfig #1. To be specific, in the foregoing step 301, the terminal device should receive the second reference signal resources by using the receive beams that are used to receive the R reference signals corresponding to the R transmit beams in the beam management process.

In another possible implementation, based on the CSI-RSs corresponding to the second reference signal resources shown in the implementation 2 of step 301, the second phase information may be reported together with CRS-RSRPs, that is, both the second phase information and the CRI-RSRPs are measured based on a port. In this case, the second configuration information is similar to that in FIG. 3C, and a difference lies in that in this implementation, the reporting quantity included in the second configuration information is CRI-RSRP-DifferentialPhase and channel measurement ResourceConfig #2.

Step 301 to step 304 may be performed periodically and repeatedly, or may be performed aperiodically, or may be performed semi-persistently. This is not specifically limited in this disclosure.

If step 301 to step 304 are periodically and repeatedly performed, the access network device configures, by using the second configuration information, step 301 to step 304 to be periodically and repeatedly performed. If step 301 to step 304 are performed aperiodically, after step 301*c* and before step 301, the access network device triggers execution of step 301 to step 304 as required. If step 301 to step 304 are performed semi-persistently, after step 301*c* and before step 301, the access network device first performs operations such as activation, deactivation, and triggering, and then performs step 301 to step 304. For a resource used for aperiodic execution of step 301 to step 304 or a resource used for semi-persistent execution of step 301 to step 304 configured by the access network device, and a corresponding reporting manner, refer to an existing configuration manner. This is not specifically limited in this disclosure.

308: The terminal device determines, based on the second configuration information, that the second reference signal resources are used for beam combination and to report the second phase information of the second reference signal resources on the R ports of the access network device.

For the CSI-RSs corresponding to the second reference signal resources shown based on the implementation 1 in step 301, optionally, the terminal device determines, based on the second configuration information, that resource #20 of the second configuration information is associated with the configuration ResourceConfig #1 used for beam management. Then, the terminal device determines, in the beam management procedure, a receive beam used to receive the R reference signals reported by the terminal device, and receives the second reference signal resources by using the receive beam.

In this embodiment of this disclosure, the terminal device measures the second phase information of the second reference signal resources on the N ports, and sends the fourth indication information to the access network device, to indicate the second phase information. In a movement process of the terminal device, a channel condition between the access network device and the terminal device keeps changing, and the R ports are respectively corresponding to the R transmit beams of the access network device. Therefore, the second phase information of the second reference signal resources may indicate a channel change status between the access network device and the terminal device. In this way, the access network device may generate, by using the second phase information, a new transmit beam that matches the channel condition between the terminal device and the access network device; or select, from the R transmit beams of the access network device, a transmit beam that matches the channel condition between the terminal device and the access network device, to improve performance of communication between the access network device and the terminal device.

It should be noted that in the embodiment shown in FIG. 2 and the embodiment shown in FIG. 3, the access network device obtains phase information and amplitude information of a reference signal through downlink measurement between the terminal device and the access network device, to generate a transmit beam that matches a channel condition between the terminal device and the access network device.

In actual application, the access network device may alternatively obtain phase information and amplitude information of a reference signal by performing uplink measurement between the terminal device and the access network device, to generate a transmit beam that matches a channel condition between the terminal device and the access network device. For example, the terminal device sends a sounding reference signal (SRS) to the access network device, and then the access network device measures the SRS, to obtain phase information and amplitude information of the SRS. Specifically, the following two possible implementations are included:

1. The terminal device sends the SRS to the access network device, and the access network device measures the SRS, that is, performs uplink measurement. Then, the access network device generates, based on a measurement result, a transmit beam that matches the channel condition between the terminal device and the access network device. For a specific generation manner, refer to step 204*a* and step 204*b* in the embodiment shown in FIG. 2A. In this implementation, the access network device configures a proper resource for the SRS, and no additional information exchange between the access network device and the terminal device is required.

2. The terminal device sends the SRS to the access network device, and the access network device measures the SRS, that is, performs uplink measurement. The access network device sends a measurement result to the terminal device, and then the terminal device calculates a synthesis weight. Then, the terminal device feeds back the synthesis weight to the access network device, and the access network device generates, based on the synthesis weight, a transmit beam matching a channel condition between the terminal device and the access network device. For a specific generation manner, refer to step 204*a* to step 204*b* in the embodiment shown in FIG. 2A.

Figure 4:
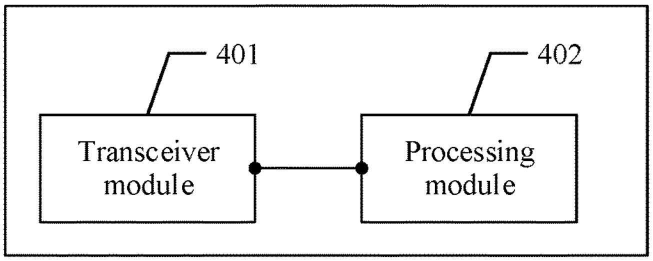
FIG. 4 is a schematic diagram of a structure of a communication apparatus according to an embodiment of this disclosure.

The following describes a communication apparatus according to an embodiment of this disclosure. FIG. 4 is a schematic diagram of a structure of a communication apparatus according to an embodiment of this disclosure. The communication apparatus may be configured to perform the steps performed by the terminal device in the embodiment shown in FIG. 2A. For details, refer to related descriptions in the foregoing method embodiment.

The communication apparatus includes a transceiver module 401 and a processing module 402.

The transceiver module 401 is configured to receive M reference signal resources sent by an access network device.

The processing module 402 is configured to measure each of the M reference signal resources to obtain first measurement information, where the first measurement information includes first phase information, the first phase information is phase information obtained by the communication apparatus by measuring each of N reference signal resources of the M reference signal resources, both N and M are integers greater than or equal to 1, and M is greater than or equal to N.

The transceiver module 401 is further configured to send first indication information to the access network device, where the first indication information indicates the first phase information.

In a possible implementation, the M reference signal resources are used for beam management, the first phase information is used by the access network device to generate a first transmit beam, and the first transmit beam is used for communication between the access network device and the communication apparatus.

In another possible implementation, the first transmit beam does not belong to a transmit beam set, and the transmit beam set includes transmit beams that are generated by the access network device and that are respectively corresponding to the M reference signal resources.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In another possible implementation, the first measurement information includes N reference signal resource indicators CRIs, N RSRPs, and the first phase information, and the first phase information includes N*(N−1) phase differences or N−1 phase differences, where the N CRIs are CRIs respectively corresponding to the N reference signal resources, and the N RSRPs are RSRPs respectively corresponding to the N reference signal resources; the N*(N−1) phase differences are phase differences between the phases respectively corresponding to the N reference signal resources, and the N−1 phase differences are phase differences between the first reference phase and the phases respectively corresponding to the N reference signal resources.

In another possible implementation, the N reference signal resources in the M reference signal resources are received by the communication apparatus by using a same receive beam.

In another possible implementation, the transceiver module 401 is further configured to:

send first capability information of the communication apparatus to the access network device, where the first capability information carries second indication information, and the second indication information indicates whether the communication apparatus has a measurement capability of measuring the first phase information required by the access network device to generate the first transmit beam.

In another possible implementation, the second indication information indicates whether the communication apparatus supports measurement of phase information corresponding to a reference signal resource used for beam management.

In another possible implementation, the first capability information further carries one or more of the following pieces of information: a maximum quantity of transmit beams that are corresponding to reference signal resources used for beam management and that can be combined by the communication apparatus; and information about a quantization capability of quantizing the first phase information by the communication apparatus.

In another possible implementation, the transceiver module 401 is further configured to:

receive first configuration information sent by the access network device.

The processing module 402 is further configured to:

determine, based on the first configuration information, to report the first phase information of the N reference signal resources.

In another possible implementation, the first configuration information includes second configuration information of a first resource set, the second configuration information includes a repetition field, the repetition field is OFF, and the first resource set includes the M reference signal resources.

In another possible implementation, the first configuration information further includes one or more of the following pieces of information:

third indication information, where the third indication information indicates that the first resource set is used by the access network device to generate the first transmit beam;

reporting granularity information of the first phase information; and size information of each subband when a reporting granularity of the first phase information is a subband reporting granularity.

In another possible implementation, the transceiver module 401 is further configured to:

send twelfth indication information and thirteenth indication information to the access network device, where the twelfth indication information indicates N CRIs corresponding to the N reference signal resources, and the thirteenth indication information indicates RSRPs corresponding to the N reference signal resources.

In this embodiment of this disclosure, the transceiver module 401 is configured to receive M reference signal resources sent by the access network device. The processing module 402 is configured to measure each of the M reference signal resources to obtain the first measurement information, where the first measurement information includes the first phase information, the first phase information is phase information obtained by the communication apparatus by measuring each of N reference signal resources of the M reference signal resources, both N and M are integers greater than or equal to 1, and M is greater than or equal to N. The transceiver module 401 is further configured to send the first indication information to the access network device, where the first indication information indicates the first phase information. In a movement process of the communication apparatus, a channel condition between the access network device and the communication apparatus keeps changing, and the N reference signal resources respectively correspond to the N transmit beams. Therefore, the first phase information of the N reference signal resources may indicate a channel change status between the access network device and the communication apparatus. In this way, the access network device may generate, with reference to the first phase information, a new transmit beam that matches a channel condition between the communication apparatus and the access network device, or select, from the N transmit beams of the access network device, a transmit beam that matches a channel condition between the communication apparatus and the access network device, to improve performance of communication between the access network device and the communication apparatus.

Optionally, FIG. 4 is further used to execute the following solution:

The transceiver module 401 is configured to receive M reference signal resources sent by the access network device.

The processing module 402 is configured to measure N reference signal resources in the M reference signal resources, to obtain first phase information, where both N and M are integers greater than or equal to 1, and M is greater than or equal to N.

The transceiver module 401 is further configured to send first indication information to an access network device, where the first indication information indicates the first phase information.

Figure 5:
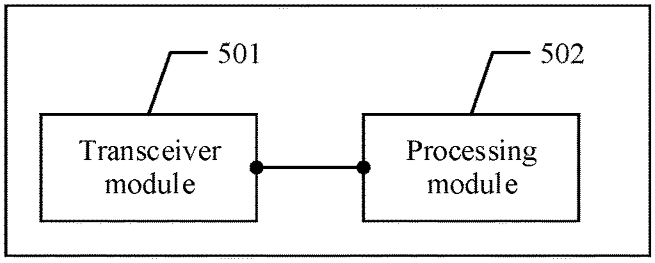
FIG. 5 is another schematic diagram of a structure of a communication apparatus according to an embodiment of this disclosure.

The following describes a communication apparatus according to an embodiment of this disclosure. FIG. 5 is a schematic diagram of a structure of a communication apparatus according to an embodiment of this disclosure. The communication apparatus may be configured to perform the steps performed by the access network device in the embodiment shown in FIG. 2A. For details, refer to related descriptions in the foregoing method embodiment.

The communication apparatus includes a transceiver module 501 and a processing module 502.

The transceiver module 501 is configured to send M reference signal resources to a terminal device; and receive first indication information sent by the terminal device, where the first indication information indicates first phase information, the first phase information is phase information obtained by the terminal device by measuring N reference signal resources, the M reference signal resources include the N reference signal resources, both N and M are integers greater than or equal to 1, and M is greater than or equal to N.

The processing module 502 is configured to generate a first transmit beam based on the first phase information indicated by the first indication information, where the first transmit beam is used for communication between the communication apparatus and the terminal device.

In a possible implementation, the M reference signal resources are used for beam management.

In another possible implementation, the first transmit beam does not belong to a transmit beam set, and the transmit beam set includes transmit beams that are generated by the communication apparatus and that are respectively corresponding to the M reference signal resources.

In another possible implementation, the first phase information includes phase differences between phases respectively corresponding to the N reference signal resources; or the first phase information includes a phase difference between a first reference phase and a phase corresponding to each of the N reference signal resources, where the first reference phase is a phase corresponding to a first reference signal resource, and the first reference signal resource is a reference signal resource with a largest RSRP or highest RSRQ in the N reference signal resources.

In another possible implementation, the first phase information includes N*(N−1) phase differences, or N−1 phase differences. The N*(N−1) phase differences are the phase differences between the phases respectively corresponding to the N reference signal resources, and the N−1 phase differences are phase differences between the first reference phase and the phases respectively corresponding to the N reference signal resources.

In another possible implementation, the N reference signal resources in the M reference signal resources are received by the terminal device by using a same receive beam.

In another possible implementation, the transceiver module 501 is further configured to:

receive first capability information of the terminal device that is sent by the terminal device, where the first capability information carries second indication information, and the second indication information indicates whether the terminal device has a measurement capability of measuring the first phase information required for the communication apparatus to generate the first transmit beam.

The processing module 502 is further configured to:

determine, based on the first capability information, that the terminal device has the measurement capability of measuring the first phase information.

In another possible implementation, the second indication information indicates whether the terminal device supports measurement of the phase information corresponding to the reference signal resource used for beam management.

In another possible implementation, the first capability information further carries one or more of the following pieces of information: a maximum quantity of transmit beams that are corresponding to reference signal resources used for beam management and that can be combined by the terminal device; and information about a quantization capability of quantizing the first phase information by the terminal device.

In another possible implementation, the transceiver module 501 is further configured to:

send first configuration information to the terminal device, where the first configuration information is used for configuring the terminal device to report the first phase information of the N reference signal resources.

In another possible implementation, the first configuration information includes second configuration information of a first resource set, the second configuration information includes a repetition field, the repetition field is OFF, and the first resource set includes the M reference signal resources.

In another possible implementation, the first configuration information further includes one or more of the following pieces of information:

third indication information, where the third indication information indicates that the first resource set is used by the communication apparatus to generate the first transmit beam;

reporting granularity information of the first phase information; and size information of each subband when a reporting granularity of the first phase information is a subband reporting granularity.

In another possible implementation, the transceiver module 501 is further configured to:

receive twelfth indication information and thirteenth indication information that are sent by the terminal device, where the twelfth indication information indicates N CRIs corresponding to the N reference signal resources, and the thirteenth indication information indicates RSRPs corresponding to the N reference signal resources.

The processing module 502 is further configured to:

determine, based on the twelfth indication information and the thirteenth indication information, the RSRPs corresponding to the N reference signal resources.

The processing module 502 is specifically configured to:

generate the first transmit beam based on the first phase information and the RSRPs corresponding to the N reference signal resources.

In another possible implementation, the processing module 502 is specifically configured to:

determine a first synthesis weight based on the first phase information and the RSRPs corresponding to the N reference signal resources; and generate the first transmit beam based on the first synthesis weight and a second weight set, where the second weight set includes weights of N transmit beams corresponding to the N reference signal resources.

In this embodiment of this disclosure, the transceiver module 501 is configured to: send the M reference signal resources to the terminal device; and receive the first indication information sent by the terminal device, where the first indication information indicates the first phase information, the first phase information is phase information obtained by the terminal device by measuring the N reference signal resources, the M reference signal resources include the N reference signal resources, both N and M are integers greater than or equal to 1, and M is greater than or equal to N. The processing module 502 is configured to generate the first transmit beam based on the first phase information indicated by the first indication information, where the first transmit beam is used for communication between the communication apparatus and the terminal device. In a movement process of the terminal device, a channel condition between the communication apparatus and the terminal device keeps changing, and the N reference signal resources respectively correspond to N transmit beams. Therefore, the first phase information of the N reference signal resources may indicate a channel change status between the communication apparatus and the terminal device. In this way, the communication apparatus may generate, with reference to the first phase information, the first transmit beam that matches a channel condition between the terminal device and the communication apparatus, to improve performance of communication between the communication apparatus and the terminal device.

Figure 6:
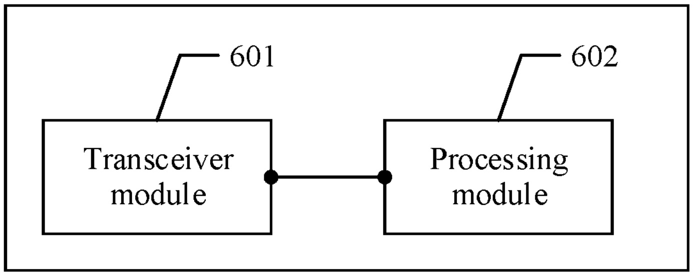
FIG. 6 is another schematic diagram of a structure of a communication apparatus according to an embodiment of this disclosure.

The following describes a communication apparatus according to an embodiment of this disclosure. FIG. 6 is a schematic diagram of a structure of a communication apparatus according to an embodiment of this disclosure. The communication apparatus may be configured to perform the steps performed by the terminal device in the embodiment shown in FIG. 3A. For details, refer to related descriptions in the foregoing method embodiment.

The communication apparatus includes a transceiver module 601 and a processing module 602.

The transceiver module 601 is configured to receive a second reference signal resource sent by an access network device, where the second reference signal resource is a reference signal resource sent by the access network device on R transmit beams by using R ports of the access network device, the R ports are in a one-to-one correspondence with the R transmit beams, the R transmit beams are transmit beams generated by the access network device and corresponding to the R reference signal resources, and R is an integer greater than or equal to 2.

The processing module 602 is configured to measure the second reference signal resource to obtain second measurement information, where the second measurement information includes second phase information, and the second phase information is phase information obtained by the communication apparatus by separately measuring the second reference signal resources on the R ports.

The transceiver module 601 is further configured to send fourth indication information to the access network device, where the fourth indication information indicates the second phase information.

In a possible implementation, the second reference signal resources are used for beam combination, the second phase information is used by the access network device to generate a second transmit beam, and the second transmit beam is used for communication between the access network device and the communication apparatus.

In another possible implementation, the second transmit beam does not belong to a transmit beam set, the transmit beam set includes transmit beams that are generated by the access network device and corresponding to M reference signal resources, the M reference signal resources are used for beam management, the M reference signal resources include the R reference signal resources, M is an integer greater than or equal to 2, and M is greater than or equal to R.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In another possible implementation, the second measurement information includes RSRPs respectively corresponding to the second reference signal resources on the R ports; the second phase information includes $R*(R-1)$ phase differences or $R-1$ phase differences. The $R*(R-1)$ phase differences are phase differences between the phases respectively corresponding to the second reference signal resources on the R ports. The $R-1$ phase differences are phase differences between the second reference phase and the phases respectively corresponding to the second reference signal resources on the R ports.

In another possible implementation, the transceiver module 601 is further configured to:

send eleventh indication information to the access network device, where the eleventh indication information indicates the RSRPs respectively corresponding to the second reference signal resources on the R ports.

In another possible implementation, the transceiver module 601 is specifically configured to:

receive, by using a same receive beam, the second reference signal resources sent by the access network device.

In another possible implementation, the transceiver module 601 is specifically configured to:

receive M reference signal resources sent by the access network device, where the M reference signal resources are used for beam management.

The processing module 602 is further configured to:

measure each of the M reference signal resources to obtain RSRPs respectively corresponding to R reference signal resources in the M reference signal resources, where the communication apparatus receives the R reference signal resources by using a first receive beam, both R and M are integers greater than or equal to 2, and M is greater than or equal to R.

The transceiver module 601 is further configured to:

send fifth indication information and sixth indication information to the access network device, where the fifth indication information indicates reference signal resource indicators CRIs respectively corresponding to the R reference signal resources, and the sixth indication information indicates RSRPs respectively corresponding to the R reference signal resources.

The transceiver module 601 is specifically configured to:

receive, by using the first receive beam, the second reference signal resources sent by the access network device.

In another possible implementation, the transceiver module 601 is further configured to:

receive seventh indication information sent by the access network device.

The processing module 602 is further configured to:

determine, based on the seventh indication information, to measure the phases of the second reference signal resources on the R ports of the access network device, where the R ports are first R ports of P ports that are configured to send the second reference signal resources in the access network device, and P is an integer greater than R.

In another possible implementation, the transceiver module 601 is further configured to:

send second capability information of the communication apparatus to the access network device, where the second capability information carries eighth indication information, the eighth indication information indicates whether the communication apparatus supports a reference signal sending mode, and the reference signal sending mode is: the access network device sends, through R ports of the access network device by using the R transmit beams, second reference signals corresponding to the second reference signal resources on R symbols that are consecutive in time domain, where the R transmit beams are in a one-to-one correspondence with the R ports, and the R ports are in a one-to-one correspondence with the R symbols.

In another possible implementation, the second capability information further carries a maximum quantity of symbols supported by the communication apparatus, and the maximum quantity of symbols is a maximum quantity of consecutive symbols of reference signals that can be measured by the communication apparatus.

In another possible implementation, the transceiver module 601 is further configured to:

receive second configuration information sent by the access network device.

The processing module 602 is further configured to:

determine, based on the second configuration information, that the second reference signal resources are used for beam combination and to report the second phase information of the second reference signal resources on the R ports.

In this embodiment of this disclosure, the transceiver module 601 is configured to receive the second reference signal resources sent by the access network device, where the second reference signal resources are reference signal resources sent by the access network device on the R transmit beams through the R ports of the access network device, the R ports are in a one-to-one correspondence with the R transmit beams, the R transmit beams are transmit beams that are generated by the access network device and corresponding to the R reference signal resources, and R is an integer greater than or equal to 2. The processing module 602 is configured to measure the second reference signal resources to obtain the second measurement information, where the second measurement information includes the second phase information, and the second phase information is phase information obtained by the communication apparatus by measuring each of the second reference signal resources on the R ports. The transceiver module 601 is further configured to send the fourth indication information to the access network device, where the fourth indication information indicates the second phase information. In a moving process of the communication apparatus, a channel condition between the access network device and the communication apparatus keeps changing, and the R ports are respectively corresponding to the R transmit beams of the access network device. Therefore, the second phase information of the second reference signal resource may indicate a channel change status between the access network device and the communication apparatus. In this way, the access network device may generate, with reference to the second phase information, a new transmit beam that matches a channel condition between the communication apparatus and the access network device, or select, from the R transmit beams of the access network device, a transmit beam that matches a channel condition between the communication apparatus and the access network device, to improve performance of communication between the access network device and the communication apparatus.

Optionally, FIG. 6 is further configured to execute the following technical solution:

The transceiver module 601 is configured to receive second reference signal resources sent by the access network device, where the second reference signal resources are reference signal resources sent by the access network device on R transmit beams through R ports of the access network device, the R ports are in a one-to-one correspondence with the R transmit beams, the R transmit beams are transmit beams that are generated by the access network device and corresponding to the R reference signal resources, and R is an integer greater than or equal to 2.

The processing module 602 is configured to measure each of the second reference signal resources on the R ports to obtain second phase information.

The transceiver module 603 is further configured to send a second message to the access network device, where the second message carries the fourth indication information, and the fourth indication information indicates the second phase information.

Figure 7:
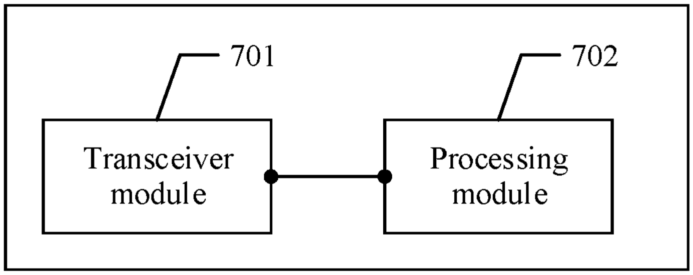
FIG. 7 is another schematic diagram of a structure of a communication apparatus according to an embodiment of this disclosure.

The following describes a communication apparatus according to an embodiment of this disclosure. FIG. 7 is a schematic diagram of a structure of a communication apparatus according to an embodiment of this disclosure. The communication apparatus may be configured to perform the steps performed by the access network device in the embodiment shown in FIG. 3A. For details, refer to related descriptions in the foregoing method embodiment.

The communication apparatus includes a transceiver module 701 and a processing module 702.

The transceiver module 701 is configured to send second reference signal resources to a terminal device on R transmit beams through R ports of the communication apparatus, where the R ports are in a one-to-one correspondence with the R transmit beams, the R transmit beams are transmit beams that are generated by the communication apparatus and corresponding to R reference signal resources, and R is an integer greater than or equal to 2; and receive fourth indication information sent by the terminal device, where the fourth indication information indicates second phase information, and the second phase information is phase information obtained by the terminal device by measuring each of the second reference signal resources on the R ports.

The processing module 702 is configured to generate a second transmit beam based on the second phase information indicated by the fourth indication information. The second transmit beam is used for communication between the communication apparatus and the terminal device.

In a possible implementation, the second reference signal resources are used for beam combination.

In another possible implementation, the second transmit beam does not belong to a transmit beam set, the transmit beam set includes transmit beams that are generated by the communication apparatus and corresponding to M reference signal resources, the M reference signal resources are used for beam management, the M reference signal resources include the R reference signal resources, M is an integer greater than or equal to 2, and M is greater than or equal to R.

In another possible implementation, the second phase information includes phase differences between phases respectively corresponding to the second reference signal resources on the R ports, or a phase difference between a second reference phase and each of phases respectively corresponding to the second reference signal resources on the R ports, where the second reference phase is a phase corresponding to the second reference signal resource on a port with a smallest port number in the R ports.

In another possible implementation, the transceiver module 701 is further configured to:

receive eleventh indication information, where the eleventh indication information indicates RSRPs respectively corresponding to the second reference signal resources on the R ports, the second phase information includes R*(R−1) phase differences or R−1 phase differences, the R*(R−1) phase differences are phase differences between the phases respectively corresponding to the second reference signal resources on the R ports, and the R−1 phase differences are phase differences between the second reference phase and the phases respectively corresponding to the second reference signal resources on the R ports.

In another possible implementation, the transceiver module 701 is further configured to:

send seventh indication information to the terminal device, where the seventh indication information is used to indicate the terminal device to measure phase information of the second reference signal resources on the R ports, the R ports are first R ports of P ports that are configured to send the second reference signal resources in the communication apparatus, and P is an integer greater than R.

In another possible implementation, the transceiver module 701 is further configured to:

receive second capability information of the terminal device that is sent by the terminal device, where the second capability information carries eighth indication information.

The processing module 702 is further configured to:

determine, based on the eighth indication information, whether the terminal device supports a reference signal sending mode, where the reference signal sending mode is: the communication apparatus sends, through R ports of the communication apparatus by using the R transmit beams, second reference signals corresponding to the second reference signal resources on R symbols that are consecutive in time domain, where the R transmit beams are in a one-to-one correspondence with the R ports, and the R ports are in a one-to-one correspondence with the R symbols.

In another possible implementation, the second capability information further carries a maximum quantity of symbols supported by the terminal device, and the maximum quantity of symbols is a maximum quantity of consecutive symbols of reference signals that can be measured by the terminal device.

In another possible implementation, the transceiver module 701 is further configured to:

send second configuration information to the terminal device, where the second configuration information is used to configure the second reference signal resources to be used for beam combination, and configure the terminal device to report the second phase information of the second reference signal resources on the R ports.

In another possible implementation, the transceiver module 701 is further configured to:

send M reference signal resources to the terminal device, where the M reference signal resources are used for beam management; and receive a third message sent by the terminal device, where the third message carries fifth indication information and sixth indication information, the fifth indication information indicates reference signal resource indicators CRIs respectively corresponding to R reference signal resources, the sixth indication information indicates RSRPs respectively corresponding to the R reference signal resources, and the R reference signal resources are in a one-to-one correspondence with the R transmit beams.

The processing module 702 is further configured to:

determine, based on the third message, the RSRPs respectively corresponding to the R reference signal resources.

The processing module 702 is specifically configured to:

generate the second transmit beam based on the second phase information and the RSRPs respectively corresponding to the R reference signal resources.

In another possible implementation, the processing module 702 is specifically configured to:

generate a second synthesis weight based on the second phase information and the RSRPs respectively corresponding to the R reference signal resources; and generate the second transmit beam based on the second synthesis weight and a third weight set, where the third weight set includes weights of the R transmit beams corresponding to the R reference signal resources.

In this embodiment of this disclosure, the transceiver module 701 is configured to: send the second reference signal resources to the terminal device on the R transmit beams through the R ports of the communication apparatus, where the R ports are in a one-to-one correspondence with the R transmit beams, the R transmit beams are transmit beams that are generated by the communication apparatus and that correspond to the R reference signal resources, and R is an integer greater than or equal to 2; receive the fourth indication information sent by the terminal device, where the fourth indication information indicates the second phase information, and the second phase information is phase information obtained by the terminal device by measuring each of the second reference signal resources on the R ports. The processing module 702 is configured to generate the second transmit beam based on the second phase information indicated by the fourth indication information, where the second transmit beam is used for communication between the communication apparatus and the terminal device. In a movement process of the terminal device, a channel condition between the communication apparatus and the terminal device keeps changing, and the R ports are respectively corresponding to the R transmit beams of the communication apparatus. Therefore, the second phase information of the second reference signal resource may indicate a channel change status between the communication apparatus and the terminal device. In this way, the communication apparatus may generate, with reference to the second phase information, a new transmit beam that matches a channel condition between the terminal device and the communication apparatus, or select, from the R transmit beams of the communication apparatus, a transmit beam that matches a channel condition between the terminal device and the communication apparatus, to improve performance of communication between the communication apparatus and the terminal device.

Figure 8:
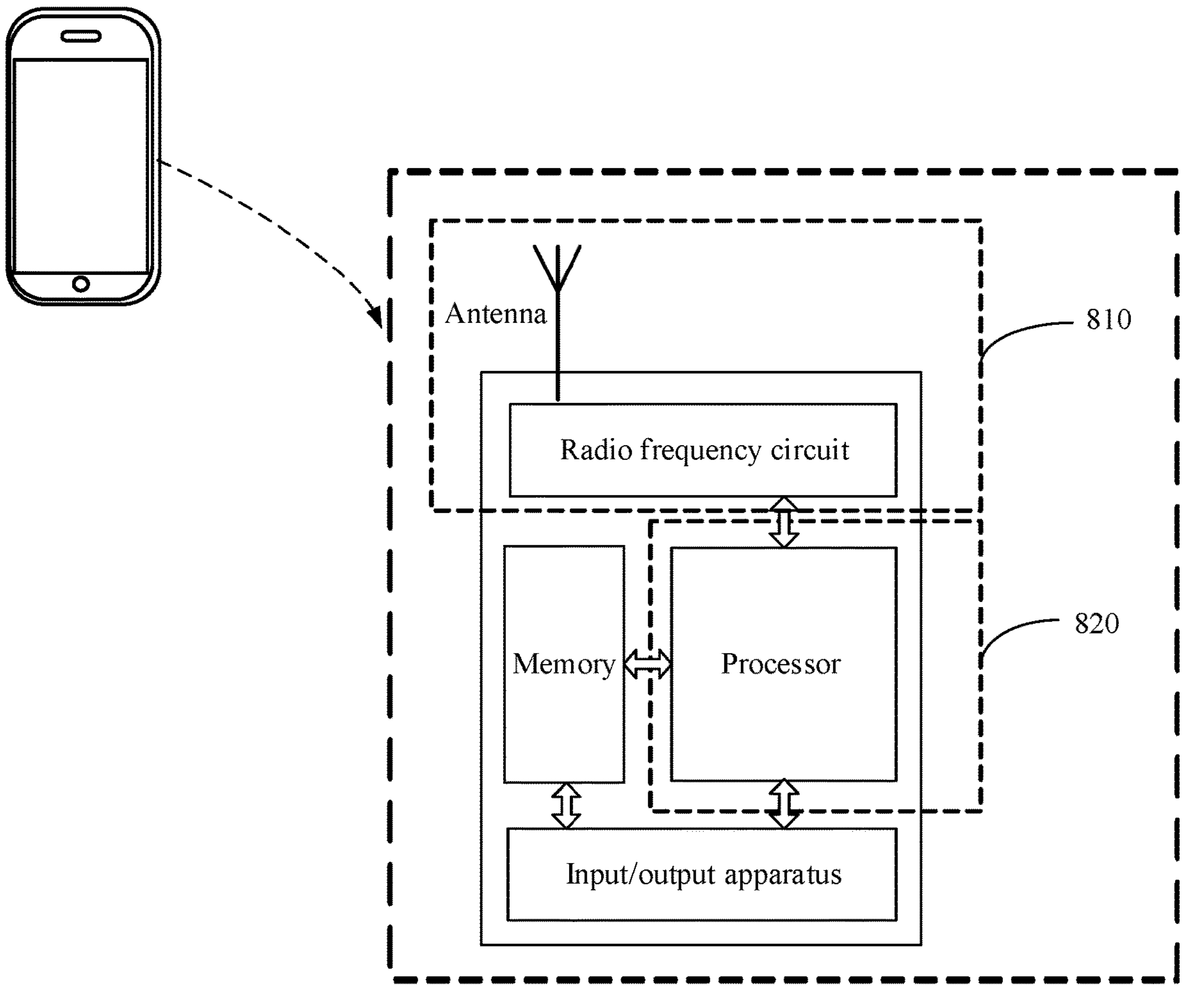
FIG. 8 is a schematic diagram of a structure of a terminal device according to an embodiment of this disclosure.

FIG. 8 shows a schematic diagram of a possible structure of a terminal device below.

FIG. 8 is a simplified schematic diagram depicting a structure of a terminal device. For ease of understanding and illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, only one memory and one processor are shown in FIG. 8. In an actual terminal device product, there may be one or more processors and one or more memories. The memory may also be referred to as a storage medium, a storage device, or the like. The memory may be disposed independent of the processor, or may be integrated with the processor. This is not limited in embodiments of this disclosure.

In this embodiment of this disclosure, the antenna and a radio frequency circuit that have a transceiver function may be considered as a transceiver unit of the terminal device, and a processor that has a processing function may be considered as a processing unit of the terminal device. As shown in FIG. 8, the terminal device includes a transceiver unit 810 and a processing unit 820. The transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. To be specific, the transceiver unit 810 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 810 is configured to perform a sending operation and a receiving operation on the terminal device side in the foregoing method embodiments, and the processing unit 820 is configured to perform an operation other than the receiving and sending operations of the terminal device in the foregoing method embodiments.

For example, in a possible implementation, the transceiver unit 810 is configured to perform the receiving and sending operations of the terminal device in step 201, step 203, step 206, and step 207 in FIG. 2A, and/or the transceiver unit 810 is further configured to perform other receiving and sending steps of the terminal device in the embodiments of this disclosure. The processing unit 820 is configured to perform step 202 and step 208 in FIG. 2A, and/or the processing unit 820 is further configured to perform another processing step of the terminal device in this embodiment of this disclosure.

Alternatively, the transceiver unit 810 is configured to perform the receiving and sending operations of the terminal device in step 301, step 303, step 306, and step 307 in FIG. 3A, and/or the transceiver unit 810 is further configured to perform other receiving and sending steps of the terminal device in the embodiments of this disclosure. The processing unit 820 is configured to perform step 302 and step 308 in FIG. 3A, and/or the processing unit 820 is further configured to perform another processing step of the terminal device in this embodiment of this disclosure.

When the terminal device is a chip, the chip includes a transceiver unit and a processing unit. The transceiver unit may be an input/output circuit or a communication interface. The processing unit is a processor, a microprocessor, an integrated circuit, or a logical circuit integrated on the chip. In the foregoing method embodiments, a sending operation corresponds to an output of the input/output circuit, and a receiving operation corresponds to an input of the input/output circuit.

Figure 9:
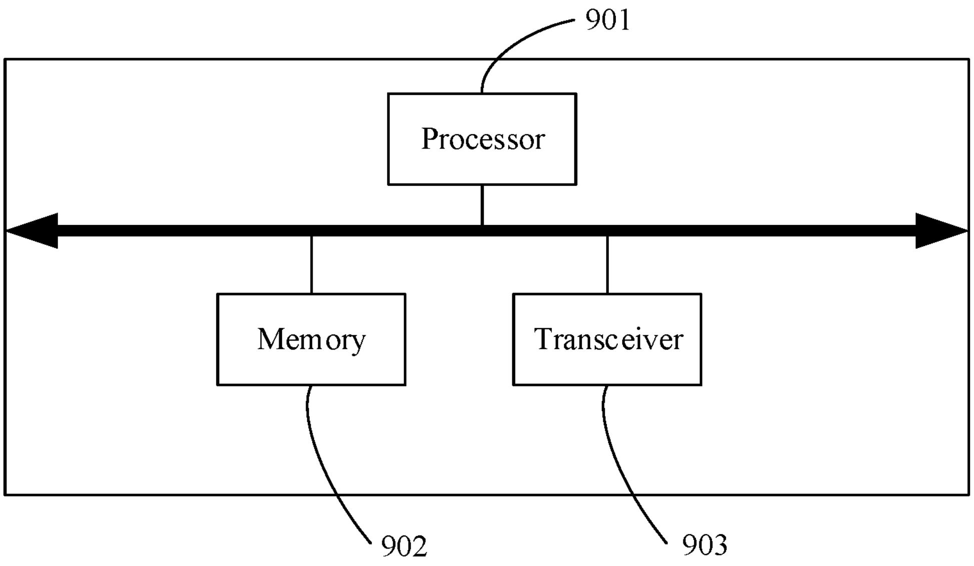
FIG. 9 is another schematic diagram of a structure of a communication apparatus according to an embodiment of this disclosure.

This disclosure further provides a communication apparatus. Referring to FIG. 9, FIG. 9 is another schematic diagram of a structure of a communication apparatus according to an embodiment of this disclosure. The packet processing apparatus may be configured to perform the steps performed by the access network device in the embodiment shown in FIG. 2A. For details, refer to related descriptions in the foregoing method embodiment.

The packet processing apparatus includes a processor 901, a memory 902, and a transceiver 903.

The processor 901, the memory 902, and the transceiver 903 are separately connected by using a bus, and the memory stores a computer instruction.

The processing module 502 in the foregoing embodiment may specifically be the processor 901 in this embodiment. Therefore, specific implementation of the processor 901 is not described again. The transceiver module 501 in the foregoing embodiment may be specifically the transceiver

903 in this embodiment. Therefore, a specific implementation of the transceiver 903 is not described again.

Figure 10:
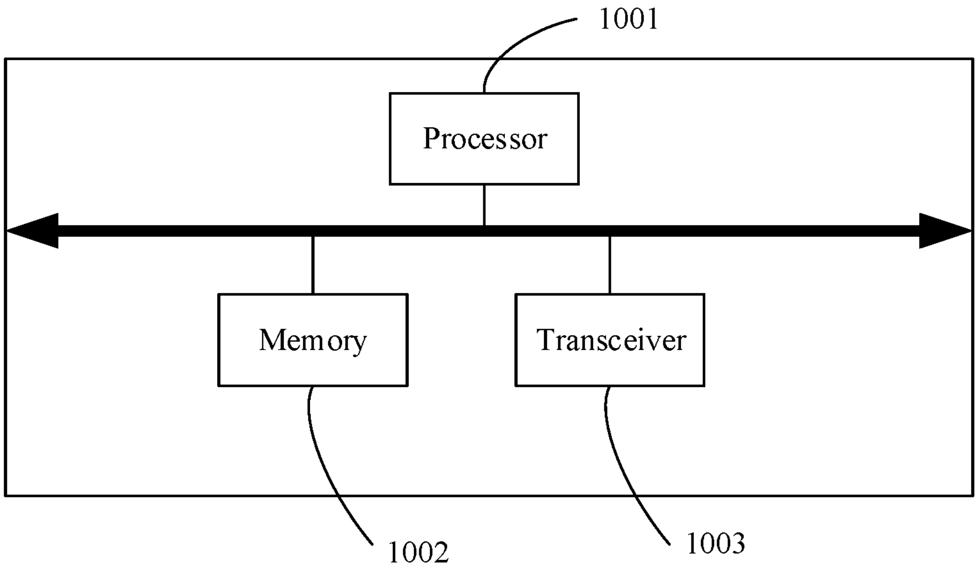
FIG. 10 is another schematic diagram of a structure of a communication apparatus according to an embodiment of this disclosure.

This disclosure further provides a communication apparatus. Referring to FIG. 10, FIG. 10 is another schematic diagram of a structure of a communication apparatus according to an embodiment of this disclosure. The packet processing apparatus may be configured to perform the steps performed by the access network device in the embodiment shown in FIG. 3A. For details, refer to related descriptions in the foregoing method embodiment.

The packet processing apparatus includes a processor 1001, a memory 1002, and a transceiver 1003.

The processor 1001, the memory 1002, and the transceiver 1003 are separately connected by using a bus, and the memory stores a computer instruction.

The processing module 702 in the foregoing embodiment may specifically be the processor 1001 in this embodiment. Therefore, specific implementation of the processor 1001 is not described again. The transceiver module 701 in the foregoing embodiment may specifically be the transceiver 1003 in this embodiment. Therefore, a specific implementation of the transceiver 1003 is not described again.

Figure 11:
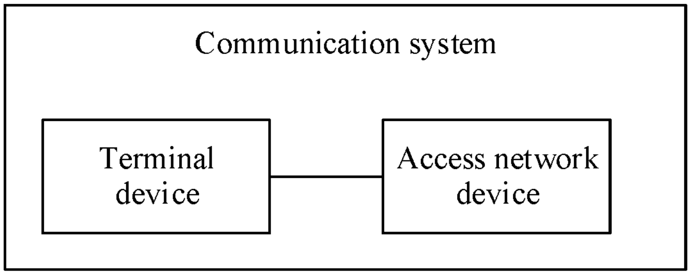
FIG. 11 is a schematic diagram of a communication system according to an embodiment of this disclosure.

Refer to FIG. 11. An embodiment of this disclosure further provides a communication system. The communication system includes the communication apparatus shown in FIG. 4 and the communication apparatus shown in FIG. 5, or the communication system includes the communication apparatus shown in FIG. 6 and the communication apparatus shown in FIG. 7.

The communication apparatus shown in FIG. 4 is configured to perform all or some steps performed by the terminal device shown in FIG. 2A, and the communication apparatus shown in FIG. 5 is configured to perform all or some steps performed by the access network device shown in FIG. 2A.

The communication apparatus shown in FIG. 6 is configured to perform all or some steps performed by the terminal device shown in FIG. 3A, and the communication apparatus shown in FIG. 7 is configured to perform all or some steps performed by the access network device shown in FIG. 3A.

An embodiment of this disclosure further provides a computer program product including an instruction. When the computer program product runs on a computer, the computer is enabled to perform the communication methods in the embodiments shown in FIG. 2A and FIG. 3A.

An embodiment of this disclosure further provides a computer-readable storage medium, including a computer instruction. When the computer instruction runs on a computer, the computer is enabled to perform the communication methods in the embodiments shown in FIG. 2A and FIG. 3A.

An embodiment of this disclosure further provides a chip apparatus, including a processor, configured to invoke a computer degree or a computer instruction stored in the memory, so that the processor performs the communication methods in the embodiments shown in FIG. 2A and FIG. 3A.

Optionally, the processor is coupled to a memory by using an interface.

Optionally, the chip apparatus further includes a memory, and the memory stores a computer degree or a computer instruction.

The processor mentioned in any of the foregoing designs may be a general-purpose central processing unit, a microprocessor, an application-specific integrated circuit (ASIC), or one or more integrated circuits for controlling program execution of the communication method in embodiments shown in FIG. 2A and FIG. 3A. The memory mentioned in any of the foregoing designs may be a read-only memory (read-only memory, ROM), another type of static storage device that can store static information and instructions, a random access memory (RAM), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatuses, and methods may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory, a random access memory, a magnetic disk, or an optical disc.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A communication method, comprising:

receiving, by a terminal device from an access network device, first configuration information that comprises second configuration information of a first resource set having M reference signal resources and an indication indicating that the first resource set is used by the access network device to generate a first transmit beam, wherein the second configuration information of the first resource set includes a field indicating that the terminal device does not expect the access network device to use a same transmit spatial filter to send all reference signal resources in the first resource set;

receiving, by the terminal device, the M reference signal resources sent by the access network device;

measuring, by the terminal device, each of N reference signal resources in the M reference signal resources to obtain first measurement information, wherein the first measurement information comprises first phase information, both N and M are integers greater than 1, and Mis greater than or equal to N; and sending, by the terminal device to the access network device, first indication information indicating the first phase information used by the access network device to generate the first transmit beam;

wherein the first phase information comprises one or more phase differences, each phase difference corresponding to one of the N reference signal resources;

wherein the first indication information is carried in a message that comprises a 7-bit field for carrying a reference signal received power (RSRP) of a first reference signal resource with the largest RSRP or highest reference signal received quality (RSRQ) in the N reference signal resources, and one or more 4-bit fields for carrying the one or more phase differences, and wherein each of the one or more phase differences is a phase difference between a first reference phase corresponding to the first reference signal resource and a phase corresponding to the one of the N reference signal resources.

2. The method according to claim 1, wherein the M reference signal resources are used for beam management.

3. The method according to claim 1, wherein the first measurement information comprises N reference signal resource indicators (CRIs), N reference signal received powers, and the first phase information, the N CRIs corresponding to the respective N reference signal resources, and the N reference signal received powers corresponding to the respective N reference signal resources;

wherein the one or more phase differences comprise N−1 phase differences.

4. The method according to claim 1, wherein the first configuration information further comprises at least one piece of the following information:

reporting granularity information of the first phase information; or size information of each subband when a reporting granularity of the first phase information is a subband reporting granularity.

5. The method according to claim 1, wherein before the receiving, by the terminal device, the M reference signal resources sent by the access network device, the method further comprises:

sending, by the terminal device to the access network device, first capability information of the terminal device that carries second indication information indicating whether the terminal device has a measurement capability of measuring the first phase information required by the access network device to generate the first transmit beam.

6. The method according to claim 5, wherein the first capability information further carries one or more of the following pieces of information:

a maximum quantity of transmit beams that are corresponding to reference signal resources used for beam management and that can be combined by the terminal device; or information about a quantization capability of quantizing the first phase information by the terminal device.

7. A communication method, comprising:

sending, by an access network device to a terminal device, first configuration information that comprises second configuration information of a first resource set having M reference signal resources and an indication indicating that the first resource set is used by the access network device to generate a first transmit beam, wherein the second configuration information of the first resource set includes a field indicating that the terminal device does not expect the access network device to use a same transmit spatial filter to send all reference signal resources in the first resource set;

sending, by the access network device, the M reference signal resources to the terminal device, wherein the M reference signal resources are sent using multiple transmit beams;

receiving, by the access network device, first indication information sent by the terminal device, wherein the first indication information indicates first phase information obtained by the terminal device by measuring N reference signal resources, the M reference signal resources comprise the N reference signal resources, both N and M are integers greater than 1, and M is greater than or equal to N; and generating, by the access network device based on the first phase information indicated by the first indication information, the first transmit beam used for communication between the access network device and the terminal device;

wherein the first phase information comprises one or more phase differences, each phase difference corresponding to one of the N reference signal resources;

wherein the first indication information is carried in a message that comprises a 7-bit field for carrying a reference signal received power (RSRP) of a first reference signal resource with the largest RSRP or highest reference signal received quality (RSRQ) in the N reference signal resources, and one or more 4-bit fields for carrying the one or more phase differences, and wherein each of the one or more phase differences is a phase difference between a first reference phase corresponding to the first reference signal resource and a phase corresponding to the one of the N reference signal resources.

8. The method according to claim 7, wherein the M reference signal resources are used for beam management.

9. The method according to claim 7, wherein the one or more phase differences comprise N−1 phase differences.

10. The method according to claim 7, wherein before the sending, by the access network device, the M reference signal resources, the method further comprises:

receiving, by the access network device from the terminal device, first capability information of the terminal device that carries second indication information indicating whether the terminal device has a measurement capability of measuring the first phase information required by the access network device to generate the first transmit beam.

11. The method according to claim 10, wherein the first capability information further carries one or more of the following pieces of information:

a maximum quantity of transmit beams that are corresponding to reference signal resources used for beam management and that can be combined by the terminal device; or information about a quantization capability of quantizing the first phase information by the terminal device.

12. A communication apparatus, comprising:

a processor, and a memory storing program instructions that, when executed by the processor, cause the communication apparatus to:

receive, from an access network device, first configuration information that comprises second configuration information of a first resource set having M reference signal resources and an indication indicating that the first resource set is used by the access network device to generate a first transmit beam, wherein the second configuration information of the first resource set includes a field indicating that the communication apparatus does not expect the access network device to use a same transmit spatial filter to send all reference signal resources in the first resource set;

receive the M reference signal resources sent by the access network device;

measure each of N reference signal resources in the M reference signal resources to obtain first measurement information, wherein the first measurement information comprises first phase information, both N and M are integers greater than 1, and M is greater than or equal to N; and send first indication information to the access network device, wherein the first indication information indicates the first phase information used by the access network device to generate the first transmit beam;

wherein the first phase information comprises one or more phase differences, each phase difference corresponding to one of the N reference signal resources;

wherein the first indication information is carried in a message that comprises a 7-bit field for carrying a reference signal received power (RSRP) of a first reference signal resource with the largest RSRP or highest reference signal received quality (RSRQ) in the N reference signal resources, and one or more 4-bit fields for carrying the one or more phase differences, and wherein each of the one or more phase differences is a phase difference between a first reference phase corresponding to the first reference signal resource and a phase corresponding to the one of the N reference signal resources.

13. The communication apparatus according to claim 12, wherein the M reference signal resources are used for beam management.

14. The communication apparatus according to claim 12, wherein the first measurement information comprises N reference signal resource indicators (CRIs), N reference signal received powers, and the first phase information, the N CRIs corresponding to the respective N reference signal resources, and the N reference signal received powers corresponding to the respective N reference signal resources;

wherein the one or more phase differences comprise N−1 phase differences.

15. The communication apparatus according to claim 12, wherein before the communication apparatus receives the M reference signal resources sent by the access network device, the communication apparatus is further caused to:

send, to the access network device, first capability information of the communication apparatus that carries second indication information indicating whether the communication apparatus has a measurement capability of measuring the first phase information required by the access network device to generate the first transmit beam.

16. The communication apparatus according to claim 15, wherein the first capability information further carries one or more of the following pieces of information:

a maximum quantity of transmit beams that are corresponding to reference signal resources used for beam management and that can be combined by the communication apparatus; or information about a quantization capability of quantizing the first phase information by the communication apparatus.

17. The communication apparatus according to claim 12, wherein the first configuration information further comprises at least one piece of the following information:

reporting granularity information of the first phase information; or size information of each subband when a reporting granularity of the first phase information is a subband reporting granularity.

* * * * *